(12) United States Patent
Kumagawa et al.

(10) Patent No.: US 6,909,415 B2
(45) Date of Patent: Jun. 21, 2005

(54) DISPLAY UNIT AND DRIVE METHOD THEREFOR

(75) Inventors: Katsuhiko Kumagawa, Neyagawa (JP); Masanori Kimura, Daitou (JP); Tetsuo Fukami, Neyagawa (JP); Akio Takimoto, Neyagawa (JP); Yukio Tanaka, Kyoto (JP); Kazunori Komori, Sanda (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 316 days.

(21) Appl. No.: 10/019,116

(22) PCT Filed: Apr. 23, 2001

(86) PCT No.: PCT/JP01/03474

§ 371 (c)(1),
(2), (4) Date: Dec. 21, 2001

(87) PCT Pub. No.: WO01/82274

PCT Pub. Date: Nov. 1, 2001

(65) Prior Publication Data

US 2003/0063074 A1 Apr. 3, 2003

(30) Foreign Application Priority Data

| Apr. 24, 2000 | (JP) | 2000-122688 |
| Apr. 27, 2000 | (JP) | 2000-127445 |
| Jun. 12, 2000 | (JP) | 2000-175407 |
| Jun. 16, 2000 | (JP) | 2000-181099 |

(51) Int. Cl.$^7$ ............................................. G09G 3/36
(52) U.S. Cl. .................... 345/92; 345/204; 349/39; 349/42
(58) Field of Search ..................... 345/87–103, 204, 345/208–210; 349/38–49

(56) References Cited

U.S. PATENT DOCUMENTS 5,598,285 A * 1/1997 Kondo et al. .............. 349/39
5,706,023 A   1/1998 Nagata et al. ............. 345/92
5,793,346 A * 8/1998 Moon ....................... 345/92

(Continued)

FOREIGN PATENT DOCUMENTS

| JP | 2-913    | 1/1990 |
| JP | 5-232509 | 9/1993 |
| JP | 7-168208 | 7/1995 |

(Continued)

OTHER PUBLICATIONS

AM–LCD95 (pp. 59–62) "Response Time Improvement of TFT–LCDs by using Capacitively Coupled Driving".

(Continued)

*Primary Examiner*—Lun-Yi Lao
(74) *Attorney, Agent, or Firm*—Merchant & Gould P.C.

(57) ABSTRACT

The present invention provides a display apparatus that can reduce a voltage irregularity and a brightness irregularity accompanied by making an enlarged and a high resolution type display apparatus. The display apparatus comprises plural pixel electrodes 5 arranged in a matrix, a switching element 3 connected with the pixel electrode, a scanning electrode 1, a picture signal electrode 2, an opposite electrode forming a capacitance with the pixel electrode 5, and further comprising; a storage capacitance 7 between the pixel electrode 5 and the scanning electrode 5 other than the scanning electrode 1 of the present line; more than two capacitance elements connected with the pixel electrode 5, including at least one of a gate-drain inter-electrode capacitance 4 of the switching element 3 and the storage capacitance 7, having a different value according to the distance from the power feeding edge of the scanning electrode 1; wherein, each capacitance in each pixel is set so that, when all capacitance connected with the pixel electrode 5 in a pixel is denoted as Ctot, a first capacitance ratio α gd=Cgd/Ctot increases continuously or in stages according to the distance from the power feeding edge of the scanning electrode 1, or a second capacitance ratio α st=Cst/Ctot is substantially constant.

76 Claims, 44 Drawing Sheets

U.S. PATENT DOCUMENTS 5,995,074 A * 11/1999 Kusafuka et al. ............. 345/90
6,329,976 B1 * 12/2001 Johnson et al. ............. 345/101
6,433,764 B1 * 8/2002 Hebiguchi et al. ............ 345/87

FOREIGN PATENT DOCUMENTS

| JP | 10-268357 | 10/1998 |
| JP | 11-109369 | 4/1999 |
| JP | 11-183932 | 7/1999 |
| JP | 11-352464 | 12/1999 |
| JP | 2000-2889 | 1/2000 |

OTHER PUBLICATIONS

Journal of the SID, 1/2, 1993 (pp. 211–218).
Proceeding of the Fourth International Display Workshop (pp. 195–198) "An Advanced Capacitively Coupled Driving Method for Large Scale and High Resolution TFT–LCDs".

* cited by examiner

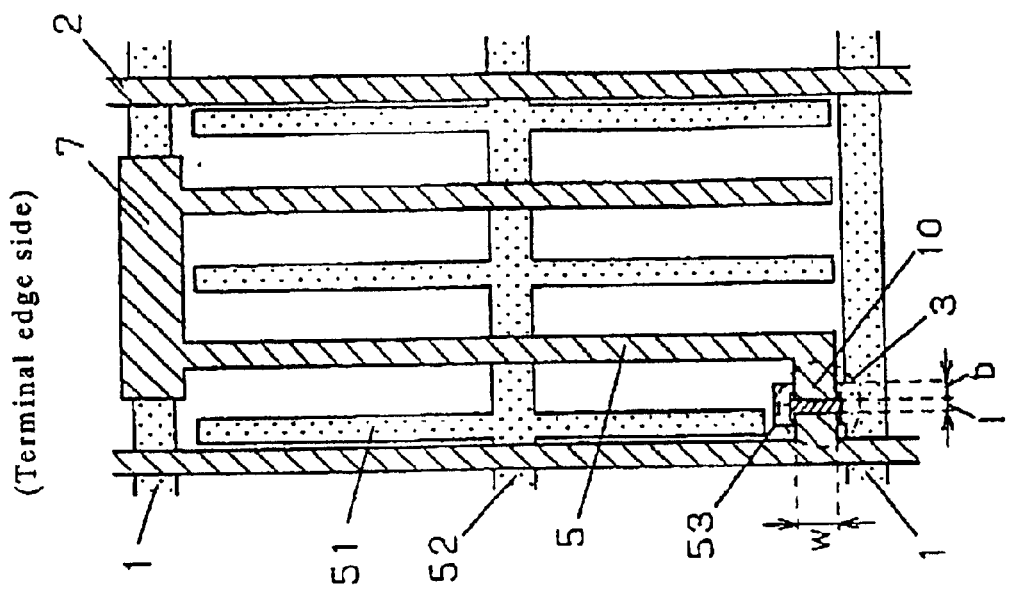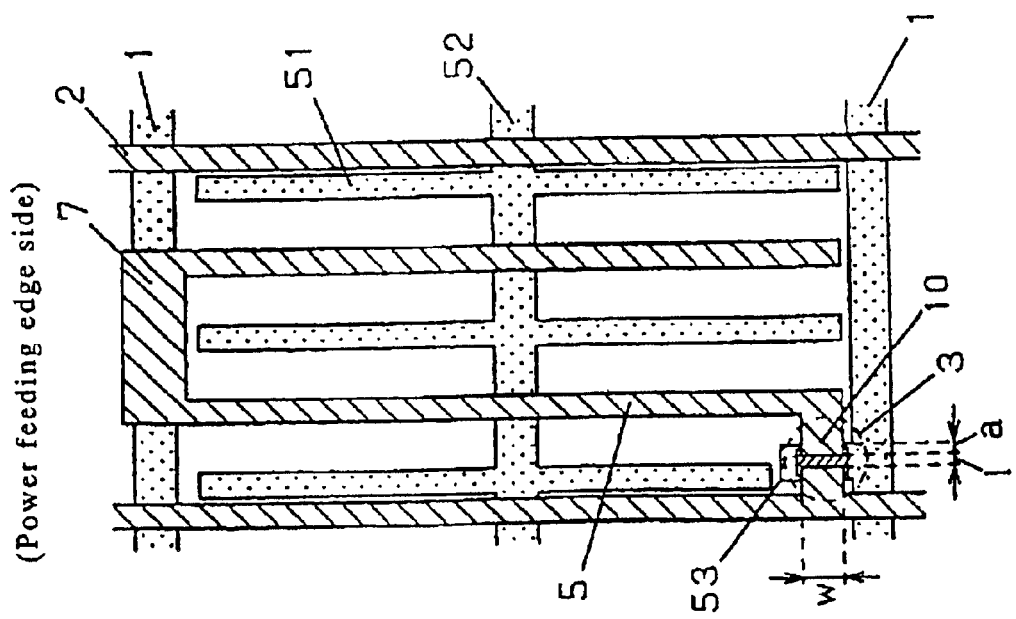
FIG. 5

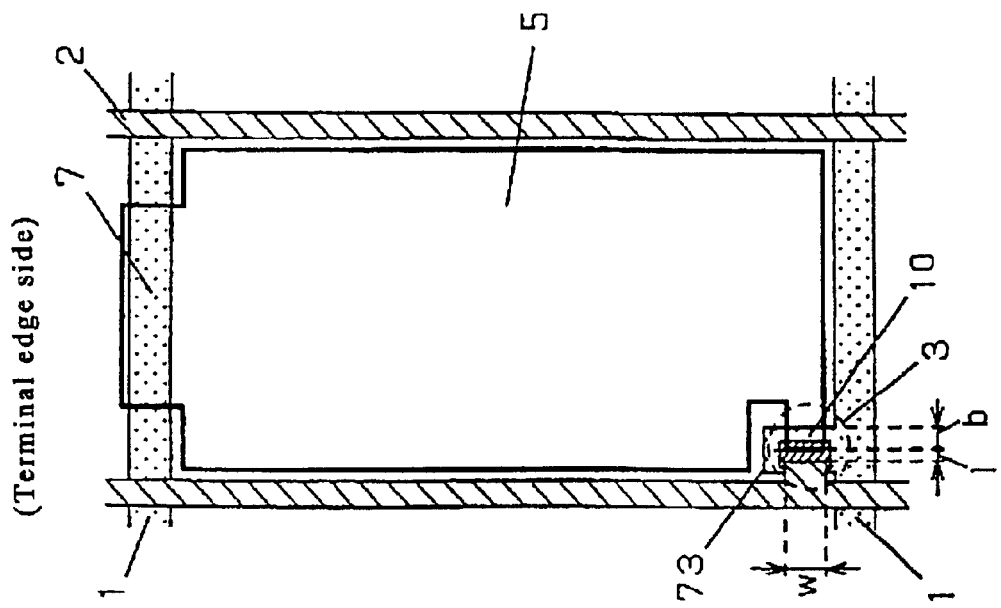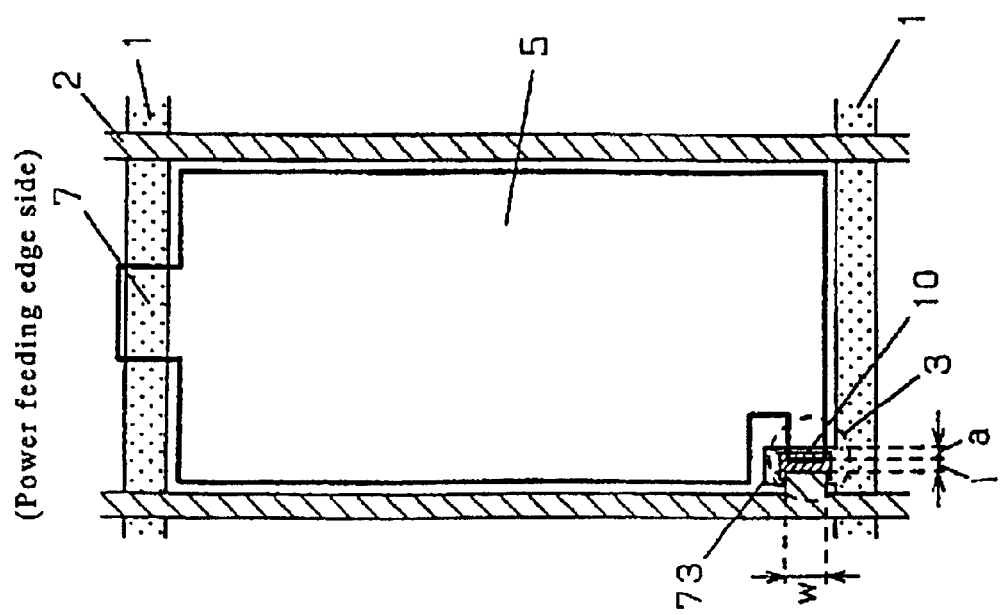
FIG. 7

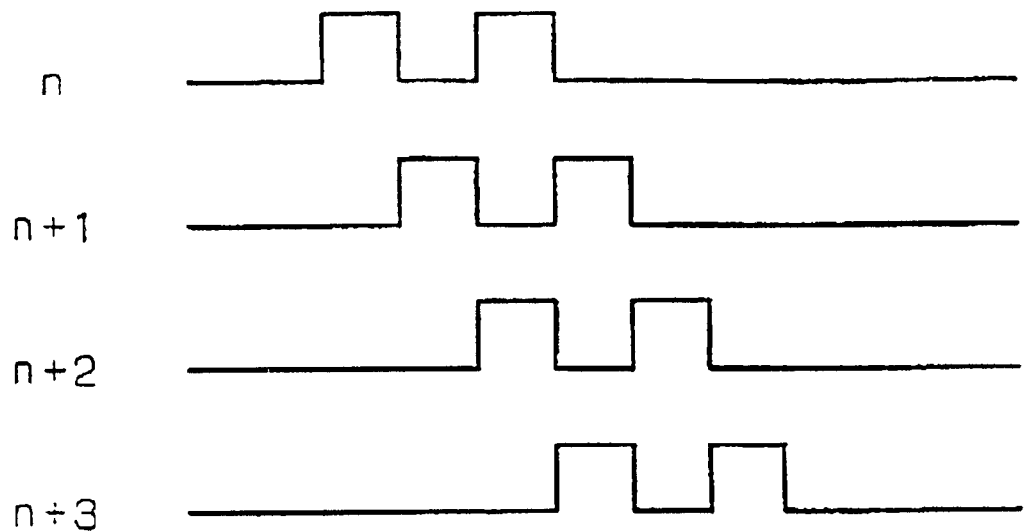
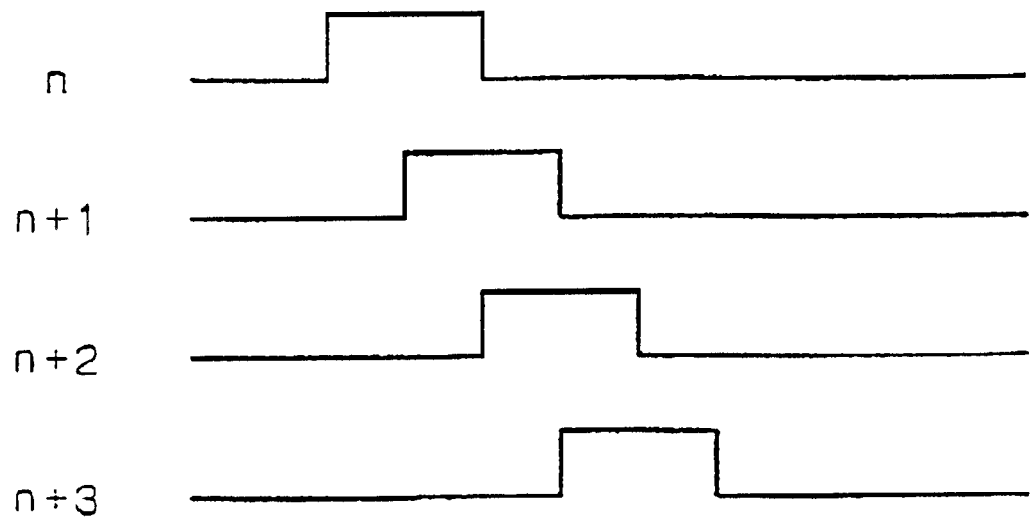
FIG. 27

(a)
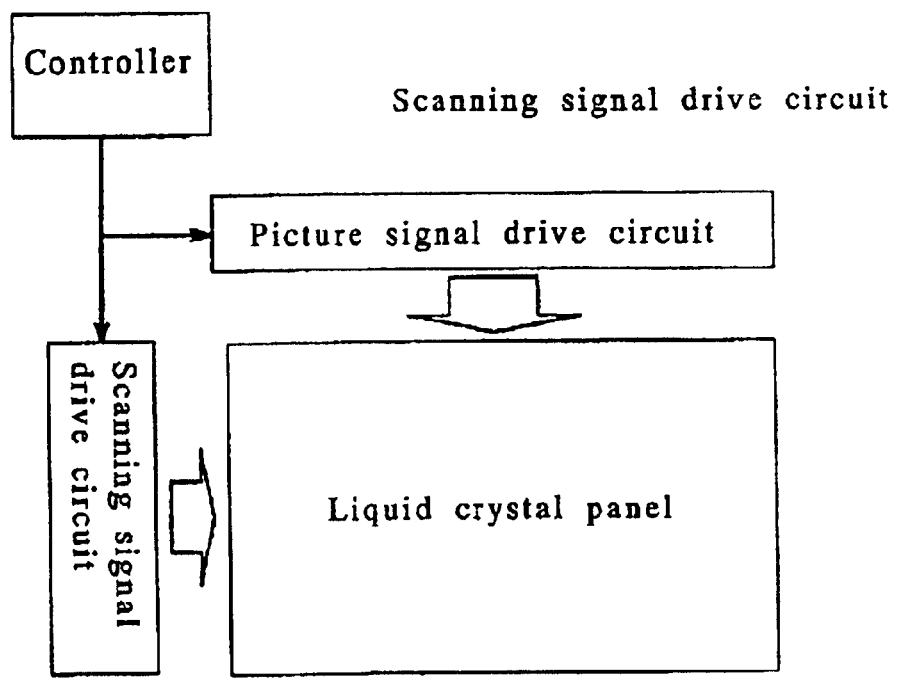
(b)
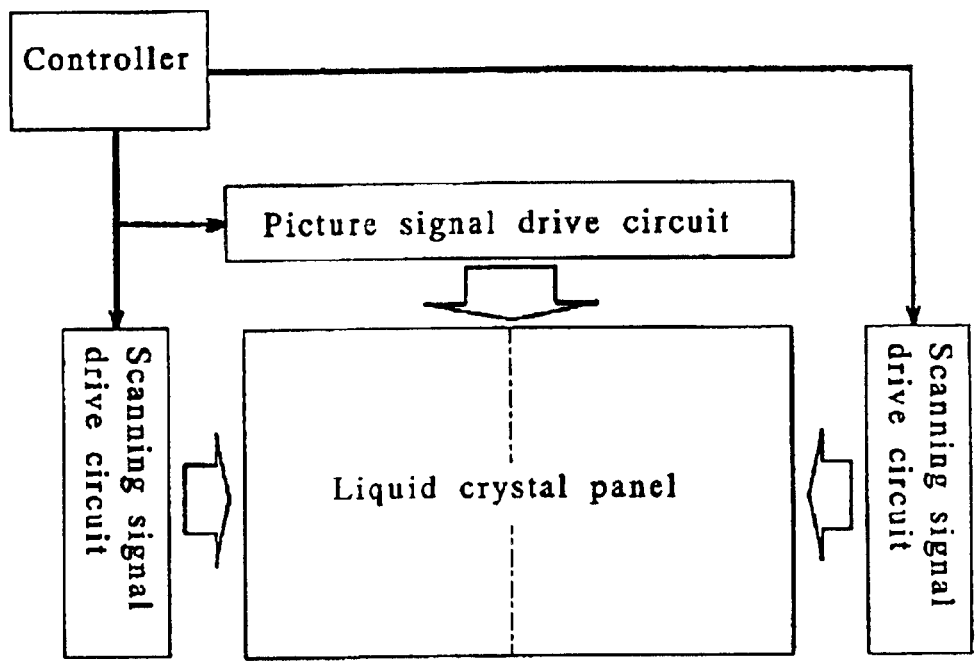
FIG. 29

(Power feeding edge)      (Terminal edge)
Source voltage      Source voltage
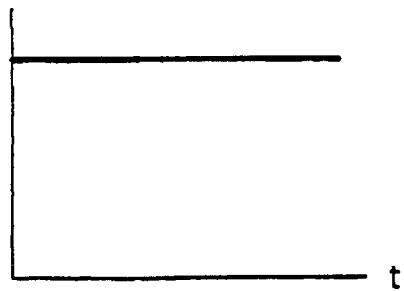 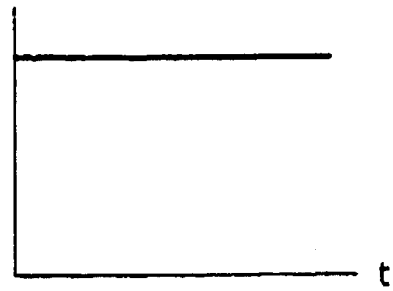
Gate voltage      Gate voltage
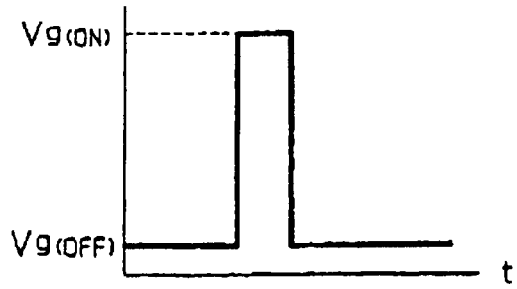 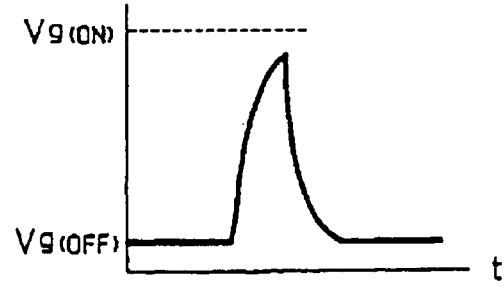
Pixel voltage      Pixel voltage
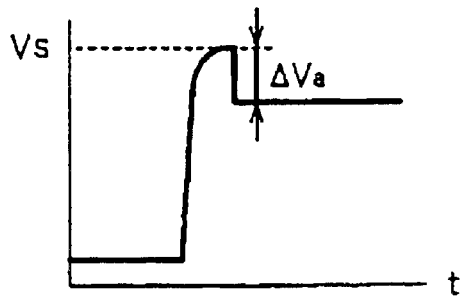 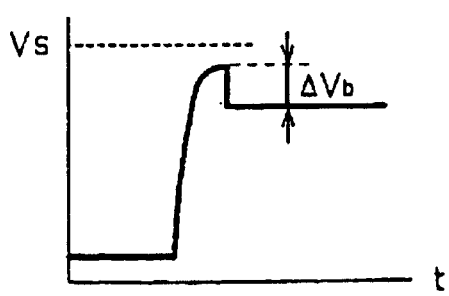
FIG. 40     (PRIOR ART)

DISPLAY UNIT AND DRIVE METHOD THEREFOR

TECHNICAL FIELD

The present invention relates to an active matrix display apparatus using switching devices such as TFT (Thin-Film-Transistor).

BACKGROUND ART

The liquid crystal display is widely used for display apparatuses of various electronic equipment as a thin, light type flat display. Especially, the liquid crystal display of the active matrix type, which uses switching element such as TFT, is widely employed into the monitor display for the personal computer and the liquid crystal display television, etc. because of its excellent picture displaying ability.

One of the known methods of driving this active matrix type liquid crystal display is the capacitively coupled driving method disclosed in the unexamined Japanese patent application Tokkai-Hei 2-913 or on page 59–62 of AM-LCD95. This method applies overlapping voltage to the pixel electrode voltage through the capacitive coupling between the storage capacitance and the pixel capacitance. Normally, the storage capacitance is formed between pixel electrode and preceding line or latter line of scanning electrode (it is also called as gate electrode or gate line), and the overlapping voltage is supplied by step-shape varying of the preceding line or latter line of the scanning voltage (gate voltage). By this voltage overlapping, the effects of the decrease of the picture signal voltage (source voltage), decrease of the driving electric power, the improvements of the response speed, and the improvements of the driving reliability, etc. are achieved.

FIG. 34 shows an equivalent circuit of a pixel of the liquid crystal display wherein a storage capacitance Cst is formed between the preceding line of the scanning electrode and pixel electrode, and FIG. 35 shows voltages of respective parts when driving the circuit. In FIG. 34, TFT denotes a thin film transistor, Cgd denotes a capacitance between gate and drain, Clc denotes a capacitance between the pixel electrode and common electrode (mainly, it is a capacitance formed by liquid crystal medium, besides, a capacitance formed by an other medium which is arrayed electrically in serial or electrically in parallel may be included. In some cases, such capacitance of an other medium may be arrayed intentionally), Vg(n−1) denotes a voltage of the preceding line scanning electrode, Vg(n) denotes a voltage of the present line scanning electrode, Vs or Vsig denotes a voltage of the picture signal, Vd denotes a voltage of the pixel electrode, and Vc or Vcom denotes a voltage of the common electrode.

The varying of the voltage of the pixel electrode "Vd" is described by referencing FIG. 35. In FIG. 35, both odd number frame and even number frame show the voltage varying of the preceding line and the present line of the scanning electrode. The upper chart shows the preceding line voltage varying of the scanning electrode Vg(n−1), the lower chart shows the present line voltage varying of the scanning electrode Vg(n). In this figure, Vc denotes a common electrode voltage, Vd denotes a pixel electrode voltage, Vsig denotes a picture signal voltage, Vgoff denotes an off-level of the scanning electrode voltage, Vgon denotes an on-level of the scanning electrode voltage, and Vge(+) and Vge(−) denote a compensation voltage.

When using the capacitively coupled driving method, the scanning electrode voltage Vg(n) of the present line varies as follows. First of all, the scanning electrode voltage Vg(n) of the present line becomes ON level Vgon. Next, the scanning electrode voltage Vg(n) of the present line becomes the compensation voltage level Vge(−) in order to turn off the scanning electrode of the present line and to apply overlapping voltage to the pixel electrode voltage Vd of the even number frame of the preceding line or latter line. After the application period of this compensation voltage Vge(−), the scanning electrode voltage Vg(n) of the present line becomes OFF level Vgoff. During the application period of the compensation voltage Vge(−), the scanning electrode voltage Vg(n−1) of the even number frame of the preceding line capacitively coupled with the present line has varied from Vge (+) to Vgoff.

Next, the varying of the pixel electrode voltage Vd of the odd number frame of this line will be described. First of all, when the scanning electrode voltage Vg(n) of the present line becomes ON level Vgon, TFT turns to be ON status. The Pixel electrode voltage Vd is charged to Vsig (−). In the odd frame, the picture signal voltage takes a negative value, and becomes Vsig (−).

Next, the scanning electrode voltage Vg(n) of the present line becomes compensation voltage Vge (−), and TFT becomes OFF level and turns to be OFF. At the moment when this scanning electrode voltage Vg(n) is turned off, the pixel voltage causes voltage drop of ΔV1 by the capacitive coupling of the capacitance formed in TFT and the total capacitance in the pixel.

$$\Delta V1 = \alpha_{gd} \cdot \Delta Vg1 \qquad \text{(Expression 1)}$$

herein, ΔVg1 describes the varying of the scanning electrode voltage Vg(n) shown in (Expression 2), α gd describes the capacitance ratio shown in (Expression 3), Cgd describes the gate-drain inter-electrode capacitance, Clc describes the liquid crystal capacitance, and
Cst describes the storage capacitance.

$$\Delta Vg1 = Vgon - Vge(-) \qquad \text{(Expression 2)}$$

$$\alpha gd = Cgd/(Cst + Cgd + Clc) \qquad \text{(Expression 3)}$$

Next, though the scanning electrode voltage of the even number frame in the preceding line varies from Vge (+) to Vgoff, the coupling voltage ΔV2 proportional to this voltage difference is overlapped downward to the pixel electrode voltage Vd because the pixel electrode of the present line and the scanning electrode of the preceding line are capacitively coupled by the storage capacitance Cst. This overlapping voltage ΔV2 is described by the following expressions (Expression 4).

$$\Delta V2 = \alpha st \cdot \Delta Vge(+) \qquad \text{(Expression 4)}$$

In this application, ΔVge (+) describes the varying of the scanning electrode voltage Vg(n−1) of the preceding line shown by (Expression 5), α st describes the capacitive ratio shown by (Expression 6).

$$\Delta Vge(+) = Vge(+) - Vgoff \qquad \text{(Expression 5)}$$

$$\alpha st = Cst/(Cst + Cgd + Clc) \qquad \text{(Expression 6)}$$

Next, the scanning electrode voltage of the present line varies from the compensation voltage Vge (−) to Vgoff. At this moment, the pixel voltage causes the voltage varying of ΔV3 by the capacitive coupling of the capacitance formed in TFT and the total capacitance in the pixel. This varying voltage ΔV3 is shown by the following expressions (Expression 7).

$$\Delta V3 = \alpha gd \cdot \Delta Vge(-)$$ (Expression 7)

In this application, ΔVge (−) describes the varying of the scanning electrode voltage Vg(n) of the present line shown by (Expression 8), α gd describes the capacitive ratio shown by (Expression 3).

$$\Delta Vge(-) = Vge(-) - Vgoff$$ (Expression 8)

By the above-mentioned voltage varying, the pixel electrode voltage Vd becomes Vdo (−) shown by (Expression 9).

$$Vdo(-) = Vsig(-) - \Delta V1 - \Delta V2 - \Delta V3$$
$$= Vsig(-) - \alpha gd \cdot \Delta Vg1 - \alpha st \cdot$$
$$\Delta Vge(+) - \alpha gd \cdot \Delta Vge(-)$$ (Expression 9)

As for the even number frame, the pixel electrode voltage can be analyzed as the same. It becomes Vdo (+) shown by (Expression 10), and Vdo (+) will be maintained to the following scanning period. In the even number frame, the picture signal voltage Vsig takes a positive value, and becomes Vsig (+). After charging the pixel electrode voltage Vd to Vsig (+), the compensation voltage Vge(+) is applied to the present line, the negative compensation voltage Vge (−) is overlapped to the scanning electrode of the odd number frame in preceding line.

$$Vdo(+) = Vsig(+) - \alpha gd \cdot \Delta Vg2 - \alpha \; st \cdot \Delta Vge(-) - \alpha gd \cdot \Delta Vge(+) \text{ herein,}$$
$$\Delta Vg2 = Vgon - Vge(+)$$ (Expression 10)

By this result, while supplying the voltage of a small amplitude (Vsig (+) and Vsig (−)) to the picture signal electrode, the voltage of bigger amplitude (Vdo (+) and Vdo (−)) than this can be applied to the pixel electrode. For example, by using an IC for the picture signal of five volts in output voltage width, the width of the voltage applied to the liquid crystal can be expanded to 10 volts or 15 volts, it becomes possible that the liquid crystal is driven by the voltage more than the permissible voltage.

In the above-mentioned description, ΔV1 is treated as a feed-through voltage, however, a voltage fluctuation caused by the total variance of the scanning electrode voltage Vg of the present line can be included in the feed-through voltage. In this case, the feed-through voltage can be said as the merged value of the above-mentioned ΔV1 and ΔV3. The feed-through voltage in this case is defined as ΔVa, it is shown by (Expression 11)

$$\Delta Va = \alpha \; gd \cdot \Delta Vgon$$ (Expression 11)

In this application, ΔVgon is described as ΔVgon= (Vgon−Vgoff). It is an outline of the configuration and driving of the active matrix type liquid crystal display by using the capacitively coupled driving method in the prior art.

Next, the method of the polarity inversion drive of the signal voltage used to decrease the horizontal cross talk by the capacitively coupled driving method is described.

As described by FIG. 35, the signal voltage whose polarity is inverted every one frame is charged to the pixel electrode. In this case, polarity may be arranged as the same through an entire screen and the polarity may be inverted by every one frame (field inversion method). In addition, there are other methods such as a method for inverting polarity every one line (line inversion method), a method for inverting polarity every one column (column inversion method), and a method for inverting polarity by a checkered pattern by combining the line inversion method and the column inversion method (dot inversion method). Drawing the charged pattern of the pixel by these methods yields FIG. 36(a), FIG. 36(b), FIG. 36(c) and FIG. 36(d). As for the respective methods, when drawing the voltage waveform applied to the picture signal electrode VSP and VSQ which is adjacent each other, it becomes the waveform shown at the right-hand side of each figure. As for the field inversion method and the column inversion method, the polarity of the picture signal applied to the picture signal electrode in one frame is constant. As for the line inversion method and the dot inversion method, the polarity of the picture signal is inverted by each selection of the scanning electrode. In case of the field inversion method and the line inversion method, the polarity between the picture signal electrodes adjacent each other is the same, however, in the case of the column inversion method and the dot inversion method, the polarity becomes opposite.

Among each of these methods, in the field inversion method and the line inversion method, the horizontal cross talk is generated easily. It is explained in detail in S. Tomita et. al.: Journal of the SID, 1/2 (1993) pp211–218). The summary is described as follows.

In the field inversion method and the line inversion method, when a certain scanning electrode is selected and the pixel is charged, all pixels are charged by the same polarity. That is, the pixel electrode voltage Vd of the present line varies all together from a negative voltage to a positive voltage in the case of the even number field, and varies all together from a positive voltage to a negative voltage in the case of the odd number field. In this case, the voltage of a common electrode fluctuates through the capacitance between the pixel electrode and the common electrodes (the capacitance of the liquid crystal is included) (the common electrode has a finite sheet resistance, on condition that the voltage on screen edge is fixed, the voltage in the screen inside will be slightly fluctuate.), the voltage charged in the pixel also receives the influence and is fluctuated, and the cross talk is generated. This is a cross talk that is generated by that the common electrode voltage Vc becomes different value before and after the scanning pulse applying because the common electrode voltage Vc is fluctuated and the voltage Vdo(±) of the latched value of the pixel electrode does not become a value shown by (Expression 9) or (Expression 10).

On the contrary, in the case of the column inversion method and the dot inversion method, when the scanning electrode of a certain line is selected and the pixel is charged, the voltage fluctuations of a common electrode through a capacitance between a pixel electrode and a common electrode counterbalance each other because the polarity of the charge between pixels which are adjacent is opposite, so the above-mentioned cross talk is not generated.

The column inversion method or the dot inversion method might be adopted for the above-mentioned reasons.

However, when arranging the circuit of FIG. 34 in the matrix in order to compose an array shown in FIG. 37, it is difficult to adopt the column inversion method or the dot inversion method because of following reason. In case of the column inversion method or the dot inversion method, for instance, in FIG. 37, a scanning electrode G1 is selected, and a pixel (pixel between the scanning electrode G0 and G1) which belongs to this scanning electrode is charged, the pixel is charged with the reversed polarity between adjacent pixels, however, the overlapping voltage supplied from the scanning electrode G0 is the same polarity over all pixels of this line, so the effect of the amplitude increase of the latched voltage of the pixel electrode is not achieved through all pixels.

FIG. 38 is known as a pixel circuit structure to solve the above-mentioned problem. This is a structure described by page 195 to 198 of Proceedings of the Fourth International Display Workshop. The feature is to invert the layout of the pixel up and down every one row. By this method, when scanning electrode G1 is selected in FIG. 38, the pixel enclosed with ○ is charged. The scanning electrode at the connection destination of the storage capacitor is different between adjacent pixels (scanning electrode G0 and G2). If different values of the compensation voltage are applied to the scanning electrode G0 and G2, different values of the overlapping voltage can be supplied to each pixel. Thus, by using the column inversion method or the dot inversion method, for example, if a signal of a positive polarity is applied to the picture signal electrode S1 (or, Sn) and a signal of a negative polarity is applied to the picture signal electrode S2 (or, Sn+1), the overlapping voltage of the same polarity as the picture signal written in both pixels can be added by applying a compensation voltage Vge(−) to the scanning electrode G0 and applying a compensation voltage Vge(+) to the scanning electrode G2, so the effect of the amplitude increase can be achieved.

The dot inversion method is taken as an example, a concrete scanning electrode signal drive waveform is shown in FIG. 39. In the odd number frame, when the scanning electrode G1 is selected (period indicated by (B) in the figure) and the picture signal electrode S1 is a positive polarity and the picture signal electrode S2 is a negative polarity, the voltage applied to G0 is set as Vge(−), G2 is set as Vge(+). On the contrary, in the even number frame, when the scanning electrode G1 is selected (period indicated by (E) in the figure), in this case, the picture signal electrode S1 is a negative polarity and the picture signal electrode S2 is a positive polarity, the voltage applied to G0 is set as Vge(+), and G2 is set as Vge(−). The period shown by (A) or (D) is the period which is preceded by one scanning period (an interval of a broken line in the figure is called one scanning period) from the period of (B) or (E). The scanning electrode G0 is selected and the scanning electrode G1 becomes a compensation voltage (the voltage of the preceding line of the G0 (it is not shown in the figure) also becomes a compensation voltage), and the voltage of G1 can be set as Ve(+) or Ve(−). Regarding the period shown by (C) or (F), the scanning electrode G2 is selected and the scanning electrode G1 becomes a compensation voltage (the voltage of the latter line of the G2 (it is not shown in the figure) also becomes a compensation voltage), and in this case, the same as above, the voltage of G1 can be set as Ve(+) or Ve(−). Thus, the voltage waveform of G0, G1 and G2 in the figure are obtained as a voltage waveform which should be applied to the scanning electrode.

The dot inversion method is described above. In the same way, it is possible to consider the column inversion method.

By adopting the drive of structure shown in FIG. 38 and FIG. 39, both the merit of a capacitive coupling that the voltage of the picture signal electrode drive circuit can be reduced and the merit of the column inversion method/dot inversion method that a horizontal cross talk can be decreased are obtained at the same time, and it is possible to achieve both the low-cost and the high resolution picture. This is a description of the method of the signal voltage inversion drive.

The prior art explained in the above-mentioned had the following problems.

An irregular display is a problem along with a demand for increased size and a demand for high resolution of the liquid crystal display.

The first cause of the irregular display is related to the distortion of the scanning voltage waveform caused by the CR time constant of the scanning lines, and the charge of the pixel electrode voltage becoming insufficient by the pixel position. Because the amount of a waveform distortion is different in the feeding power edge and the wiring terminal of the scanning voltage, the difference is generated in the pixel voltage, and this difference is seen as an irregular display. When the screen enlarges, the wiring resistance and the wiring capacitance grow, and the scanning time of the scanning lines shortens because of making to the high resolution, this irregular display becomes more remarkable. This is a problem for enlarging and increasing resolution.

FIG. 40 is a figure simply describing the principle by which a charge becomes insufficient and irregular display is generated because of the distortion of the scanning voltage waveform caused by the CR time constant of scanning lines. The left side of this figure in order shows a signal voltage Vs, a scanning electrode voltage Vg, and a pixel electrode voltage Vd of a TFT connected with a feeding power edge pixel, and the right side of this figure in order shows a signal voltage Vs, a scanning electrode voltage Vg, and a pixel electrode voltage Vd of a TFT connected with a terminal pixel.

As shown by the first line of FIG. 40, the same signal voltage Vs is supplied to the signal electrode of each pixel through the respective picture signal electrode.

In the pixel on the feeding power edge, as shown by the second line and third line of the left figure, when the gate voltage becomes ON level (Vg(ON)), the TFT become ON states, and the pixel electrode voltage Vd is charged toward signal voltage Vs. Next, when the scanning voltage turns to be OFF level (Vg(OFF)), the pixel electrode voltage Vd is decreased only by feed-through voltage ΔVa shown by (Expression 11) depending on the capacitance ratio because of the influence of the voltage descending.

The scanning voltage waveform is gradually distorted as it approaches the terminal by the influence of the scanning wiring time constant. When the distortion is large, the scanning voltage waveform of the terminal pixel is distorted and does not reach Vg(ON) as shown by the second line in the right of FIG. 40. As a result, the pixel charge becomes insufficient and the pixel electrode voltage Vd does not reach Vs as shown by the third line. The decrease amount (ΔVb) of the pixel electrode voltage Vd by the capacitive coupling becomes smaller than that of the feeding power edge (ΔVa) because the width of descending voltage of the scanning voltage waveform at the terminal is smaller than that at the feeding power edge. Thus, the irregular display is generated by the distortion of the scanning voltage waveform caused by the CR time constant of the scanning line.

The second cause of the irregular display is the re-charge phenomenon caused by the shift of the transistor switching timing because of the distortion of the scanning voltage waveform. When the scanning voltage distortion is generated in the liquid crystal display which uses the TFT, the pixel electrode voltages Vds become irregular according to the pixel position because the re-charge phenomenon is caused by the following reasons even though the charge is completely performed until the pixel electrode voltage Vd becomes the signal voltage Vs. FIG. 41 is a figure which shows the reason easily.

The uniform display is conducted through the entire screen, as shown in the first line, and the signal voltage Vs supplied from the picture signal line does not depend on the pixel position and is constant. As shown in the second line, the scanning voltage waveform at the terminal is distorted by the influence of the CR time constant though the scanning voltage waveform supplied from the scanning electrode is a rectangular wave in the feeding power edge.

Next, as shown in the third line, the scanning electrode Vg became a ON state, and it is assumed that the pixel electrode voltage Vd is charged until it reaches the signal voltage Vs.

Next, paying attention to the timing of shifting of the scanning voltage from Vgon to Vgoff. The voltage varying becomes steep and is generated quickly at an edge part of the screen near the feeding power edge part connected with the scanning signal drive circuit, and on the contrary, the voltage varying becomes gentle at the part far from the feeding power edge (the vicinity of center of the screen when feeding power is given from both right and left sides of the screen, the edge of the screen which is not the side connected with the scanning signal drive circuit when feeding power is given only from one side) because the distortion is caused in the waveform by the CR time constant of the scanning electrode. The scanning electrode voltage waveform shown in a near part and a far part from the feeding power edge becomes the one shown by the second line. The pixel electrode voltage Vd is almost equal to the picture signal voltage Vsig when completing the charge, the feed-through voltage is caused as Vg varies because of the capacitive coupling by Cgd of the circuit of FIG. 34. The feed-through voltage is shown by ΔVa shown by (Expression 11) regardless of the distance from the feeding power edge.

Next, the scanning electrode Vg changes to become a compensation voltage (for instance, Vge (−)). TFT does not become an OFF state at once when the scanning electrode voltage descends, and TFT becomes an OFF state for the first time when the the scanning electrode voltage passes the switching threshold (the voltage at which only the threshold voltage is higher than the picture signal electrode voltage). It is assumed that the switching at the terminal edge is delayed for the period of Δt until the scanning electrode voltage reaches the threshold Vth of the transistor because of the distortion in the scanning electrode voltage waveform.

During the period of Δt, which is from the beginning of descending of the scanning electrode voltage until the passage of the switching threshold, the electric current will flow into the TFT in order to compensate for the voltage difference between the picture signal electrode and the pixel electrodes (between the source and the drain of TFT). By this reason, the absolute value for an actual varying of the pixel electrode voltage Vd becomes smaller than |ΔVa|. When the voltage difference caused by the electric current flowing into the TFT is described as Δva', as shown in the third line, the value for a varying of the pixel electrode voltage Vd falls down Δva' amount compared with the voltage at the power feeding edge. The voltage waveform becomes gentle and the time span for the TFT turning to OFF becomes longer as the distance increases from the power feeding edge of the scanning signal drive circuit to the TFT, and Δva' is considered to become large as the distance from the power feeding edge to the TFT becomes large. The electric current flowing at that moment is called re-charge current and the voltage difference Δva' is called re-charge voltage.

By this re-charge voltage, as shown in the third line of the FIG. 41, the pixel electrode voltage Vd at the terminal edge becomes Δva' higher than that of the power feeding edge. As a result, according to the pixel position, the DC level of the pixel electrode voltage Vd shifts, and the irregular display such as flicker phenomenon is generated.

The third cause of the irregular display is a problem that the transistor switching timing is shifted between the odd number frame and the even number frame caused by the distortion of the scanning voltage waveform, which becomes a problem in the case of adopting the method of the signal voltage inversion drive.

As described in the above-mentioned prior art, regarding the method of the signal voltage inversion drive, the compensation voltage overlapped to the scanning voltage is different between the odd number frame and the even number frame. In the above-mentioned description, Vge (−) is overlapped as a compensation voltage in the odd number frame, and Vge (+) is overlapped as a compensation voltage in the even number frame. As described in the second causes, when there is a distortion in the scanning voltage waveform by the CR time constant, when the scanning voltage turns to the low voltage Vge (−), the scanning voltage comes to reach the threshold early because the voltage waveform varies steeply. On the other hand, when the scanning voltage turns to the high voltage Vge (+), the scanning voltage comes to reach the threshold slowly because varying of the voltage waveform becomes dull. The re-charge period described in the above-mentioned second cause comes to differ if the transistor switching timing is different. As a result, according to the pixel position, the DC level of the pixel electrode voltage Vd shifts, and the irregular display such as flicker phenomenon is generated.

When the liquid crystal display adopts either the above-mentioned column inversion methods or the dot inversion method, the irregular display is observed as a stripe (stripes pattern) in the vertical direction because this irregular display is a light and shade pattern of the brightness of every column. When the liquid crystal display adopts either the above-mentioned column inversion methods or the dot inversion method, the pixel P and the pixel Q in FIG. 38 has the mirror plane symmetry structure, but the operation is not necessarily symmetric. As shown in FIG. 39, there is a difference that the scanning electrode which becomes the compensation voltage when a certain scanning electrode is selected is located at the rear side in case of pixel P, and at the front side in case of pixel Q when the scanning direction is defined as a direction from top to bottom By the difference of this compensation voltage, the voltage effective value applied to the pixel electrode by the re-charge phenomenon is different, and, as a result, the difference of the display brightness is generated.

The fourth cause of the irregular display is a problem that the transistor switching timing is shifted by the difference whether the signal voltage applied to the pixel electrode is a positive direction or a negative direction. When the liquid crystal display adopts either the above-mentioned column inversion methods or the dot inversion method, and if there is a distortion in the scanning voltage waveform, because of the difference of whether the signal voltage is applied in a positive direction and the pixel electrode voltage Vd is a positive charge or the signal voltage is applied in a negative direction and the pixel electrode voltage Vd is a negative charge, the transistor switching timing shifts. When the transistor switching voltage just passes the voltage that is higher by a certain threshold voltage than the picture signal electrode voltage Vsig, the transistor is turned off. The transistor switching timing comes to differ according to whether the picture signal electrode voltage Vsig is positive or negative. The re-charge period described in the above-mentioned second cause and the third cause comes to differ if the transistor switching timing is different. As a result, according to the pixel position, the DC level of the pixel electrode voltage Vd shifts, and the irregular display such as flicker phenomenon is generated.

FIG. 42 is a diagram showing the above-mentioned third cause and fourth cause. The waveform seen when the scanning voltage descends from Vgon is different depending whether the compensation voltage is the positive compensation voltage Vge(+) in the even number frame or the compensation voltage is the negative compensation voltage Vge(−) in the odd number frame. Moreover, as the threshold value at which the transistor becomes off is different depending whether the charge of the pixel electrode voltage Vd is a positive charge or a negative charge, the timing when the transistor turns to off shifts between the four patterns Δt1 to Δt4.

In the prior art, the technology disclosed in the JPA Tokkai-Hei 5-232509 is known to ease the above-mentioned second irregular display cause. In this technology, the value of the storage capacitance, which is formed in parallel to each pixel capacitance, increases at the power feeding edge of the scanning electrode and decreases at the terminal edge of the scanning electrode according to the position of the pixel, and the charging property of the terminal side pixel is improved and the charging property is adjusted to be uniform. At the terminal side pixel, because the denominator of the expression 6 becomes small, the feed-through voltage at the terminal side pixel is increased to the re-charge voltage, which is higher than the feed-through voltage at the power feeding edge, and displaying is adjusted to be uniform.

FIG. 43 is a circuit diagram showing the structure of the circuit shown in the JPA Tokkai-Hei 5-232509. In this figure, 201 denotes a thin film transistor (TFT), GL denotes a scanning electrode, DL denotes a picture signal electrode, CLC denotes a pixel capacitance. CSCA-CSCC denote storage capacitance which are formed between the pixel electrode and the common electrode. The storage capacitance CSCA-CSCC become large at the power feeding edge of the scanning electrode (CSCA) and become small at the terminal edge (CSCC). It is not shown in the figure, but there is a gate-drain capacitance CGD between the scanning electrode (gate of the TFT) and the pixel (drain of the TFT). In this publication, a pixel layout shown in FIG. 44 is disclosed. Area of overlap part of the pixel electrode 220 and the common electrode 213 is reduced from the left toward the right, and the value of the storage capacitance is varied by each pixel.

However, in the technology disclosed in the JPA Tokkai-Hei 5-232509, the storage capacitance formed on the scanning electrode varies according to the pixel position, the influence of coupling voltage and transistor off leak shown by (Expression 1) or (Expression 4) comes to be different in each pixel, so there is a problem that a new pixel irregular voltage is generated, and thus, it is not a sufficient solution.

DISCLOSURE OF THE INVENTION

Therefore, with the foregoing in mind, it is an object of the present invention to provide a large-type display apparatus and a high resolution-type display apparatus in which display irregularity is reduced.

In order to achieve the objects, a first display apparatus of the present invention comprises a plural pixel electrode arranged in a matrix, a switching element connected with the pixel electrode, a scanning electrode, a picture signal electrode, an opposite electrode forming a capacitance with the pixel electrode, further comprising a storage capacitance between the pixel electrode and the scanning electrode excluding the scanning electrode of the present line; more than two capacitance elements connected with the pixel electrode, wherein at least one of a gate-drain inter-electrode capacitance of the switching element and the storage capacitance are included, and have different value according to the distance from the power feeding edge of the scanning electrode; wherein, all capacitance connected with the pixel electrode in a pixel is denoted as Ctot, the gate-drain inter-electrode capacitance of the switching element is denoted as Cgd, the storage capacitance is denoted as Cst, a first capacitance ratio α gd shown by (Expression 12) increases continuously or in stages according to the distance from the power feeding edge of the scanning electrode.

$$\alpha gd = Cgd/Ctot \tag{Expression 12}$$

This embodiment makes it possible to compensate the deviation of the DC level of the pixel electrode voltage, to reduce a flicker, and to reduce the difference of the coupling voltage overlapped to the pixel electrode voltage and achieve uniform brightness.

If the capacitances connected with the pixel electrode are only Cgd, Clc and Cst, the total capacitance Ctot connected with the pixel electrode becomes Ctot=Cgd+Clc+Cst, but if there is other capacitance connected with the pixel electrode, this other capacitance is included in Ctot. Moreover, if there is a capacitance formed in parallel to the gate-drain inter-electrode Cgd, this capacitance is also included in the gate-drain inter-electrode Cgd. It is preferable that in the first display apparatus, both the gate-drain inter-electrode capacitance and the storage capacitance increase according to the distance from the power feeding edge of the scanning electrode.

This embodiment makes it possible to maintain the liquid capacitance (opposite electrode-pixel electrode inter-electrode capacitance) constantly, and increase the first capacitance ratio α gd continuously or in stages according to the distance from the power feeding edge of the scanning electrode so that the rate of aperture does not fluctuate by the pixel position.

Next, it is preferable that in the first display apparatus, both the gate-drain inter-electrode capacitance and the storage capacitance decrease according to the distance from the power feeding edge of the scanning electrode.

This embodiment also makes it possible to keep the liquid capacitance (opposite electrode-pixel electrode inter-electrode capacitance) constant, and increase the first capacitance ratio α gd continuously or in stages according to the distance from the power feeding edge of the scanning electrode so that the rate of aperture does not fluctuate by the pixel position.

Next, it is preferable that in the first display apparatus, both the storage capacitance and a capacitance formed between the opposite electrode and the pixel electrode decrease according to the distance from the power feeding edge of the scanning electrode.

This embodiment makes it possible to maintain the gate-drain inter-electrode capacitance Cgd, increase the first capacitance ratio α gd continuously or in stages according to the distance from the power feeding edge of the scanning electrode. The merit in maintaining the capacitance Cgd between gate-drain inter-electrode to be constant and controlling an other parameter is that it is easier to control the first capacitance ratio α gd by varying other parameters than to control the first capacitance ratio α gd by varying the first capacitance Cgd when the Cgd is small.

It is preferable to put the area of the shading part (for example, a black matrix part) constantly to maintain the rate of aperture it be constant even if the pixel configuration varies.

Next, it is preferable that in the display apparatus, each capacitance element of the pixel is set so the second capacitance ratio α st shown by (Expression 13) is substantially constant.

$$\alpha st = Cst/Ctot \qquad \text{(Expression 13)}$$

This embodiment makes it possible to reduce the difference of the coupling voltage overlapped to the pixel electrode voltage and achieve uniform brightness.

Next, it is preferable that in the first display apparatus, each capacitance element of the pixel is set so the second capacitance ratio α st increases continuously or in stages according to the distance from the power feeding edge of the scanning electrode.

It is considered that the influence of the re-charge is not equal in the positive and negative field, and therefore, this embodiment makes it possible to reduce the difference of the coupling voltage overlapped to the pixel electrode voltage and achieve uniform brightness.

Next, it is preferable that in the first display apparatus, the display medium is a liquid crystal.

Next, it is preferable that the first display apparatus further comprises a means for overlapping a voltage to the driving circuit of the scanning signal via the storage capacitance.

This embodiment makes it possible to achieve the capacitively coupled driving method by level switching of the scanning voltage signal Here, it is preferable that in the first display apparatus, the driving circuit of the scanning signal comprises the output voltage of more than four values.

Next, it is preferable that in the first display apparatus, the voltage via the storage capacitance is applied to the pixel electrode after applying the voltage via the switching element.

This embodiment makes it possible to reduce the influence of the time constant of the scanning electrode in the capacitively coupled driving method and to drive the liquid crystal display of large-scale and high resolution by low voltage.

In order to achieve the objects, a second display apparatus of the present invention comprises plural pixel electrodes arranged in a matrix, a switching element connected with the pixel electrode, a scanning electrode, a picture signal electrode, an opposite electrode forming a capacitance with the pixel electrode, a storage capacitance electrode, further comprising a first storage capacitance between the pixel electrode and the scanning electrode excluding the scanning electrode of the present line, and a second storage capacitance between the pixel electrode and the storage capacitance electrode.

This embodiment makes it possible to ease the decrease of the pixel charge time and an increase of the re-charge time according to the distance from the power feeding edge of the scanning lines, which is caused by the influence of the time constant of the scanning lines. In short, because a part of the storage capacitance is on the storage capacitance electrode, the time constant of the scanning lines is decreased, and the distortion of the scanning voltage waveform is decreased, the pixel charge time is kept long, and the re-charge time can be decreased, the irregular brightness due to the pixel charge shortage and the flicker due to the difference of the re-charge of the pixel can be reduced.

Next, it is preferable that in the second display apparatus, all capacitance connected with the pixel electrode in a pixel is denoted as Ctot, the gate-drain inter-electrode capacitance of the switching element is denoted as Cgd, the first storage capacitance is denoted as Cst1, a second storage capacitance is denoted as Cst2, the third capacitance ratio α gd1 shown by (Expression 14) increases continuously or in stages according to the distance from the power feeding edge of the scanning electrode.

$$\alpha gd1 = Cgd/Ctot \qquad \text{(Expression 14)}$$

If the capacitances connected with the pixel electrode are only Cgd, Clc and Cst, the total capacitance Ctot connected with the pixel electrode becomes Ctot=Cgd+Clc+Cst, but if there is other capacitance connected with the pixel electrode, this other capacitance is included in Ctot. Moreover, if there is a capacitance formed in parallel to the gate-drain inter-electrode Cgd, this capacitance is also included in the gate-drain inter-electrode Cgd.

This embodiment makes it possible to divide the storage capacitance into two parts and compensate the difference of the amount of the re-charge, and to compensate the deviation of the DC level of the pixel electrode voltage, to reduce a flicker, and to reduce the difference of the coupling voltage overlapped to the pixel electrode voltage and achieve uniform brightness.

Next, it is preferable that in the second display apparatus, the gate-drain inter-electrode capacitance increases according to the distance from the power feeding edge of the scanning electrode.

Next, it is preferable that in the second display apparatus, more than two capacitance elements connected with the pixel electrode, including at least one of a gate-drain inter-electrode capacitance, the first storage capacitance, and the second storage capacitance, have different values according to the distance from the power feeding edge of the scanning electrode.

This embodiment makes it possible to compensate the deviation of the DC level of the pixel electrode voltage, to reduce a flicker, and to reduce the difference of the coupling voltage overlapped to the pixel electrode voltage and achieve uniform brightness.

Next, it is preferable that in the second display apparatus, both the gate-drain inter-electrode capacitance and the first storage capacitance increase according to the distance from the power feeding edge of the scanning electrode.

This embodiment makes it possible to maintain the liquid capacitance (opposite electrode-pixel electrode inter-electrode capacitance) constant, and increase the third capacitance ratio α gd1 continuously or in stages according to the distance from the power feeding edge of the scanning electrode so that the rate of aperture does not fluctuate by the pixel position.

Next, it is preferable that in the second display apparatus, the gate-drain inter-electrode capacitance increases according to the distance from the power feeding edge of the scanning electrode and the second storage capacitance decreases according to the distance from the power feeding edge of the scanning electrode.

This embodiment also makes it possible to maintain the liquid capacitance (opposite electrode-pixel electrode inter-electrode capacitance) constant, and increase the third capacitance ratio α gd1 continuously or in stages according to the distance from the power feeding edge of the scanning electrode so that the rate of aperture does not fluctuate by the pixel position.

Next, it is preferable that in the second display apparatus, both the first storage capacitance and the second storage capacitance decrease according to the distance from the power feeding edge of the scanning electrode.

This embodiment makes it possible to maintain the liquid capacitance (opposite electrode-pixel electrode inter-electrode capacitance) constant, so that the rate of aperture of each pixel does not fluctuate by the distance from the power feeding edge of the scanning electrode pixel position. Moreover, this embodiment makes it possible to maintain the gate-drain inter-electrode capacitance Cgd constant and increase the third capacitance ratio α gd1 continuously or in stages according to the distance from the power feeding edge of the scanning electrode. The merit for maintaining the capacitance Cgd between gate-drain inter-electrode to be constant and controlling an other parameter is that it is easier to control the third capacitance ratio α gd1 by varying other parameters than to control the third capacitance ratio α gd1 by varying the capacitance Cgd when the Cgd is small.

Next, it is preferable that in the second display apparatus, the capacitance ratio Cst1/Cst2 is substantially constant.

This embodiment makes it possible to compensate the deviation of the DC level of the pixel electrode voltage, to reduce a flicker, and to reduce the difference of the coupling voltage overlapped to the pixel electrode voltage and achieve uniform brightness.

Next, it is preferable that in the second display apparatus, each capacitance element of the pixel is set so the fourth capacitance ratio α st1 shown by (Expression 15) is substantially constant.

$$\alpha\ st1 = Cst1/Ctot \qquad \text{(Expression 15)}$$

This embodiment makes it possible to reduce the difference of the coupling voltage overlapped to the pixel electrode voltage and achieve uniform brightness.

Next, it is preferable that in the second display apparatus, each capacitance element of the pixel is set so the fourth capacitance ratio α st1 increases continuously or in stages according to the distance from the power feeding edge of the scanning electrode. It is considered that the influence of the re-charge is not equal in the positive and negative field. Therefore, this embodiment makes it possible to reduce the difference of the coupling voltage overlapped to the pixel electrode voltage and achieve uniform brightness.

Next, it is preferable that in the second display apparatus, parallel monotonic capacitance between the pixel electrode and the opposite electrode via the display medium is not formed. It is also preferable that in the second display apparatus, the opposite electrode is formed on the substrate on which the pixel electrode is formed. It is also preferable that in the second display apparatus, the opposite electrode is not formed on the substrate on which the pixel electrode is formed, the display medium is controlled by an electric field which is substantially parallel to the substrate and an electric field which has skew relative to the substrate. It is also preferable that in the second display apparatus, the opposite electrodes are formed both in the substrate having the pixel electrode and the substrate opposing that substrate, the display medium is controlled by the electric field which is substantially parallel to the substrate and the electric field which has skew relative to the substrate.

By applying the configuration of the present invention to the display having small display medium capacitance such as an In-plane switching display, either embodiment makes it possible to ease the influence of the voltage fluctuation of the scanning electrode on the pixel electrode voltage and to achieve the effect that the display of the high resolution picture can be performed by preventing generation of a stripe pattern. Next, it is preferable that the second display apparatus further comprises a means for overlapping a voltage to the driving circuit of the scanning signal via the storage capacitance.

This embodiment makes it possible to achieve the capacitively coupled driving method by level switching of the scanning voltage signal Next, it is preferable that in the second display apparatus, the driving circuit of the scanning signal comprises the output voltage of more than four values.

Next, it is preferable that in the second display apparatus, the voltage via the storage capacitance is applied to the pixel electrode after applying the voltage via the switching element.

This embodiment makes it possible to reduce the influence of the time constant of the scanning electrode in the capacitively coupled driving and to achieve the driving of large-scale liquid crystal display and the high resolution with low voltage.

In order to achieve the objects, a third display apparatus of the present invention comprises plural pixel electrodes arranged in a matrix, a switching element connected with the pixel electrode, a scanning electrode, a picture signal electrode, an opposite electrode, further comprising a storage capacitance between the pixel electrode and the scanning electrode excluding the scanning electrode of the present line; wherein, there are plural scanning electrodes connected with one edge of the storage capacitances whose other edges are connected with the pixel electrode of plural pixels belonging to one of the scanning electrodes; wherein, all capacitance connected with the pixel electrode in a pixel is denoted as Ctot, the gate-drain inter-electrode capacitance of the switching element is denoted as Cgd, the storage capacitance is denoted as Cst, both the first capacitance ratio α gd=Cgd/Ctot and the second capacitance ratio α st=Cst/Ctot have a different value according to the scanning electrode to which the storage capacitance is connected.

Next, it is preferable that the third display apparatus further comprises a picture signal drive circuit applying two kinds of picture signals having different polarity from each other to the plural picture signal electrodes at the same time.

Next, it is preferable that in the third display apparatus, among plural pixels belonging to a scanning electrode (scanning electrode "0"), a scanning electrode connected with one edge of a storage capacitance wherein the other edge is connected with a pixel electrode of a pixel belonging to the picture signal electrode that applies a picture signal of the first polarity is a common scanning electrode (it is called as scanning electrode A), and a scanning electrode connected with one edge of a storage capacitance wherein the other edge is connected with a pixel electrode of a pixel belonging to the picture signal electrode that applies a picture signal of the second polarity is also a common scanning electrode (it is called as scanning electrode B), wherein the scanning electrode A and the scanning electrode B are different.

Next, it is preferable that in the third display apparatus, the scanning electrode A is located as the preceding line of the scanning electrode 0, the scanning electrode B is located as the next line of the scanning electrode 0.

Next, it is preferable that in the third display apparatus, when α gd and α st of the pixel whose storage capacitance is connected with the scanning electrode of the preceding line are represented as α gd(P) and α st(P), and α gd and α st of the pixel whose storage capacitance is connected with the scanning electrode of the next line are represented as α gd(Q) and α st(Q), (Expression 16) is satisfied.

$$\alpha\ st(P) < \alpha\ st(Q) \qquad \text{(Expression 16)}$$

Next, it is preferable that the third display apparatus further comprises the scanning signal drive circuit applying the voltage signal to plural scanning electrodes, wherein the scanning signal drive circuit comprises the output voltage more of than four values. Thus the capacitively coupled driving becomes possible by using the same off level voltage through the positive and negative field.

Next, it is preferable that in the third display apparatus, when the scanning electrode 0 is selected, the voltage of the scanning electrode 0 becomes the first voltage level Vgon, the scanning electrode A and the scanning electrode B become the second voltage level Vge(+) and the third voltage level Vge(−) respectively, and during the holding period when the scanning electrode 0 is not selected, the voltage of the scanning electrode 0 becomes the fourth voltage level Vgoff, and (Expression 17) is satisfied.

$$\beta(P) < \beta(Q) \qquad \text{(Expression 17)}$$

wherein $$\beta(P) = \alpha\, st(P)(\Delta Vgec/\Delta Vgon) + \alpha gd(P)$$

$$\beta(Q) = \alpha\, st(Q)(\Delta Vgec/\Delta Vgon) + \alpha gd(Q)$$

wherein $$\Delta Vgec = (Vge(+) + Vge(-))/2 - Vgoff$$

$$\Delta Vgon = Vgon - Vgoff$$

In order to achieve the objects, another configuration of the third display apparatus of the present invention comprises plural pixel electrodes arranged in matrix, a switching element connected with the pixel electrode, a scanning electrode, a picture signal electrode, an opposite electrode, further comprising, a storage capacitance between the pixel electrode and the scanning electrode excluding the scanning electrode of the present line; wherein, all capacitance connected with the pixel electrode in a pixel is denoted as Ctot, the gate-drain inter-electrode capacitance of the switching element is denoted as Cgd, the storage capacitance is denoted as Cst, the second capacitance ratio α st=Cst/Ctot varies according to the distance from the display edge of the scanning electrode.

Next, it is preferable that in the above-mentioned another third display apparatus, the second capacitance ratio α st increases continuously or in stages according to the distance from the display edge of the scanning electrode.

Next, it is preferable that the above-mentioned another third display apparatus further comprises the scanning signal drive circuit applying the voltage signal to a plural scanning electrodes, wherein the scanning signal drive circuit comprises the output voltage of more than four values.

Next, it is preferable that in the above-mentioned another third display apparatus, when a scanning electrode (it is called scanning electrode 0) is selected, the voltage of the scanning electrode 0 becomes the first voltage level Vgon, the voltage of a scanning electrode (it is called scanning electrode A) connected with one edge of a storage capacitance wherein the other edge is connected with a pixel electrode of plural pixels belonging to the scanning electrode becomes the second voltage level Vge(+) and the third voltage level Vge(−) according to the displaying period, and during a holding period when the scanning electrode 0 is not selected, the voltage of the scanning electrode 0 becomes the fourth voltage level Vgoff, and 62 shown by (Expression 18) increases continuously or in stages according to the distance from the display edge of the scanning electrode.

$$\beta = \alpha\, st(\Delta Vgec/\Delta Vgon) + \alpha gd \qquad \text{(Expression 18)}$$

wherein $$\Delta Vgec = (Vge(+) + Vge(-))/2 - Vgoff$$

$$\Delta Vgon = Vgon - Vgoff$$

Next, it is preferable that in the above-mentioned another third display apparatus, the values of α st and β of the scanning electrode at the display edge are represented as α st(0) and β(0), the values of α st−α st(0) and β−β(0) are substantially in proportion to the second power of the distance from the display edge of the scanning electrode.

In order to achieve the objects, another configuration of the third display apparatus of the present invention comprises a pixel electrode arranged in a matrix, a switching element connected with the pixel electrode, a scanning electrode, a picture signal electrode, an opposite electrode, further comprising a storage capacitance between the pixel electrode and the scanning electrode excluding the scanning electrode of the present line; wherein, there are plural scanning electrodes connected with one edge of the storage capacitances whose other edge are connected with the pixel electrode of plural pixels belonging to one of the scanning electrode; wherein, all capacitance connected with the pixel electrode in a pixel is denoted as Ctot, the gate-drain inter-electrode capacitance of the switching element is denoted as Cgd, the storage capacitance is denoted as Cst, both the first capacitance ratio α gd =Cgd/Ctot and the second capacitance ratio α st=Cst/Ctot are the different value according to the scanning electrode to which the storage capacitance is connected, and are varied according to the difference from display edge of the scanning electrode.

Next, it is preferable that the above-mentioned another third display apparatus further comprises a picture signal drive circuit applying two kinds of picture signals having different polarity from each other to the plural picture signal electrodes at the same time.

Next, it is preferable that in the above-mentioned another third display apparatus, among plural pixels belonging to a scanning electrode (scanning electrode "0"), a scanning electrode connected with one edge of a storage capacitance wherein the other edge is connected with a pixel electrode of a pixel belonging to the picture signal electrode that applies a picture signal of the first polarity, is a common scanning electrode (it is called as scanning electrode A), a scanning electrode connected with one edge of a storage capacitance wherein the other edge is connected with a pixel electrode of a pixel belonging to the picture signal electrode that applies picture signal of the second polarity is also a common scanning electrode (it is called as scanning electrode B), wherein the scanning electrode A and the scanning electrode B are different.

Next, it is preferable that in the above-mentioned another third display apparatus, the scanning electrode A is located at the preceding line of the scanning electrode 0, and the scanning electrode B is located as the next line of the scanning electrode 0.

Next, it is preferable that in the above-mentioned another third display apparatus, when α gd and α st of the pixel whose storage capacitance is connected with the scanning electrode of the preceding line are represented as α gd(P) and α st(P), and α gd and α st of the pixel whose storage capacitance is connected with the scanning electrode of the next line are represented as α gd(Q) and α st(Q), (Expression 19) is satisfied.

$$\alpha\, st(P) < \alpha\, st(Q) \qquad \text{(Expression 19)}$$

Next, it is preferable that the above-mentioned another third display apparatus further comprises the scanning signal drive circuit applying the voltage signal to plural scanning electrodes, wherein the scanning signal drive circuit comprises the output voltage of more than four values.

Next, it is preferable that in the above-mentioned another third display apparatus, when the scanning electrode 0 is selected, the voltage of the scanning electrode 0 becomes the first voltage level Vgon, the scanning electrode A and the scanning electrode B become the second voltage level Vge(+) and the third voltage level Vge(−) respectively, and during the holding period when the scanning electrode 0 is not selected, the voltage of the scanning electrode 0 becomes the fourth voltage level Vgoff, and (Expression 20) is satisfied.

$$\beta(P) < \beta(Q) \quad \text{(Expression 20)}$$

wherein $$\beta(P) = \alpha st(P)(\Delta Vgec/\Delta Vgon) + \alpha gd(P)$$

$$\beta(Q) = \alpha st(Q)(\Delta Vgec/\Delta Vgon) + \alpha gd(Q)$$

$$\Delta Vgec = (Vge(+) + Vge(-))/2 - Vgoff$$

$$\Delta Vgon = Vgon - Vgoff$$

Next, it is preferable that in the above-mentioned another third display apparatus, [α st(P)+α st(Q)]/2 varies continuously or in stages according to the distance from the display edge of the scanning electrode.

Next, it is preferable that in the above-mentioned another third display apparatus, when β(P) and β(Q) are shown by (Expression 21), [β(P)+β(Q)]/2 increases continuously or in stages according to the distance from the display edge of the scanning electrode.

$$\beta = \alpha st(\Delta Vgec/\Delta Vgon) + \alpha\ gd \quad \text{(Expression 21)}$$

wherein $$\Delta Vgec = (Vge(+) + Vge(-))/2 - Vgoff$$

$$\Delta Vgon = Vgon - Vgoff$$

Next, it is preferable that in the above-mentioned another third display apparatus, when values of α st(P), α st(Q), β(P) and β(Q) at the display edge of the scanning electrode are described as α st(P,0), α st(Q,0), β(P,0) and β(Q,0), the values of [α st(P)−α st(P,0)+α st(Q)−α st(Q,0)]/2 and [β(P)−β(P,0)+β(Q)−β(Q,0)]/2 are substantially proportion to the second power of the distance from the display edge of the scanning electrode.

Next, it is preferable that in the above-mentioned another third display apparatus, the voltage via the storage capacitance is applied to the pixel electrode after applying the voltage via the switching element.

This embodiment makes it possible to reduce the influence of the time constant of the scanning electrode in the capacitively coupled driving and to achieve the driving of the large-scale liquid crystal display and the high resolution with low voltage.

Next, it is preferable that in the above-mentioned another third display apparatus, the display medium is a liquid crystal.

In order to achieve the objects, a fourth display apparatus of the present invention comprises a source wiring and a gate wiring arranged in matrix; a thin-film-transistor installed corresponding to each intersection of the source wiring and the gate wiring; a pixel electrode connected with the thin-film-transistor; a storage capacitance electrode forming a storage capacitance with the pixel electrode; an opposite electrode formed opposite the pixel electrode on the same substrate or on an other substrate; a gate drive circuit supplying a gate pulse to the gate wiring sequentially; and a source drive circuit supplying a source signal to the source wiring, on the opposite surface of one substrate among two substrates which are opposed each other, wherein the storage capacitance decreases according to the distance from the feeding edge of the gate signal and the thin-film-transistor becomes small according to the decrease of the storage capacitance.

This embodiment makes it possible to make the fluctuation of the pixel electrode voltage due to the off leak of the TFF become same through the entire screen by reducing the size of the TFT according to the decrease of the pixel capacitance due to the decrease of the storage capacitance. Moreover, this embodiment makes it possible to reduce the parasitic capacitance in the gate wiring and the source wiring and ease the distortion of the signal by reducing the size of the TFT so that a liquid crystal panel that can reduce the generation of the cross-talk and the flicker can be achieved.

In order to achieve the objects, another configuration of the fourth display apparatus of the present invention comprises a source wiring and a gate wiring arranged in a matrix; a thin-film-transistor installed corresponding to each intersection of the source wiring and the gate wiring; a pixel electrode connected with the TFT; a storage capacitance electrode forming a storage capacitance with the pixel electrode; an opposite electrode formed to oppose the pixel electrode on the substrate or on the other substrate; a gate drive circuit supplying a gate pulse to the gate wiring sequentially; and a source drive circuit supplying a source signal to the source wiring, on the opposite surface of one substrate among two substrates which are opposed each other, wherein the thin-film-transistor is composed of a gate electrode connected with the gate wiring, a source electrode connected with the source wiring and a drain electrode connected with the pixel electrode, and the source electrode and the drain electrode are opposed separated by channel-length L with width W, and the storage capacitance electrode becomes small according to the distance from the feeding edge of the gate signal, and the width W of the channel of the drain electrode of the thin-film-transistor is reduced according to the decrease of the area of the storage capacitance electrode, and the electrostatic capacitance formed by overlapping of the gate and the drain becomes constant.

This embodiment makes it possible to reduce the leak current of the TFT during the gate pulse off-period according to the decrease of the storage capacitance by decreasing the TFT channel width while maintaining the effect of leveling the pixel voltage by decreasing storage capacitance. Therefore, the fluctuation of the pixel electrode voltage becomes the same through the entire screen and the decrease of the generation of the cross-talk and the flicker can be achieved.

Next, it is preferable that in the above-mentioned another fourth display apparatus, the gate pulse is applied to more than two gate wirings at the same time.

This embodiment makes it possible to reduce the decrease in the signal supply ability to pixel because an effect charge period can be made twice or more even when the TFT becomes small in the fourth display apparatus.

In order to achieve the objects, another configuration of the fourth display apparatus of the present invention comprises a source wiring and a gate wiring arranged in a matrix; a thin-film-transistor installed corresponding to each intersection of the source wiring and the gate wiring; a pixel electrode connected with the TFT; a storage capacitance electrode forming a storage capacitance with the pixel electrode; an opposite electrode formed to oppose the pixel electrode on the substrate or on the other substrate, wherein the thin-film-transistor is composed of a gate electrode connected with the gate wiring, a source electrode connected with the source wiring and a drain electrode connected with the pixel electrode, and the source electrode and the drain electrode are separated by channel-length L with width W, and the storage capacitance electrode become smaller according to the distance from the feeding edge of the gate signal, wherein the electrostatic capacitance between the gate electrode and the drain electrode becomes larger according to the decrease in the storage capacitance.

This embodiment makes it possible to reduce the width of the decrease of Cst so that the fluctuation of the pixel electrode voltage by off leak of TFT can be controlled.

Next, it is preferable that in the above-mentioned another fourth display apparatus, the storage capacitance is denoted as Cst, the gate-drain inter-electrode capacitance of the switching element is denoted as Cgd, the electrostatic capacitance between the drain electrode and the opposite electrode is denoted as Clc, the value Cst+Cgd+Clc becomes substantially constant.

This embodiment makes it possible to level the fluctuation of the pixel electrode voltage through the entire screen and the decrease of the generation of the cross-talk and the flicker can be achieved because the entire pixel capacitance becomes constant even when Cst decreases.

Any configuration of the first display apparatus through the fourth display apparatus may further comprise a second switching element wherein the pixel electrode combines the gate electrode of the second switching element or the pixel electrode is connected with the gate electrode of the second switching element.

According to the above-mentioned configuration, the present invention can be applied to the display apparatus comprising 2 switching elements such as an organic electroluminescence display apparatus.

BRIEF DESCRIPTION OF DRAWINGS

FIG. 5 is a circuit diagram showing a configuration of a pixel of a liquid crystal display apparatus according to Embodiment 5 of the present invention.

FIG. 7 is a circuit diagram showing a configuration of the pixel of a liquid crystal display apparatus according to Embodiment 6 of the present invention.

FIGS. 27(*a*) and (*b*) are a diagrams showing the timing of a gate pulse application of a liquid crystal display apparatus according to Embodiment 19.

FIGS. 29(a) is a diagram showing a driving circuit when employing the one side power feeding in a liquid crystal display apparatus of the present invention, and (b) is a diagram showing a driving circuit when employing the both sides power feeding in a liquid crystal display apparatus of the present invention.

FIG. 40 is a diagram showing a waveform of the voltage of each part in a liquid crystal display apparatus in the prior art.

DESCRIPTION OF THE PREFERRED EMBODIMENTS

Hereinafter, Embodiments of the display apparatus of the present invention will be described with reference to the accompanying drawing.

In the following description, Embodiments of the first display apparatus of this invention are shown from Embodiment 1 to Embodiment 6, Embodiments of the second display apparatus of this invention are shown from Embodiment 7 to Embodiment 11, Embodiments of the third display apparatus of this invention are shown from Embodiment 12 to Embodiment 16, and Embodiments of the fourth display apparatus of this invention are shown from Embodiment 17 to Embodiment 20.

In the following Embodiments, the pixel electrode voltage is described as Vd, the picture signal is described as Vs or Vsig, and the common voltage is described as Vc or Vcom.

(Embodiment 1)

Figure 1:
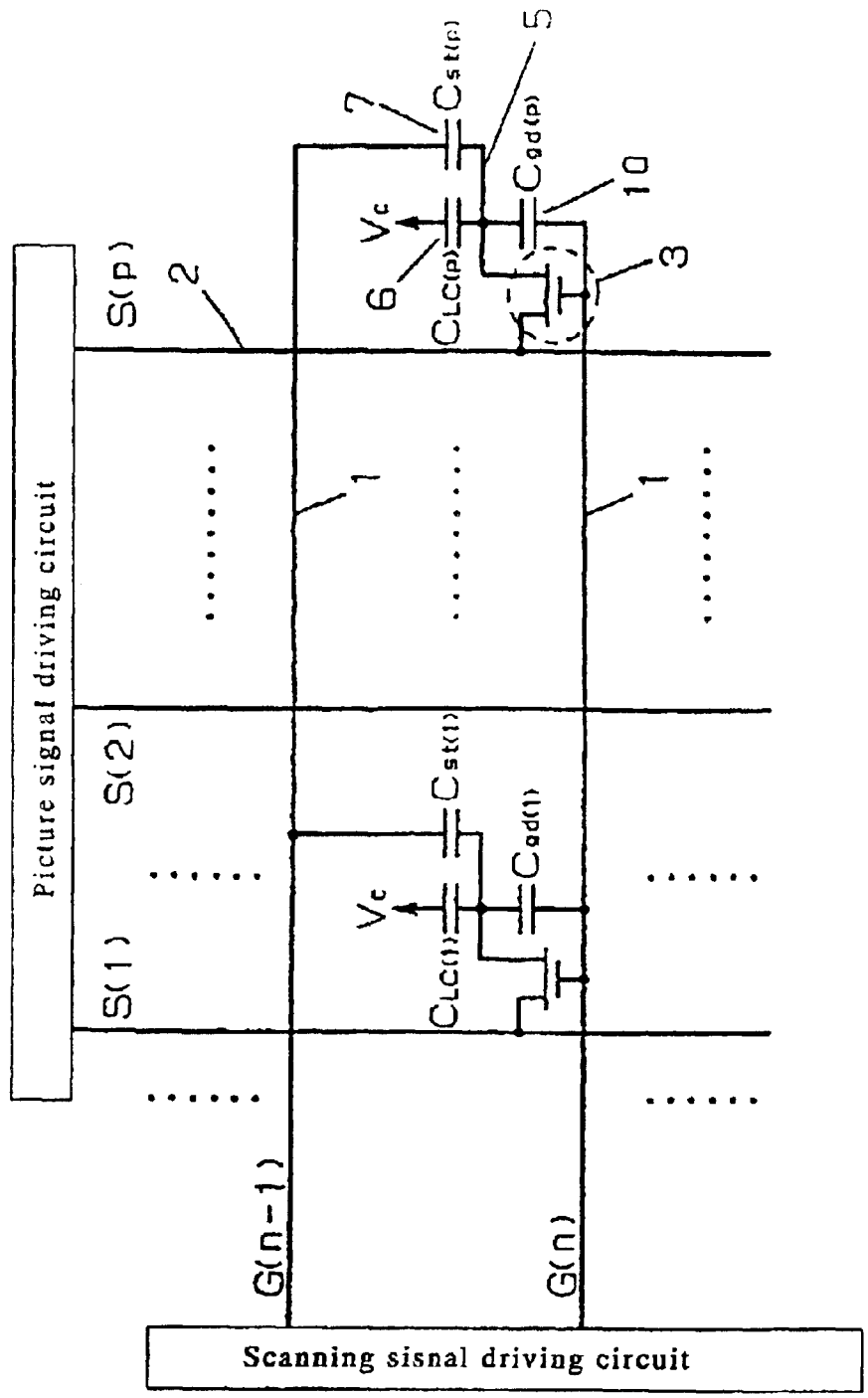
FIG. 1 is a circuit diagram showing a configuration of a liquid crystal display apparatus according to Embodiment 1 of the present invention.

FIG. 1 is a circuit diagram showing a basic configuration of the liquid crystal display apparatus according to Embodiment 1 of the present invention. In FIG. 1, 1 denotes a scanning electrode, and 2 denotes a picture signal electrode wherein thin film transistor (TFT) 3 is formed at the intersection as a TFT switching element. The gate electrode of TFT 3 is connected with the scanning electrode 1, the source electrode is connected with the picture signal wiring 2, and the drain electrode is connected with the pixel electrode 5 respectively.

The pixel comprises two capacitor 6 and 7. A liquid crystal capacitor 6 (Clc) is formed between the picture electrode 5 and the opposite electrode, and the liquid crystal is driven by a voltage applied to the both ends. The opposite electrode voltage Vc is supplied to the opposite electrode.

Storage capacitor 7(Cst) is formed in parallel with the liquid crystal capacitor 6. When the charge leaks from the liquid crystal capacitor 6, this parallel capacitor compensates for this leakage and stabilizes the operation of the liquid crystal. The storage capacitor 7 is formed between the electrode 5 and the scanning electrode 1 of the preceding line. In addition, the gate-drain inter-electrode capacitor 10 (Cgd) is formed between the gate and the drain of TFT.

Though the liquid crystal display apparatus has pixels arranged in the matrix, in the FIG. 1, the pixel of the "n"th line and the surrounding electrode wiring are shown, and other parts are omitted. G(n-1) denotes a scanning electrode of the "n-1" line, and G(n) denotes a scanning electrode of the "n"th line. Also, S(1) denotes a picture signal wiring of the first line, and S(P) denotes a picture signal wiring of the "P"th line.

Both of the storage capacitor (Cgd) and gate-drain inter-electrode capacitor (Cst) are gradually enlarged from the power feeding edge of the scanning electrode (left side in FIG. 1) to the terminal edge (right side in FIG. 1).

In both values, the first capacitance ratio α gd shown in the (Expression 22) is adjusted as being gradually enlarged from the power feeding edge of the scanning electrode to the terminal edge.

$$\alpha\ gd = Cgd/(Ctot) \qquad \text{(Expression 22)}$$

$$\alpha\ gd = Cst/(Ctot) \qquad \text{(Expression 23)}$$

wherein, Ctot denotes all capacitor connected with pixel electrode.

Herein, Ctot usually is calculated as Cst+Cgd+Clc, and when there are other capacitances in the pixel electrode, Ctot includes such other capacitances. In addition, the capacitance formed in parallel with the gate-drain inter-electrode capacitor 10 (Cgd) is included in the Cgd.

This liquid crystal display apparatus is driven as follows. The shape of the driving waveform supplied to each electrode is the one shown in FIG. 35 as in the conventional capacitively coupled driving method. That is, first of all, the on-state voltage is applied to the scanning electrode G(n) of "n"th line, and TFT turns to ON and the pixel is charged. Next, the scanning voltage becomes off level and TFT turns to OFF, and then a step voltage is applied to the scanning electrode G(n-1) of the preceding line and overlapping the coupling voltage through the storage capacitor 7.

Figure 2:
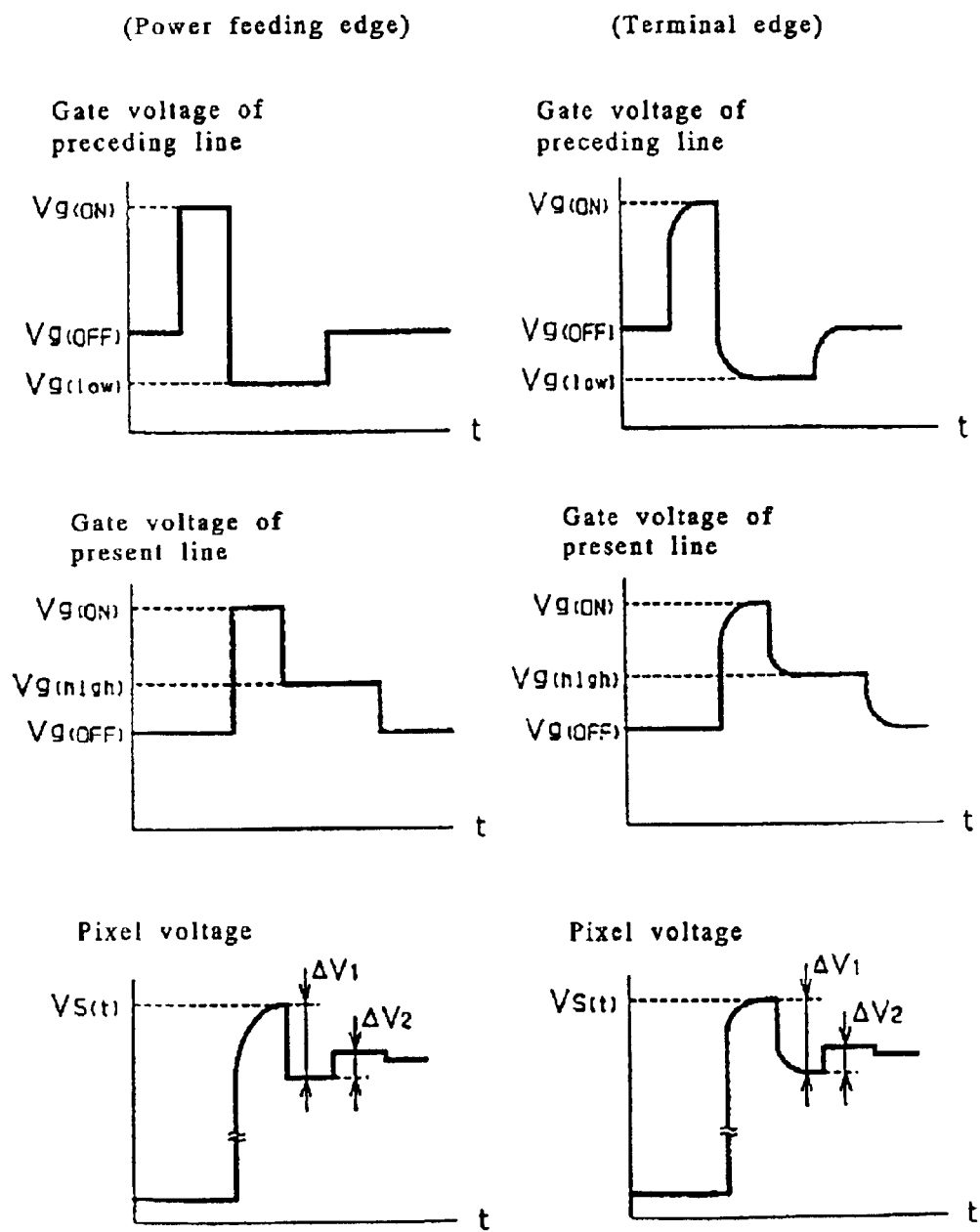
FIG. 2 is a waveform chart for the voltage of each part at odd number frames of a liquid crystal display apparatus according to Embodiment 1 of the present invention.
Figure 3:
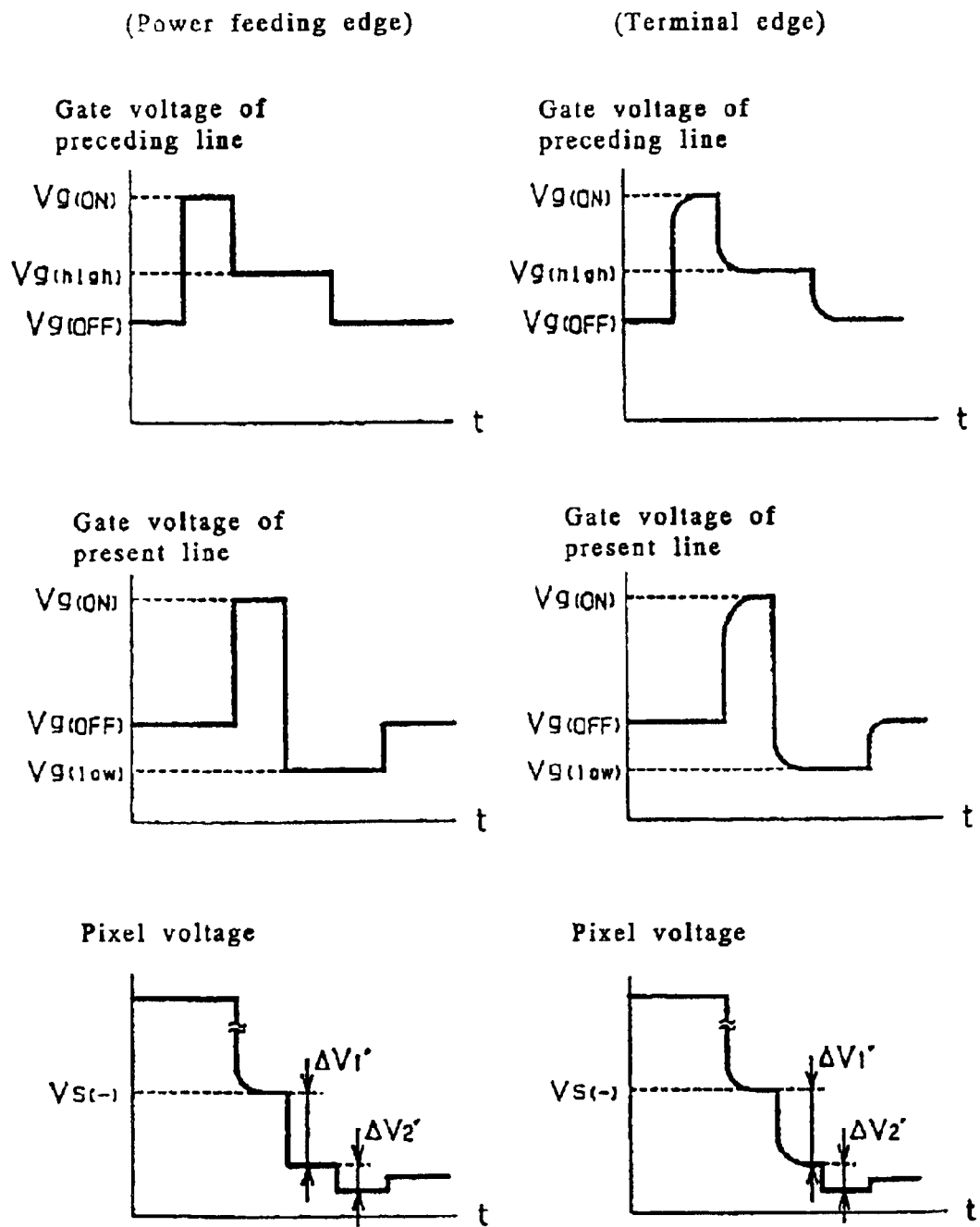
FIG. 3 is a waveform chart for the voltage of each part at even number frames of a liquid crystal display apparatus according to Embodiment 1 of the present invention.

FIG. 2 and FIG. 3 are the diagram showing the time varying of the gate voltage (scanning electrode voltage) and the pixel electrode voltage when capacitively coupled driving is conducted through the storage capacitance on the scanning electrode of the preceding line. Regarding gate voltages connected with this pixel, the gate voltage applied to the TFT (present line) and the gate voltage related to the capacitance coupling (preceding line) are shown. The polarity of the pixel voltage is inverted between pixels adjacent upstream and downstream, a voltage varying of the odd number frame where the pixel is charged to a positive voltage is shown in FIG. 2, and a voltage varying of the even number frame where the voltage polarity is inverted is shown in FIG. 3.

In FIG. 2 and FIG. 3, the pixel is once charged to Vs(+) in the positive charge period and charged to Vs(−) in the negative charge period. Next, when the gate voltage decreases, the pixel electrode voltage is varied by the downward coupling voltage (ΔV1 of FIG. 2 or ΔV1' of FIG. 3). Adjusting the first capacitance ratio α gd to be gradually enlarged from the power feeding edge of the scanning electrode to the terminal edge has the effect that the in-plane distribution of ΔV1 and Δ V1' become uniform.

Afterwards, because the voltage of the preceding line has varied in the step shape, the coupling voltage Δ V2 or Δ V2' is overlapped to the pixel electrode voltage through the storage capacitance. Assuming α st to be an substantially constant in the pixel on the same scanning electrode has the effect that the in-plane distribution of ΔV2 and Δ V2' become uniform.

As a result, for both pixels located far from and near to the scanning electrode power feeding edge, the value where the pixel electrode voltage settles down becomes uniform, and irregular display can be reduced.

Hereafter, these actions are described in detail.

First of all, the effect for adjusting the first capacitance ratio α gd to be gradually enlarged from the power feeding edge of the scanning electrode to the terminal edge is as follows.

Figure 4:
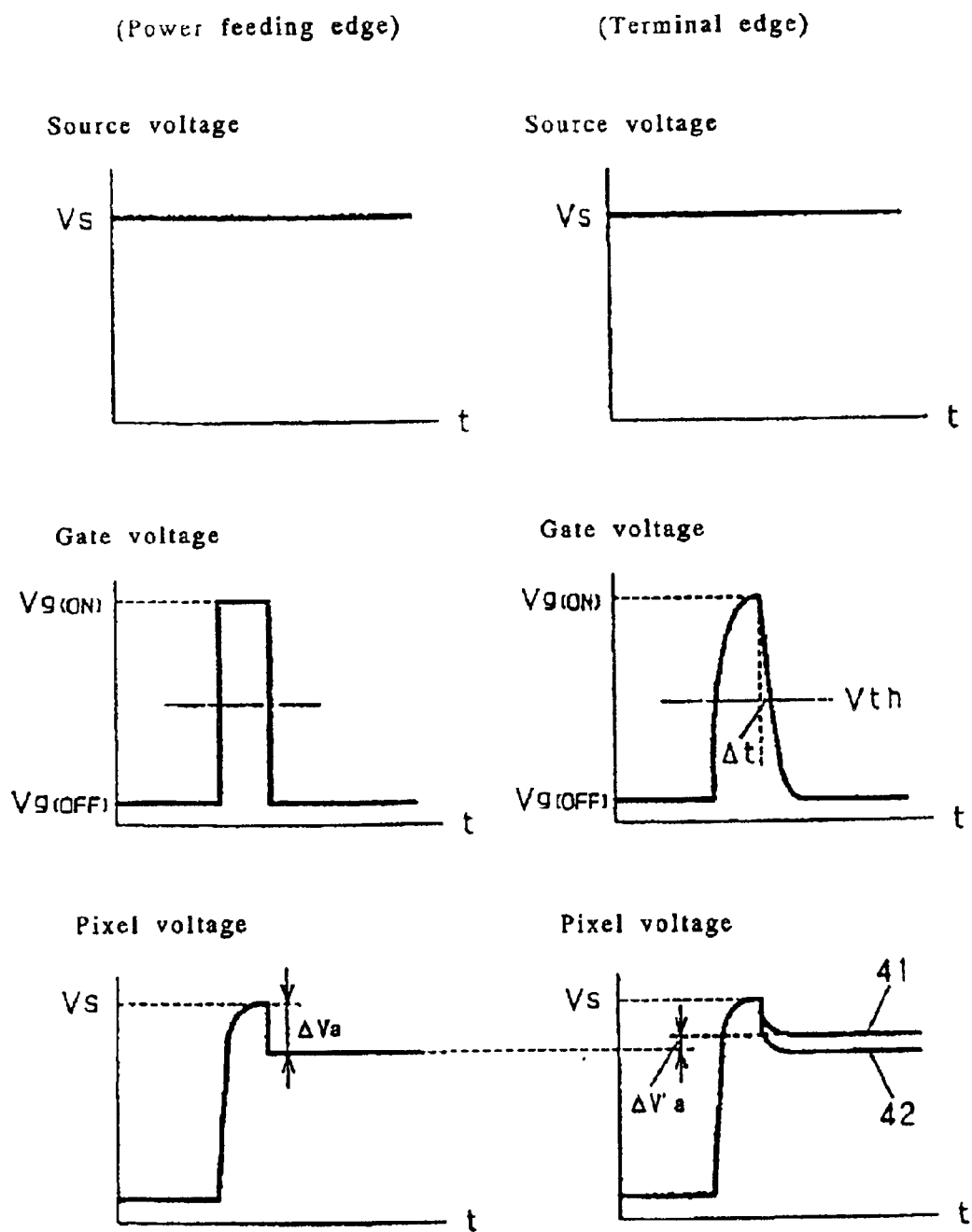
FIG. 4 is a diagram showing the reason why the pixel voltage becomes not uniform even when the charge is completely performed when there is a distortion in the scanning voltage waveform.

When the distortion is caused in the scanning voltage in the liquid crystal display apparatus employing the TFT, even when the charge is completely performed, no uniformity is caused in the pixel voltage for the following reason. FIG. 4 explains these reasons. When the same display is conducted through the entire screen, the source voltage supplied from the picture signal line does not depend on the pixel and is constant. The waveform of the gate voltage supplied from the scanning electrode is a rectangular wave in the feeding power edge, however, it is distorted by the influence of the wiring time constant in the terminal edge as shown in FIG. 4.

After charging the pixel voltage to Vs by turning the gate voltage to ON state, by the influence of the capacitance coupling at the timing when the gate voltage descends, the pixel electrode voltage is decreased by the feed-through voltage ΔVa shown by (Expression 24).

$$\Delta Va = \alpha\ gd \cdot \Delta Vgon \qquad \text{(Expression 24)}$$

ΔVgon shows Vgon−Vgoff in this specification.

Moreover, ΔVa shows the sum of ΔV1 and ΔV3.

In the power feeding edge where there is no distortion in the gate voltage waveform, the TFT becomes the OFF state at once, and pixel electrode voltage Vd settles down in Vs−ΔV1.

On the other hand, the time of Δt is necessary by the time the TFT becomes the OFF state as shown in FIG. 4 because there is a distortion in the gate voltage waveform at the pixel on the terminal edge. Meanwhile, the pixel electrode voltage Vd is charged again toward Vs.

When the first capacitance ratio α gd is constant, the pixel electrode voltage on the terminal edge varies as shown by 41 in FIG. 4 and it becomes the voltage that is higher by ΔV' high from the voltage at the power feeding edge. As a result, the DC level of the pixel electrode voltage becomes different between the power feeding edge and the terminal edge.

Because the liquid crystal display apparatus of this configuration enlarges the first capacitance ratio α gd on the terminal edge of the scanning electrode, ΔV1 enlarges in the terminal edge. The first capacitance ratio α gd is varied in order to enlarge the decrease in voltage by the capacitance coupling at the terminal edge when the gate voltage decreases, and the varying of the pixel electrode voltage moves from the line of 41 to the line of 42 shown in FIG. 4. Therefore, the final voltage level becomes equal at the power feeding edge and the terminal edge, an irregular display for which the flicker etc. are assumed to be a cause is not generated, and the uniform display can be achieved. The degree by which the first capacitance ratio α gd varies can be obtained according to the computer simulation etc. of each part of the voltage waveform.

Next, the effect by which the second capacitance ratio α st is substantially made constant through the pixels on the same scanning electrode is explained as follows.

As shown in FIG. 2 and FIG. 3, when the gate voltage of the preceding line varies in a step shape, the coupling voltage ΔV2 or ΔV2' is overlapped to the pixel electrode voltage through the storage capacitance. This becomes a value in which the second capacitance ratio α st is multiplied by the amount of varying of gate voltage of the preceding line. The amount of varying of the gate voltage of the preceding line takes either of the value of the first expression or the second expression of (Expression 25), and it becomes equal between pixels in the same timing on the same scanning lines.

$$Vg\text{off} - Vg(+)$$
$$Vg\text{off} - Vg(-) \qquad \text{(Expression 25)}$$

Herein Vg(+) denotes an overlapped positive modulation voltage, and Vg(−) denotes an overlapped negative modulation voltage.

So, the second capacitance ratio α st is substantially made constant through the pixels on the same scanning electrode, and the overlapping voltage ΔV2 or ΔV2' does not depend on the pixel and becomes constant. It is necessary for respective voltage of Vg(high), Vg(OFF), and Vg(low) to be set in a range where the transistor of the preceding scanning line does not become ON status in order not to vary the pixel electrode voltage of the preceding line.

Thus, the liquid crystal display apparatus of this Embodiment 1 is composed to satisfy the following three conditions.

(1) Both the storage capacitance (Cst) and the gate-drain inter-electrode capacitance are assumed to be a different value according to the distance from the power feeding edge of the scanning electrode. As one example, the both capacitances are enlarged continuously or in stages from the power feeding edge of the scanning electrode to the terminal edge.

(2) The first capacitance ratio α gd is configured to be enlarged continuously or in stages according to the distance from the power feeding edge of the scanning electrode.

(3) The second capacitance ratio α st in a pixel on the same scanning electrode is configured to be substantially constant.

When an elements are configured to satisfy these conditions, both the voltage varying by the coupling voltage when the gate voltage of the present line descends ($\Delta V1$ of FIG. 2 and $\Delta V1'$ of FIG. 3), and the overlapping voltage by the capacitively coupled driving ($\Delta V2$ of FIG. 2 and $\Delta V2'$ of FIG. 3) are made to be uniform through the screen.

As a result, the following effects can be achieved.
(1) Lowering the picture signal voltage by overlapping the coupling voltage to the pixel voltage and decreasing of driving electric power.
(2) Cancellation of the flicker and irregular brightness by leveling the pixel voltage.
(3) The ratio of aperture is not different according to the pixel position, because the liquid crystal capacitance can be made constant.

(Embodiment 2)

In Embodiment 1, an ideal Embodiment of this invention is described. However, when there are a restriction in the design etc., among three conditions concerning the capacitance shown in Embodiment 1, the effect to some extent can be achieved in practice only by the rest two of three conditions except the condition that "(3) The second capacitance ratio $\alpha$ st in pixel on the same scanning electrode is configured to be substantially constant".

Embodiment 2 shows a configuration wherein the storage capacitance and the gate-drain inter-electrode satisfies the remaining two conditions.

In the conventional configuration, the condition (2) is satisfied by using the configuration where the gate-drain inter-electrode (Cgd) is gradually enlarged from the power feeding edge of the scanning electrode to the terminal edge, or in addition to that configuration, the configuration where the storage capacitance (Cst) is gradually reduced is used.

On the contrary, in Embodiment 2, the condition (2) is satisfied by adjusting both the storage capacitance (Cst) and the gate-drain inter-electrode capacitance (Cgd) to be gradually enlarged from the power feeding edge of the scanning electrode to the terminal edge. $\alpha$ st is defined by (Expression 23).

It is clear from (Expression 23), that the configuration of Embodiment 2, which increases the storage capacitance (Cst), can reduce the fluctuation of the pixel voltage because the fluctuation of $\alpha$ st becomes small compared with the conventional configuration. As a result, flicker and brightness irregularity can be reduced greatly.

(Embodiment 3)

In Embodiment 1 and Embodiment 2, both the storage capacitance (Cst) and the gate-drain inter-electrode capacitance (Cgd) are gradually enlarged from the power feeding edge of the scanning electrode to the terminal edge. This method gradually enlarges the first capacitance ratio $\alpha$ gd from the power feeding edge of the scanning electrode to the terminal edge by the varying of the gate-drain inter-electrode capacitance, and the varying of the second capacitance ratio $\alpha$ st accompanying the enlargement of $\alpha$ gd is canceled or reduced by the varying of the storage capacitance.

On the contrary, Embodiment 3 gradually enlarges the first capacitance ratio $\alpha$ gd from the power feeding edge of the scanning electrode to the terminal edge by the varying of the storage capacitance, and the varying of the second capacitance ratio $\alpha$ st accompanying the enlargement of $\alpha$ gd is canceled or reduced by the varying of the gate-drain inter-electrode capacitance.

The pixel configuration shown in FIG. 1 of the liquid crystal display apparatus in this Embodiment has a configuration which satisfies the following three conditions.
(1) Both the storage capacitance (Cst) and the gate-drain inter-electrode capacitance are assumed to be a different value according to the distance from the power feeding edge of the scanning electrode. As one example, both capacitances are reduced continuously or in stages from the power feeding edge of the scanning electrode to the terminal edge.
(2) The first capacitance ratio $\alpha$ gd is configured to be enlarged continuously or in stages according to the distance from the power feeding edge of the scanning electrode.
(3) The second capacitance ratio $\alpha$ st in pixel on the same scanning electrode is configured to be substantially constant.

The liquid crystal display apparatus of this Embodiment 3 is driven in the same manner as that of Embodiment 1. For the same reasons as described in Embodiment 1, both the voltage varying by the coupling voltage when the gate voltage of the present line decreases ($\Delta V1$ of FIG. 2 and $\Delta V1'$ of FIG. 3), and the overlapping voltage by the capacitively coupled driving ($\Delta V2$ of FIG. 2 and $\Delta V2'$ of FIG. 3) are made to be uniform through the screen.

As a result, the following effects can be achieved.
(1) Lowering the picture signal voltage by overlapping the coupling voltage to the pixel voltage and decreasing of driving electric power.
(2) Cancellation of the flicker and irregular brightness by leveling the pixel voltage.
(3) The ratio of aperture is not different according to the pixel position, because the liquid crystal capacitance can be made constant.

(Embodiment 4)

In Embodiment 3, an ideal Embodiment of this invention is described. However, when there are restrictions in the design etc., among three conditions concerning the capacitance shown in Embodiment 3, the effect to some extent can be achieved in practice only by the rest two of three conditions except the condition that "(3) The second capacitance ratio $\alpha$ st in pixel on the same scanning electrode is configured to be substantially constant".

Embodiment 4 shows a configuration wherein the storage capacitance and the gate-drain inter-electrode satisfies the remaining two conditions.
(1) Both the storage capacitance (Cst) and the gate-drain inter-electrode capacitance are reduced continuously or in stages from the power feeding edge of the scanning electrode to the terminal edge.
(2) The first capacitance ratio $\alpha$ gd is configured to be enlarged continuously or in stages according to the distance from the power feeding edge of the scanning electrode.

In the conventional configuration, the condition (2) is satisfied by using the configuration where the storage capacitance (Cst) is gradually reduced from the power feeding edge of the scanning electrode to the terminal edge, or in addition to that configuration, the configuration where the gate-drain inter-electrode (Cgd) is gradually enlarged is used.

On the contrary, in Embodiment 4, the condition (2) is satisfied by adjusting both the storage capacitance (Cst) and the gate-drain inter-electrode capacitance (Cgd) are gradually reduced from the power feeding edge of the scanning electrode to the terminal edge.

$\alpha$ st is defined by (Expression 23).

It is clear from (Expression 23), that the configuration of Embodiment 4, which varies the gate-drain inter-electrode capacitance (Cgd) can reduce the fluctuation of the pixel voltage because the fluctuation of $\alpha$ st becomes small compared with the conventional configuration. As a result, flicker and brightness irregularity can be reduced greatly.

(Embodiment 5)

This Embodiment 5 show an example where the display apparatus shown either in Embodiment 1 to Embodiment 4 is applied to the In-Plane Switching mode (IPS) liquid crystal display apparatus.

First of all, a basic configuration of the IPS mode liquid crystal display apparatus is described with reference to FIG. 31 and FIG. 32.

Figure 31:
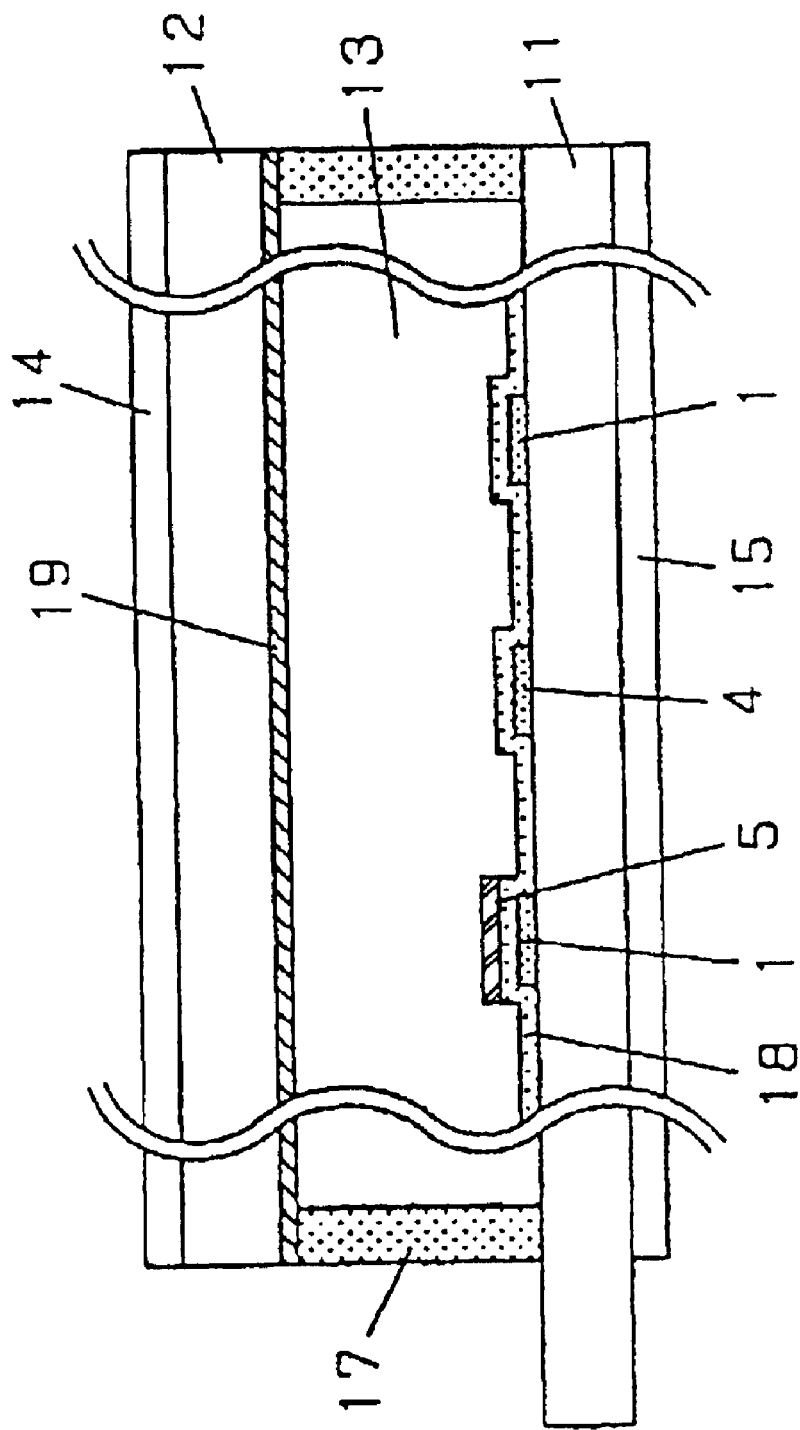
FIG. 31 is a diagram showing a cross section of an IPS liquid crystal display apparatus.
Figure 32:
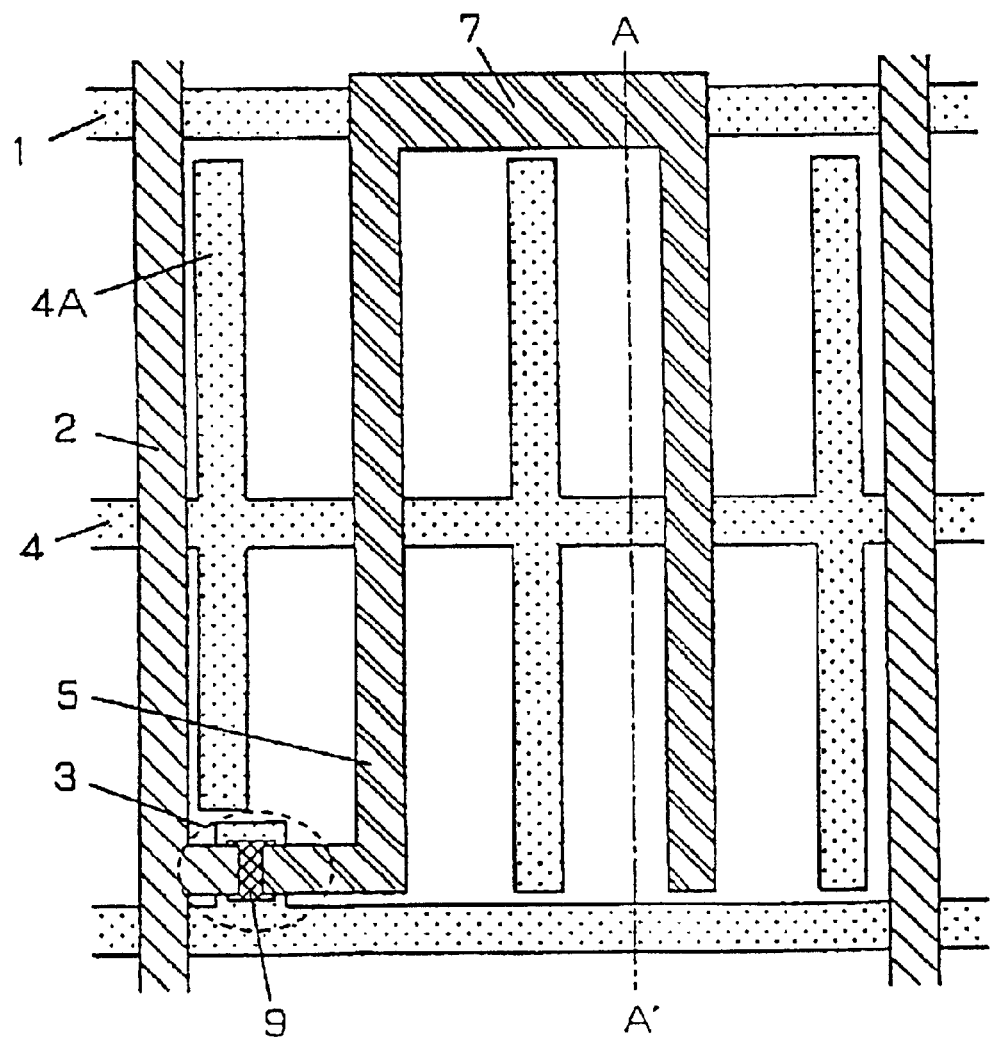
FIG. 32 is a diagram showing a plan view of one pixel of an IPS liquid crystal display apparatus.

FIG. 31 is a diagram showing a cross section of a IPS liquid crystal display apparatus, and FIG. 32 is a diagram showing a plane configuration of one pixel of the IPS liquid crystal display apparatus. The center part of FIG. 31 shows a cross section structure along A–A' line shown in FIG. 32.

Figure 11:
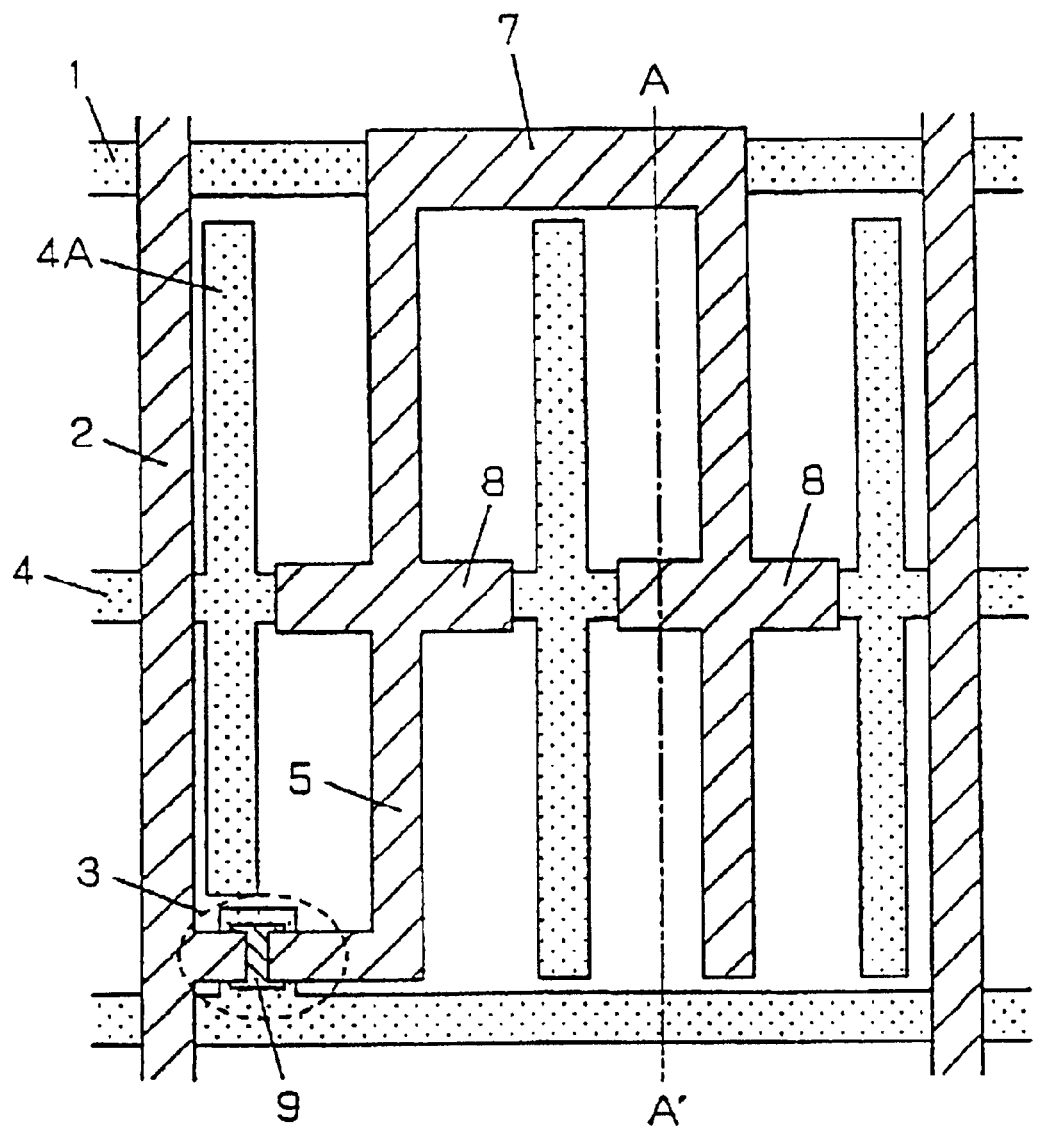
FIG. 11 is a circuit diagram showing a configuration of a pixel of a liquid crystal display apparatus shown in FIG. 10.
Figure 12:
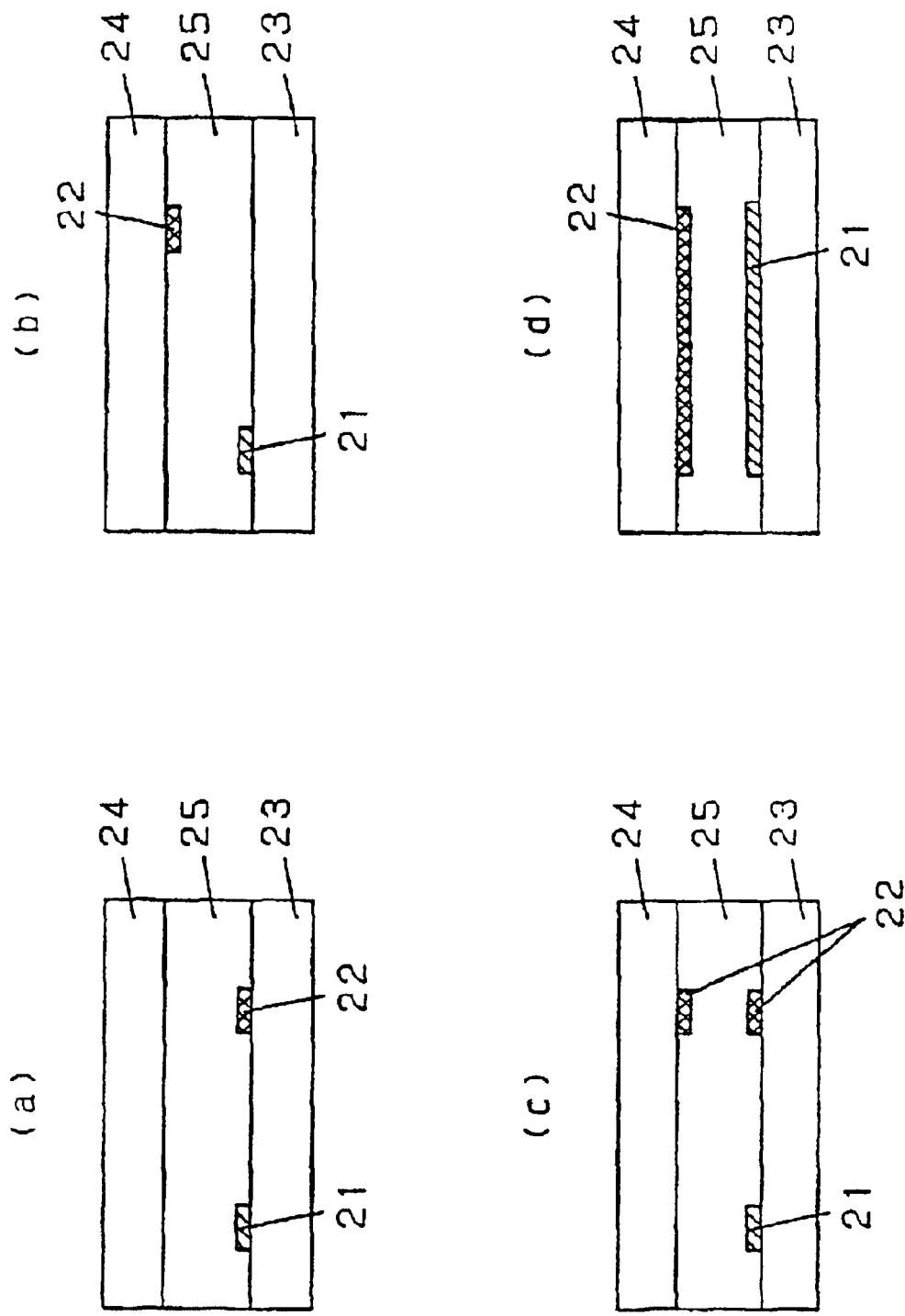
FIG. 12 is a cross section of the electrode configuration in a pixel part of a liquid crystal display apparatus according to Embodiment 9 of the present invention.

In FIG. 31, 11 and 12 are substrates made of glass etc., 11 denotes an array substrate formed with TFTs and electrodes connected with it, and 12 denotes an opposite substrate opposing the array substrate 11. A liquid crystal 13 is inserted between two substrates, and the both ends are sealed by seal 17. 14 and 15 denote polarized light boards to display polarized light, and 19 denotes a color filter to conduct color displaying. The color filter is formed on the opposite substrate 12 side, but it may be formed on the array substrate 11 side.

The scanning electrode 1 and the common electrode 4 are formed by the first conductive layer on the array substrate 11, and the insulation film 18 covers the array substrate 11. The pixel electrode 5 is formed by the second conductive layer on the insulation film 18. As shown in FIG. 32, the overlap part with the scanning electrode 1 in the preceding line comprises the storage capacitance 7 (Cst). Also, the overlap part between the pixel electrode 5 and the scanning electrode 1 in the present line comprises the scanning electrode-pixel electrode capacitance (Cgd).

As shown in FIG. 32, the branch part 4A is formed in the common electrode 4. This faces in parallel to the pixel electrode 5, and works as an opposite electrode to apply the electric field to the liquid crystal layer. The capacitance between the pixel electrode 5 and the common electrode 4 comprises the common electrode-pixel electrode capacitance Clc, and the Clc includes both of the capacitance through the liquid crystal layer and the capacitance formed by geometrical overlap of both electrodes. The capacitance through the liquid crystal layer is difficult to calculate by using the expression, but it may be obtained by measurement, or may be obtained by simulation.

TFT3 is composed of the electrode in 9 and three semiconductor parts, normally the gate electrode connected with the scanning electrode 1, the source electrode connected with the picture signal wiring 2, and the drain electrode connected with the pixel electrode 5 respectively.

Figure 38:
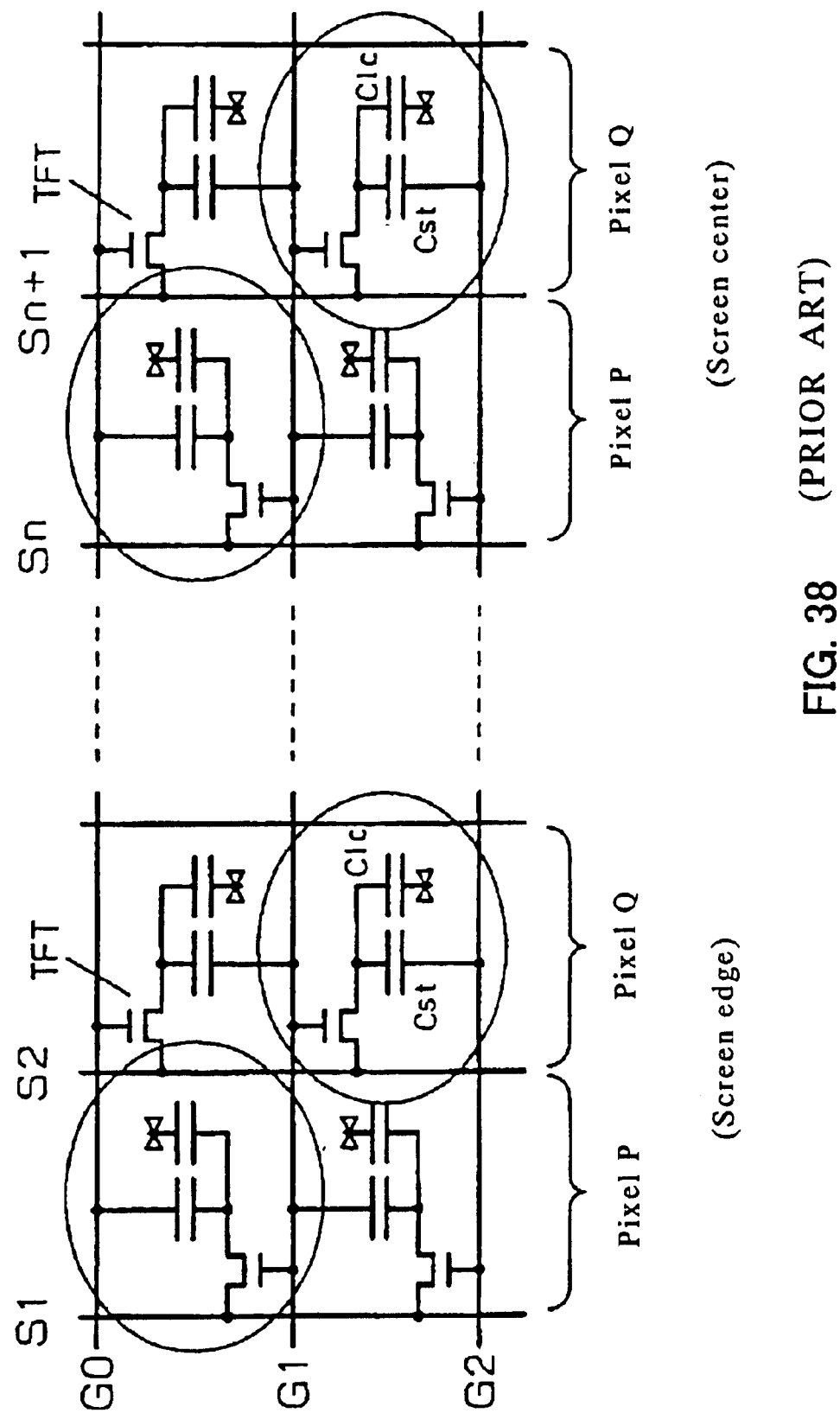
FIG. 38 is a circuit diagram showing an other example of the pixel pattern of the display apparatus in the prior art.

In the case of the circuit configuration shown in FIG. 38 the layout pattern is reversed upside down compared with that of FIG. 32.

Next, a concrete example of the above-mentioned IPS liquid crystal display apparatus to which the first display apparatus of the present invention is applied is described.

Figure 6:
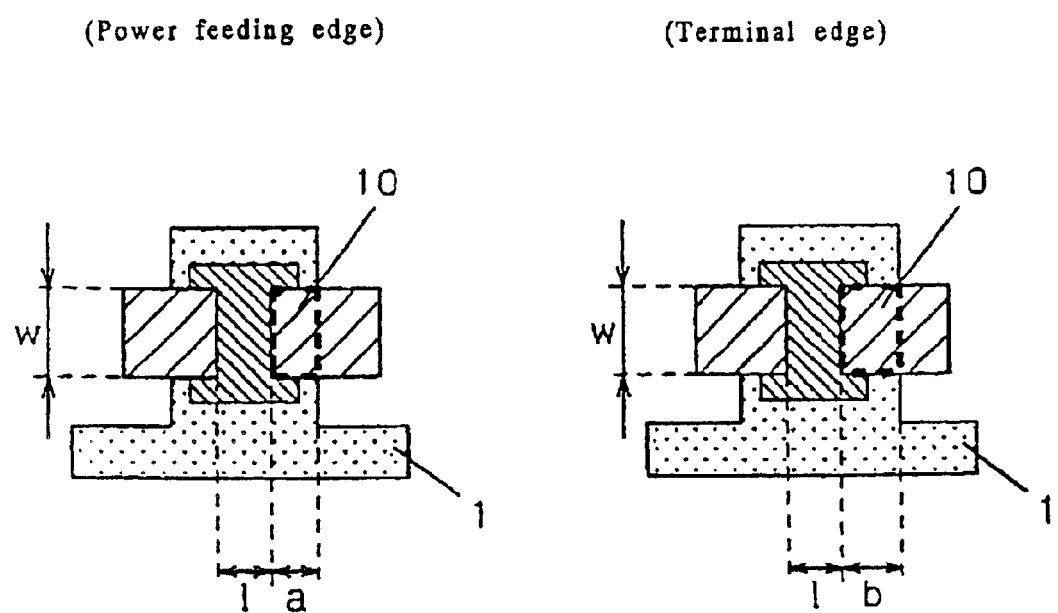
FIG. 6 is an enlargement chart of the TFT part of the liquid crystal display shown in FIG. 5.

FIG. 5 is a circuit diagram showing a configuration of a pixel of a liquid crystal display apparatus according to Embodiment 5. FIG. 6 is an enlargement of the TFT part shown in FIG. 5.

In FIG. 5, 1 denotes a scanning electrode, 2 denotes a picture signal electrode, 3 denotes a TFT, 5 denotes a pixel electrode, and 51 denotes an opposite electrode in which the array of the liquid crystal is controlled by the electric field generated therebetween with the pixel electrodes 5, and the displaying is operated. The opposite electrode 51 is connected mutually with the common electrode 52.

The part where the pixel electrode 5 and gate 53 of TFT overlaps comprises the gate-drain capacitance, and the part where the pixel electrode 5 and the scanning electrode 1 in the preceding line overlaps forms the storage capacitance 7. FIG. 5 and FIG. 6 corresponds to the liquid crystal display apparatus explained in Embodiment 1 and Embodiment 2, both the gate-drain capacitance and the storage capacitance at the terminal edge are enlarged more than those at the power feeding edge.

It is preferable to increase and decrease of the gate-drain capacitance while keeping the channel width w and the channel length l equal for each pixel. In this case, TFT property becomes uniform, and further uniform displaying can be conducted.

Concretely, as show in FIG. 5 and FIG. 6, the shape of the gate part in the TFT is adjusted to reduce width (width a) of the overlap part on the power feeding edge side, and to enlarge width (width b) of the overlap part on the terminal edge side. In this way, the pattern to obtain the desiring gate-drain capacitance can be easily designed.

(Embodiment 6)

This Embodiment 6 show an example where the display apparatus shown either in Embodiment 1 to Embodiment 4 is applied to the twisted nematic (TN) mode liquid crystal display apparatus. FIG. 7 is a circuit diagram showing a configuration of the pixel of a liquid crystal display apparatus according to Embodiment 6.

The difference from FIG. 5 is that the whole of the pixel area is almost covered with pixel electrode 5, there is an opposite electrode on the opposite substrate though it is not shown in the figure, the array of the liquid crystal is controlled by the electric field generated therebetween with the pixel electrodes 5, and the displaying is operated. The enlargement of the TFT part is the same as shown in FIG. 6 described in the above-mentioned Embodiment.

In this Embodiment 6 as well as Embodiment 5, the part where the pixel electrode 5 and the gate 73 of TFT overlap comprises the gate-drain capacitance 10, and the part where the pixel electrode 5 and the scanning electrode 1 in the preceding line overlaps forms the storage capacitance 7. Corresponding to the liquid crystal display apparatus explained in Embodiment 1 and Embodiment 2, both the gate-drain capacitance and the storage capacitance at the terminal edge are enlarged more than those at the power feeding edge.

In the configuration of FIG. 7, it is preferable to increase and decrease the gate-drain capacitance while keeping the channel width w and the channel length l equal by each pixel. In this case, TFT property becomes uniform, and further uniform displaying can be conducted.

Concretely, as with Embodiment 5, as shown in FIG. 6 and FIG. 7, the shape of the gate part in the TFT is adjusted to reduce width (width a) of the overlap part on the power feeding edge side, and to enlarge width (width b) of the overlap part on the terminal edge side. In this way, the pattern to obtain the desiring gate-drain capacitance can be easily designed.

In Embodiment 5 and Embodiment 6, a concrete configuration of the pixel corresponding to the liquid crystal display apparatus of Embodiment 1 and Embodiment 2 is explained. This also can be applied to the liquid crystal display apparatus of Embodiment 3 and Embodiment 4.

In the liquid crystal display of Embodiment 3 or Embodiment 4, both the gate-drain capacitance and the storage capacitance at the terminal edge side should be reduced less than those at the power feeding edge side. It may be considered by reversing the configuration between the power feeding edge side and the terminal edge side shown in FIGS. 5, 6 and 7.

(Embodiment 7)

The Embodiment of the second display apparatus of this invention is shown. The display apparatus of this Embodiment 7 includes the first storage capacitance between the pixel electrode and the scanning electrode among the scanning electrodes except the scanning electrode in the present line, and includes the second storage capacitance between the pixel electrode and the storage capacitance electrode.

Figure 8:
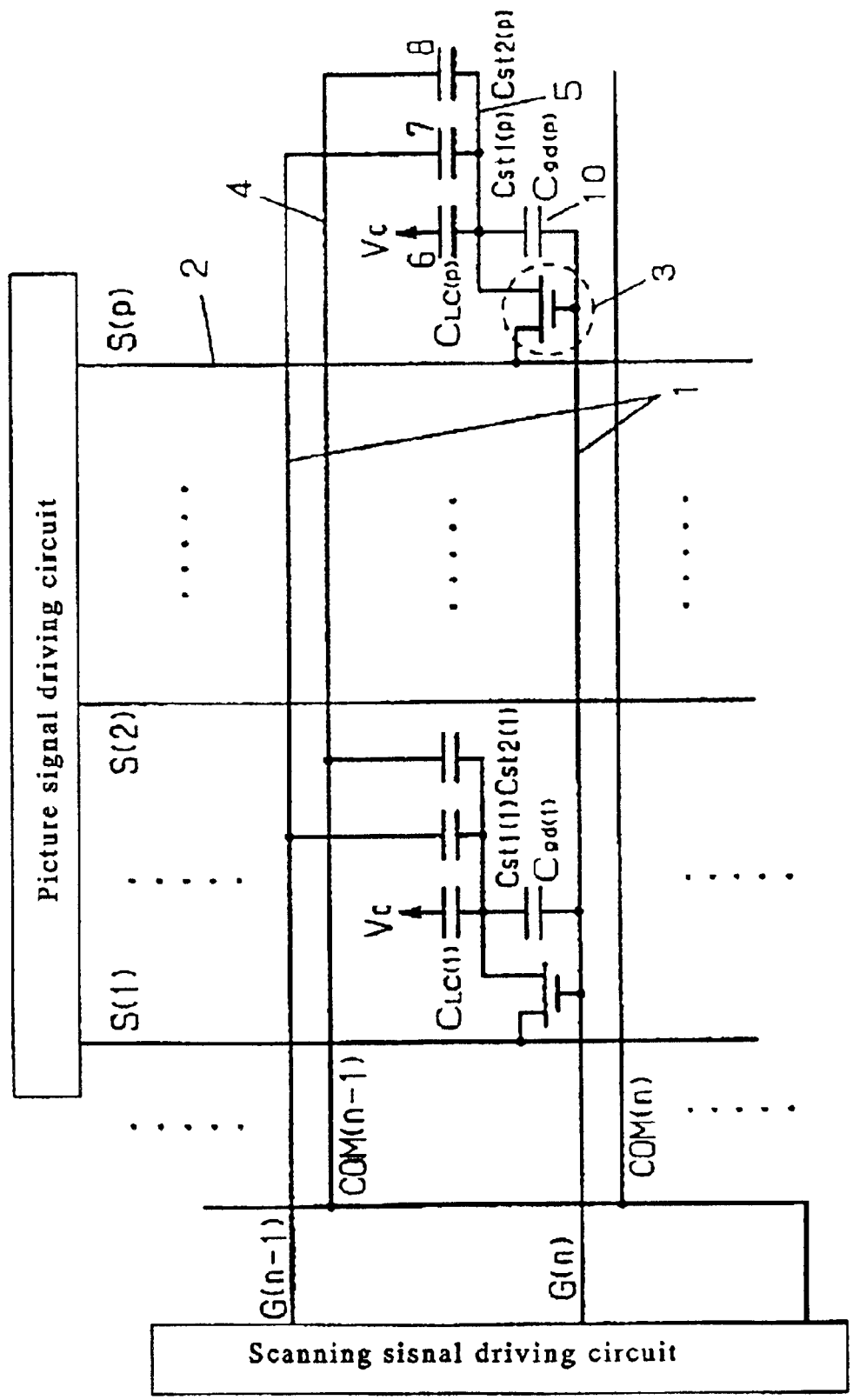
FIG. 8 is a diagram showing a basic configuration of the liquid crystal display apparatus according to Embodiment 7 of the present invention.

FIG. 8 is a diagram showing a basic configuration of the liquid crystal display apparatus according to Embodiment 7 of the present invention. In this Figure, 1 denotes a scanning electrode, and 2 denotes a picture signal electrode wherein thin film transistor (TFT) 3 is formed at the intersection as a switching element. The gate electrode of TFT 3 is connected with the scanning electrode 1, the source electrode is connected with the picture signal wiring 2, and the drain electrode is connected with the pixel electrode 5 respectively.

The capacitance of the pixel is comprised of three capacitors 6, 7 and 8. The liquid capacitance 6 is formed between the pixel electrode 5 and the opposite electrode through the liquid crystal, and the liquid crystal performs the operation according to the voltage applied to both ends. The opposite electrode voltage Vent is supplied to the opposite electrode.

Two stage capacitances are formed in the liquid crystal capacitance 6 in parallel. When the charge leaks from the liquid crystal capacitance 6, these parallel capacitances compensate this leaked charge, and stabilize the motion of the liquid crystal. The first storage capacitance 7 is formed between the pixel electrode 5 and the scanning electrode 1 of the preceding line, and the second capacitance 8 is formed between the pixel electrode 5 and the pixel electrode 5 and the common electrode 4. Moreover, though it is not shown in the figure, the gate-drain capacitance Cgd exists between the gate and the drain in TFT.

Though the liquid crystal display apparatus has the pixels arranged in the matrix, FIG. 8 shows the electrode wiring for the pixels of "n"th line and the surrounding, other parts are omitted. G(n−1) is a scanning electrode of the "n−1"th line, and G(n) is a scanning electrode of "n"th line, COM(n−1) is a common electrode of the "n−1"th line, and COM(n) is a common electrode of "n"th line. Moreover, S(1) is a picture signal wiring of the first row and S(p) is a picture signal wiring of "p"th row (final row).

Though the opposite electrode and the common electrode 4 are shown separately in FIG. 8, in the case of IPS, the opposite electrode and the common electrode 4 are configured as a body. And, the part where the pixel electrode 5 and the common electrode 4 oppose through the liquid crystal becomes the liquid crystal capacitance 6, and the part where the pixel electrode 5 and the common electrode 4 oppose through the insulating layer etc. becomes the second storage capacitance 8.

This liquid crystal display apparatus is driven as shown next.

Figure 35:
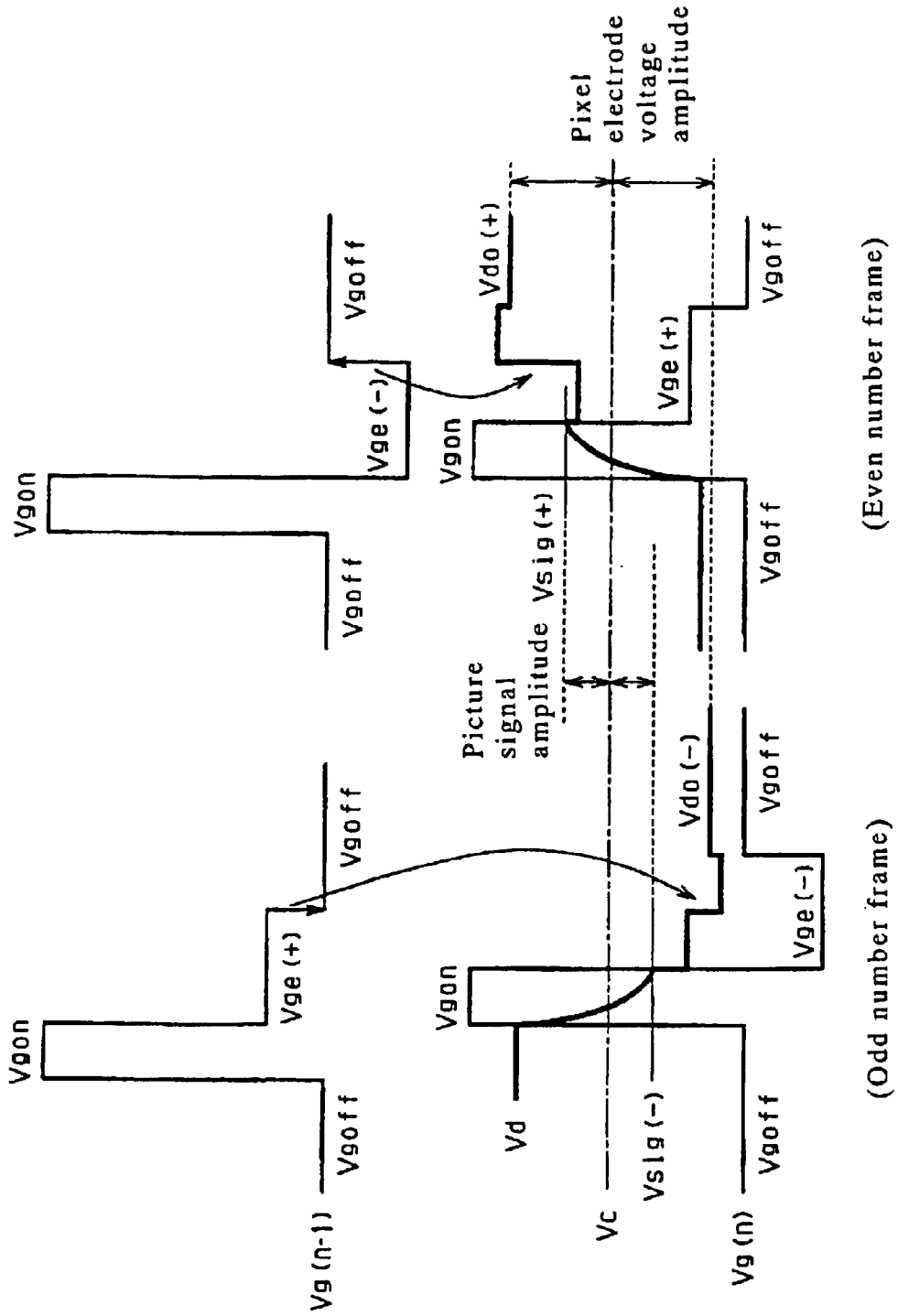
FIG. 35 is a diagram showing the voltage of each part when driving the liquid crystal display apparatus in the prior art shown in FIG. 34.
Figure 36:
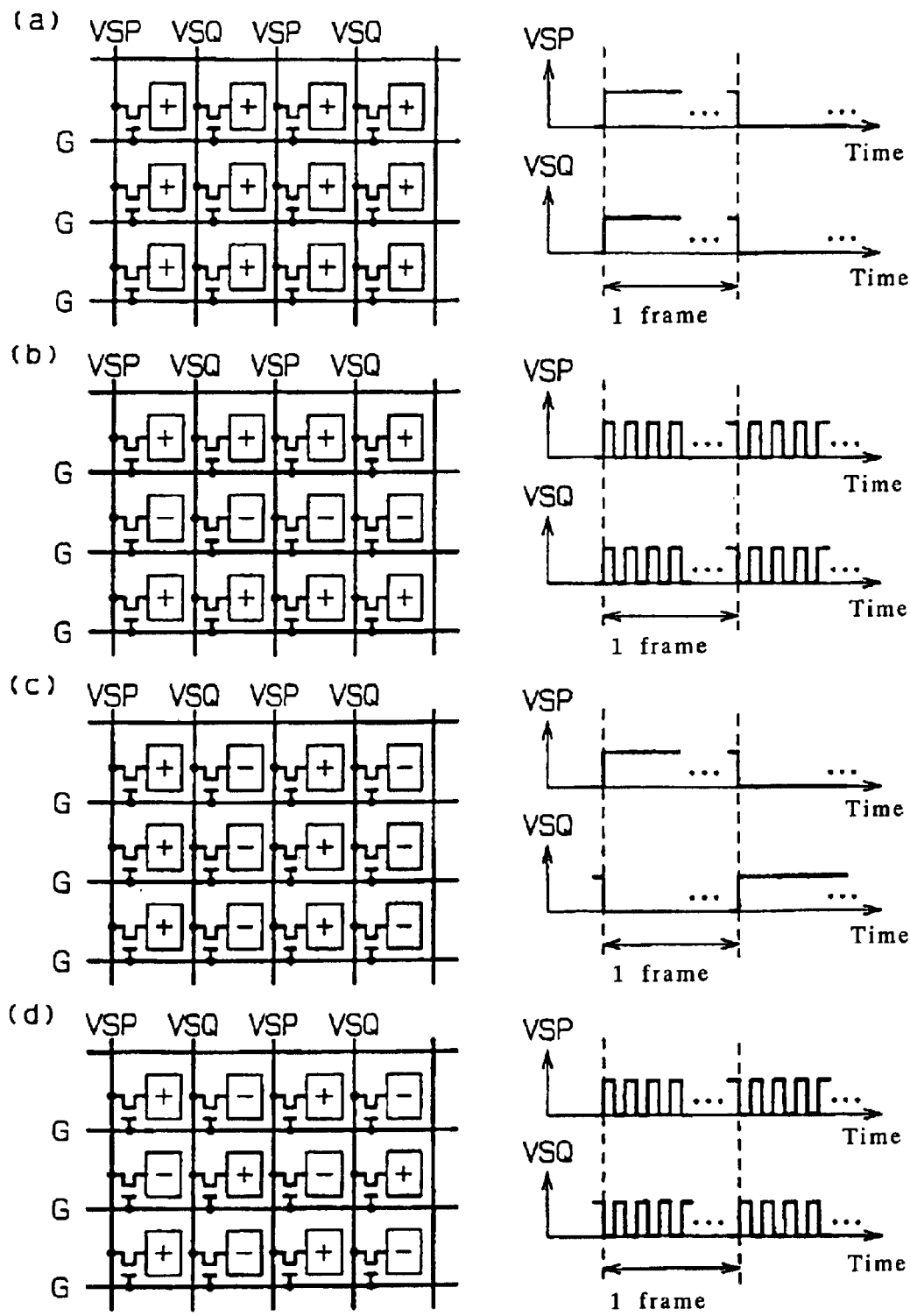
FIG. 36 is a diagram showing various inversion drive patterns and the picture signal input waveform.

The shape of the driving waveform supplied to each electrode is the one shown in FIG. 35 as with the conventional capacitively coupled driving. That is, first, the ON-state voltage is applied to the scanning electrode G(n) of "n"th line, TFT becomes ON status and the pixel is charged. Next, the scanning voltage turns to be OFF level and TFT becomes OFF status. Afterwards, the step voltage is applied to the scanning electrode G(n−1) in the preceding line and overlaps coupling voltage through first storage capacitance 7.

In the liquid crystal display apparatus of this Embodiment 7, when the coupling voltage is overlapped, a downward coupling voltage is described by (Expression 26), and an upward coupling voltage is described by (Expression 27) because the second storage capacitance 8 becomes parallel capacitance for the liquid crystal capacitance. In this Embodiment, the voltage of each part was set in consideration of this.

$$\alpha\,st1\cdot Vg(+) \qquad\qquad\text{(Expression 26)}$$

$$\alpha\,st1\cdot Vg(-) \qquad\qquad\text{(Expression 27)}$$

Herein, $\alpha\,st1$ is the fourth capacitance ratio, and $\alpha\,st1$ is described as $\alpha\,st1=(Cst1/Ctot)$.

Herein, Ctot denotes all capacitance connected with pixel electrode. Normally, Ctot usually is calculated as Cst1+Cst2+Cgd+Clc, and when there are other capacitances in the pixel electrode, Ctot includes such other capacitances. In addition, the capacitance formed in parallel with the gate-drain inter-electrode capacitance 10 (Cgd) is included in the Cgd.

Each pixel and the storage capacitance arranged one by one in the pixel conventionally are divided into two parts, and the feature of the liquid crystal display apparatus of this Embodiment 7 is that one side is formed on the common wiring, the other side is formed on the scanning wiring of the preceding line and the capacitively coupled driving uses the storage capacitance in the scanning wiring of the preceding line. As a result, the following effects can be achieved.

(1) Lowering the picture signal voltage by overlapping the coupling voltage to the pixel voltage and decreasing of driving electric power.

(2) Decreasing of the pixel charge time according to the distance from the power feeding edge of the scanning line, which comes from the influence of scanning lines time constant, and the decreasing of the increment of the re-charge time.

In short, the pixel charge time can be kept long, the re-charge time can be decreased, the irregular brightness caused by pixel charge shortage can be decreased, and the flicker caused by the difference of the pixel re-charge can be decreased.

Figure 9:
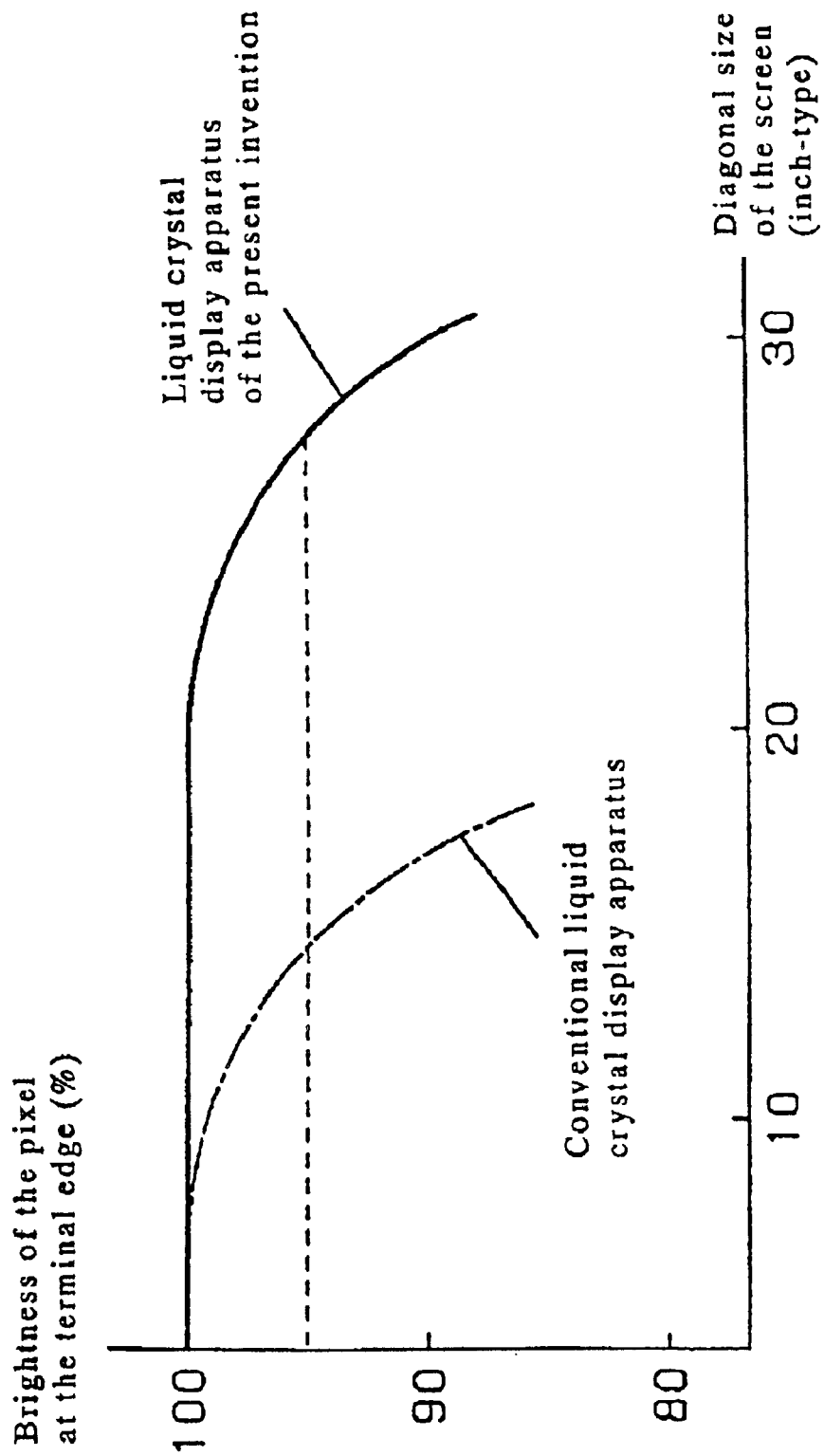
FIG. 9 is a diagram showing the degree of the brightness decrease in the terminal pixel because of the panel size expansion.

FIG. 9 is a diagram showing the degree of the brightness decrease in the terminal pixel because of the panel size expansion. When displaying white in all aspects of the panel, the brightness of the pixel of the power feeding edge is assumed to be 100%, and the result of simulating the brightness of the pixel of the terminal edge is shown.

The number of pixels is 720(length)×1280(side), and the case that the liquid crystal display apparatus of the conventional technology is driven by the capacitively coupled driving and the case that the liquid crystal display apparatus of the present invention are compared. The storage capacitance (total sum) on both sides are assumed to be equal. Moreover, the shown data of the liquid crystal display apparatus of this invention, as one example, are the case when the storage capacity is divided into two parts, with the one part being formed on the common wiring and the other part being formed on the scanning wiring of the preceding line.

In a conventional liquid crystal display apparatus, the brightness of the pixel of the terminal edge becomes 95% in the corner for 15 inch types (381 mm) and an irregular display begins to stand out, however, the uniform display can be achieved in the corner for up to 27 inch types (686 mm) with a liquid crystal display apparatus of this invention. Moreover, the generation of the flicker by the capacitance coupling phenomenon is controlled by decreasing the scanning waveform distortion.

The liquid crystal display apparatus of this Embodiment 7 is effective for the high resolution liquid crystal display apparatus. When the resolution of the liquid crystal display apparatus increases, the charge time will decrease per one scanning line. In this case, the charge becomes short on the scanning electrode is the terminal edge, and an irregular display is generated the same as for the display enlargement. The liquid crystal display of this Embodiment 7 decreases the time constant of the scanning wiring by the same principle as the above-mentioned, the pixel charge time can be kept long by extending the effective charge time of the terminal pixel, and the irregular brightness due to pixel charge shortage can be decreased.

Moreover, the liquid crystal display of this Embodiment 7 can decrease the re-charge time, and the flicker caused by the difference of the pixel re-charge can be decreased.

(Embodiment 8)

It is preferable for the configuration of the second display apparatus of this invention explained by Embodiment 7 to be applied to the display method using small capacitance of the liquid crystal such as an In-plane switching mode. Hereafter, Embodiment 8 is described with reference to the drawing.

Figure 10:
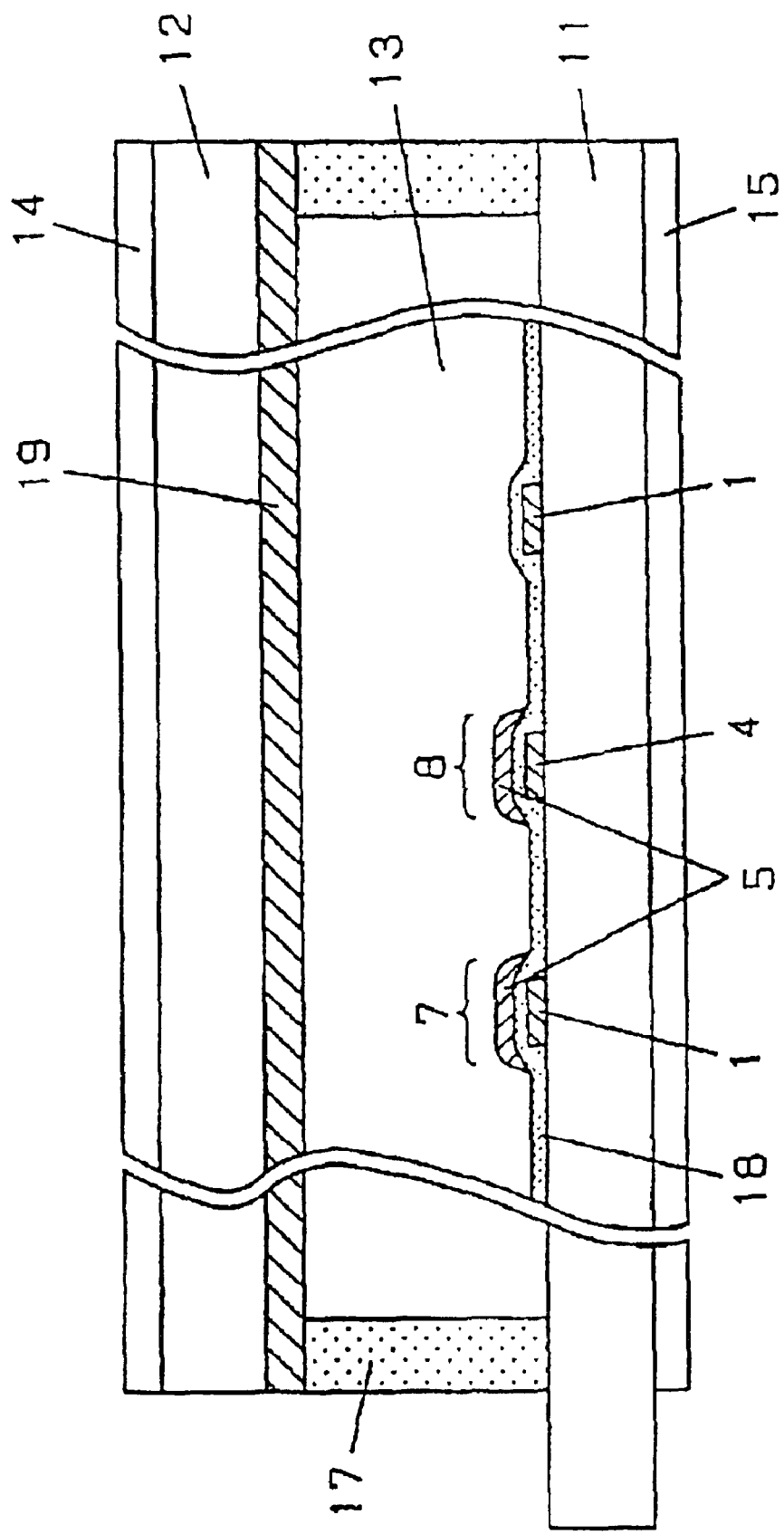
FIG. 10 is a cross section of a liquid crystal display apparatus according to Embodiment 8 of the present invention.

FIG. 10 is a diagram of a cross section of the liquid crystal display apparatus according to Embodiment 8 of the present invention, FIG. 11 is a circuit diagram showing a configuration of a pixel of a liquid crystal display apparatus shown in FIG. 10. The center part of FIG. 10 shows the sectional structure along line A-A' shown in the FIG. 11.

In FIG. 10, 11 and 12 are substrates made of glass etc., 11 denotes an array substrate formed with TFTs and electrodes connected with it, and 12 denotes an opposite substrate opposing to the array substrate 11. A liquid crystal 13 is inserted between two substrates, and the both ends are sealed by seal 17. 14 and 15 denote polarized light boards to display polarized light, and 19 denotes a color filter to conduct color displaying. The color filter is formed on the opposite substrate 12 side, but it may be formed on the array substrate 11 side.

The scanning electrode 1 and the common electrode 4 are formed by the first conductive layer on the array substrate 11, and the insulation film 18 covers the array substrate 11. The pixel electrode 5 is formed by the second conductive layer on the insulation film 18. As shown in FIG. 11, the pixel electrode 5 overlaps with the common electrode 4 and the scanning electrode 1 in the preceding line. The overlap part between the pixel electrode 5 and the scanning electrode 1 of the preceding line comprises the storage capacitance 7 (Cst), and, the overlap part between the pixel electrode 5 and the common electrode 4 comprises the second storage capacitance 8.

As shown in FIG. 11, the branch part 4A is formed in the common electrode 4. This faces in parallel to the pixel electrode 5, and works as an opposite electrode to apply the electric field to the liquid crystal layer. In FIG. 8, the common electrode 4 is the same as the opposite electrode. TFT3 is composed of the electrode in 9 and three semiconductor parts, normally the gate electrode connected with the scanning electrode 1, the source electrode connected with the picture signal wiring 2, and the drain electrode connected with the pixel electrode 5 respectively.

When the capacitively coupled driving is conducted using a conventional configuration when the liquid crystal capacitance is small, the voltage fluctuation of the scanning electrode in preceding line influences the pixel electrode voltage, this results in lateral stripes and the display quality might be ruined. That is, in the case of the conventional apparatus, the storage capacity is not divided, so the value of $Cst/(Cst+Cgd+Clc)$, which is the second capacity ratio α st, becomes near "1", and the difference of Vg (+) and Vg (−) due to the output deflection etc. of the driving IC directly becomes the difference of the pixel electrode voltage. Moreover, when an off level of the scanning voltage is fluctuated by the power supply fluctuation etc., it influences the pixel electrode voltage directly.

However, when employing the configuration of this Embodiment 8, because the second storage capacitance Cst2 works as a parallel capacitance of the liquid crystal capacitance Clc, the fourth value of capacitance ratio α st1 described by (Expression 26) or (Expression 27) can be moderated and adjusted, the generation of the lateral stripes can be suppressed by easing the influence that the voltage fluctuation of the scanning electrode in preceding line has on the pixel electrode voltage.

An electricity-optical characteristic of the IPS liquid crystal varies from the dark status to the bright status by the width of the voltage of about 2.5 volts. In the gradation display, usually, it is performed by 8 bits, that is, 256 steps gradation, and the width of the voltage per one gradation is about 10 mV. On the other hand, the width of the on/off output voltage of the scanning drive IC is about from 20 to 30 volts, and the deflection of 0.1 percent corresponds to 20–30 mV. Then, the value of $Cst1/(Cst1+Cst2+Cgd+Clc)$ becomes 0.5 or less, preferably 0.3 or less, the output deflection of the 0.1 percent of the scanning side drive IC can be reduced to less than the width of the voltage of one gradation, and it is possible to cancel the lateral stripes.

When the configuration of this invention is applied for the IPS mode, further, there are the following effects. In the IPS mode, the liquid crystal capacitance is about 1/10 compared with the twisted nematic mode used widely at present. Therefore, big storage capacitance is required from the TN type to stabilize the pixel electrode voltage. When trying to form this capacitance only either on the scanning electrode or on the common electrode, the area will become insufficient according to circumstances, the expansion of the width of the line is required, and the aperture ratio will be deteriorated. On the contrary, when the configuration of this Embodiment 8 is used, because the pixel electrode voltage fluctuation can be prevented by forming enough storage capacitance without deteriorating the aperture ratio, a bright, high-quality display can be obtained.

If the used method employs liquid crystal capacitance that is very small compared with that of TN type display, any method can show the effect explained in Embodiment 8. For example, these include a configuration in which the pixel electrode 21 and the opposite electrode 22 are on same substrate 23 as shown by FIG. 12($a$), and a configuration in which liquid crystal is operated by the parallel or skewed electric field against the substrate by forming the opposition electrode 22 onto the opposite substrate 24 shown by FIG. 12($b$) or ($c$). In these configurations, the pixel electrode 21 and the opposite electrode 22 applying the electric field to the liquid crystal 25 do not form a parallel, monotonic capacitance, and the liquid crystal capacitance is small compared with the TN type as shown in FIG. 12($d$). Even when the opposite electrode is on the array substrate 23 or even when the opposite electrode is on the opposite substrate 24, if such configuration is used, the effect explained by Embodiment 8, in addition to the effect explained by Embodiment 7, can be achieved.

(Embodiment 9)

The second display apparatus of Embodiment 9 of this invention is a display wherein the third capacitance ratio α gd1=Cgd/Ctot defined by the (Expression 28) shown in Embodiment 7 increases continuously or in stages according to the distance from the power feeding edge of the scanning electrode.

As one example, in the liquid crystal display apparatus shown in FIG. 8, the third capacitance ratio α gd1 is gradually enlarged from the power feeding edge of the scanning electrode to the terminal edge.

$$\alpha\ gd1 = Cgd/Ctot \quad \text{(Expression 28)}$$

Herein, Ctot denotes all capacitance connected with pixel electrode. Normally, Ctot usually is calculated as Cst1+Cst2+Cgd+Clc, and when there are other capacitances in the pixel electrode, Ctot includes such other capacitances. In addition, the capacitance formed in parallel with the gate-drain inter-electrode capacitance 10 (Cgd) is included in the Cgd.

Figure 13:
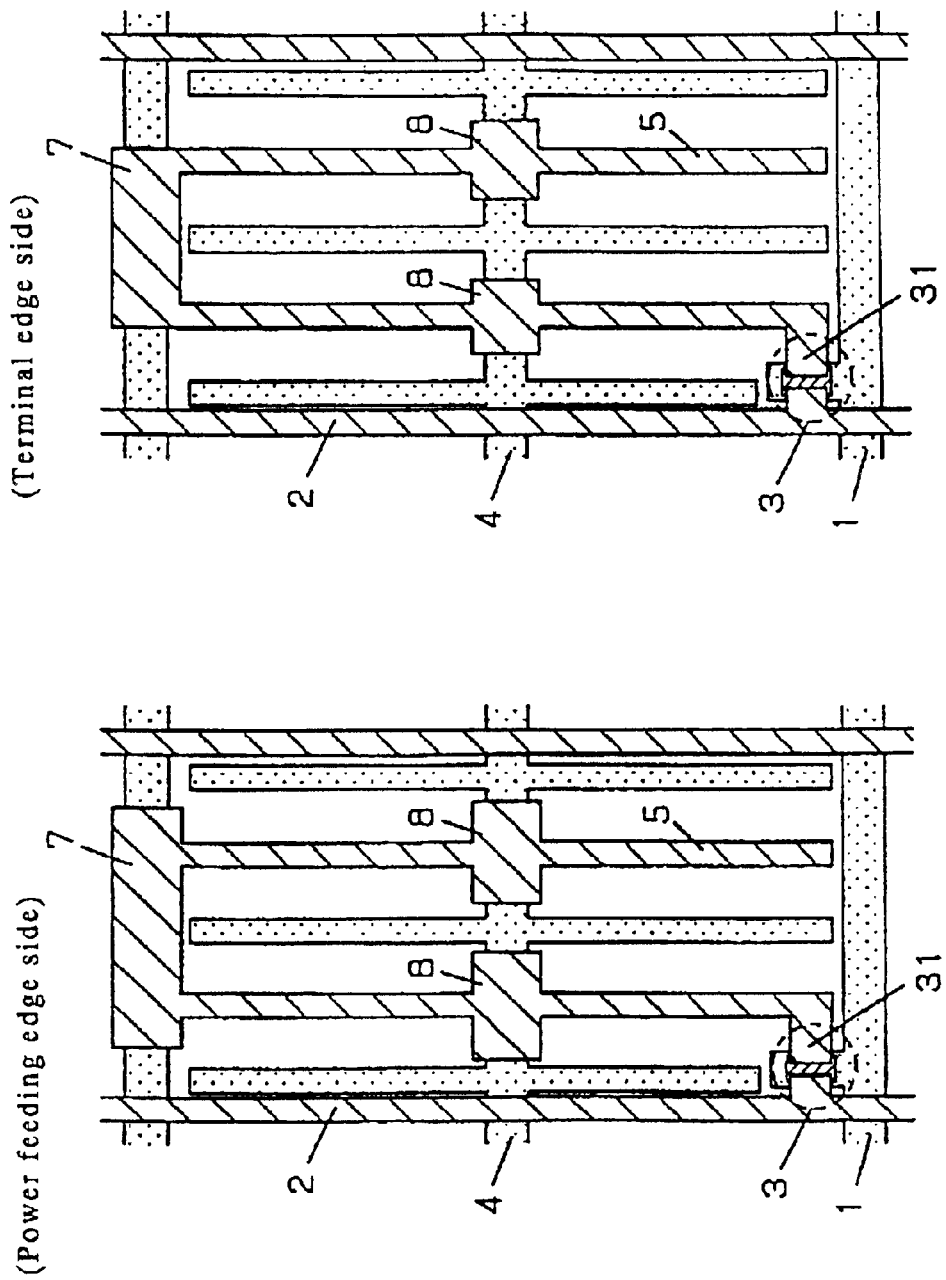
FIG. 13 is a circuit diagram showing a configuration of a pixel of a liquid crystal display apparatus shown in FIG. 12.

FIG. 13 is one example showing the configuration in which the first storage capacitance 7 (Cst 1) and the second storage capacitance 8 (Cst 2) become large at the power feeding edge side and become small at the terminal edge side by varying the shape of the pixel electrode 5. The third capacitance ratio α gd1 becomes small at the power feeding edge side and becomes large at the terminal edge side because Cst1 and Cst2 are included in the denominator of the (Expression 28).

Figure 41:
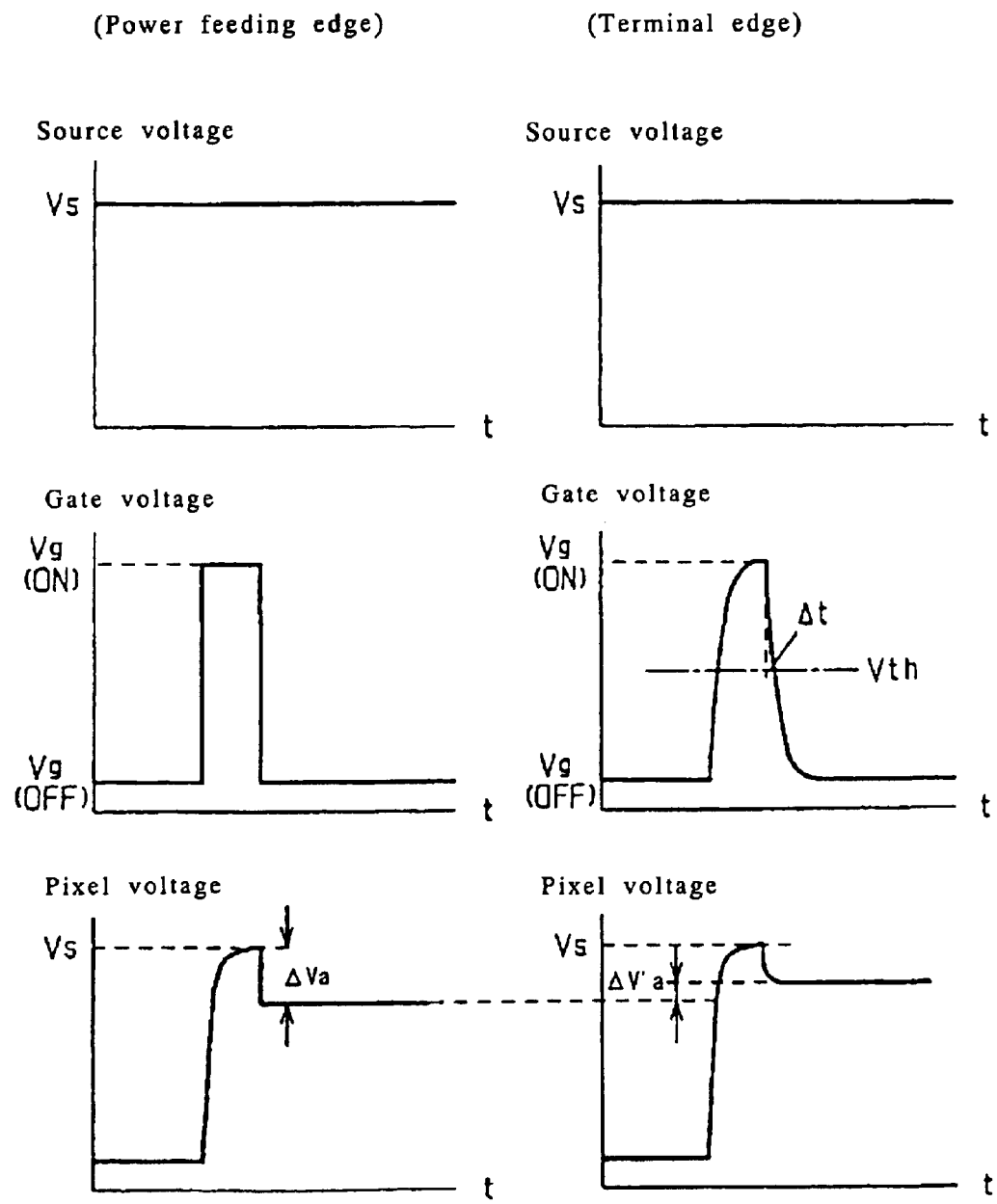
FIG. 41 is a diagram showing the reason why the pixel voltage becomes not uniform as a result of the re-charge phenomenon in a liquid crystal display apparatus in the prior art.

FIG. 41 used for explaining the problem in the prior art, that when the distortion is caused in the scanning voltage in the liquid crystal display apparatus employing the TFT, even when the charge is completely performed, no uniformity is caused in the pixel voltage for the following reason.

As shown in the lower left portion of FIG. 41, after charging the pixel voltage to Vs by turning the gate voltage ON, the feed-through voltage is generated by the influence of the capacitance coupling with the gate voltage decreasing. The pixel electrode voltage will be decreased by ΔVa1 as shown in (Expression 29).

$$\Delta Va1 = \alpha gd1 \cdot \Delta Vgon \quad \text{(Expression 29)}$$

herein, ΔVgon=(Vgon−Vgoff)

In the power feeding edge where there is no distortion in the gate voltage waveform, the TFT becomes an OFF state at once and the pixel electrode voltage Vd settles down in Vs−ΔV1.

However, the gate voltage waveform supplied from the scanning electrode is distorted by the influence of the wiring time constant at the terminal edge. The time of Δt will be needed by the time the TFT becomes a OFF state as shown in FIG. 41 is middle part, the pixel electrode voltage Vd is charged to Vs again during Δt, a part of feed-through voltage ΔVa1 is canceled, so it becomes voltage that only ΔVa1' is high as right part of FIG. 41. As a result, the DC level of the pixel electrode voltage Vd becomes a different value between the power feeding edge and the terminal edge, and therefore display irregularity such as flicker phenomenon is generated.

Figure 14:
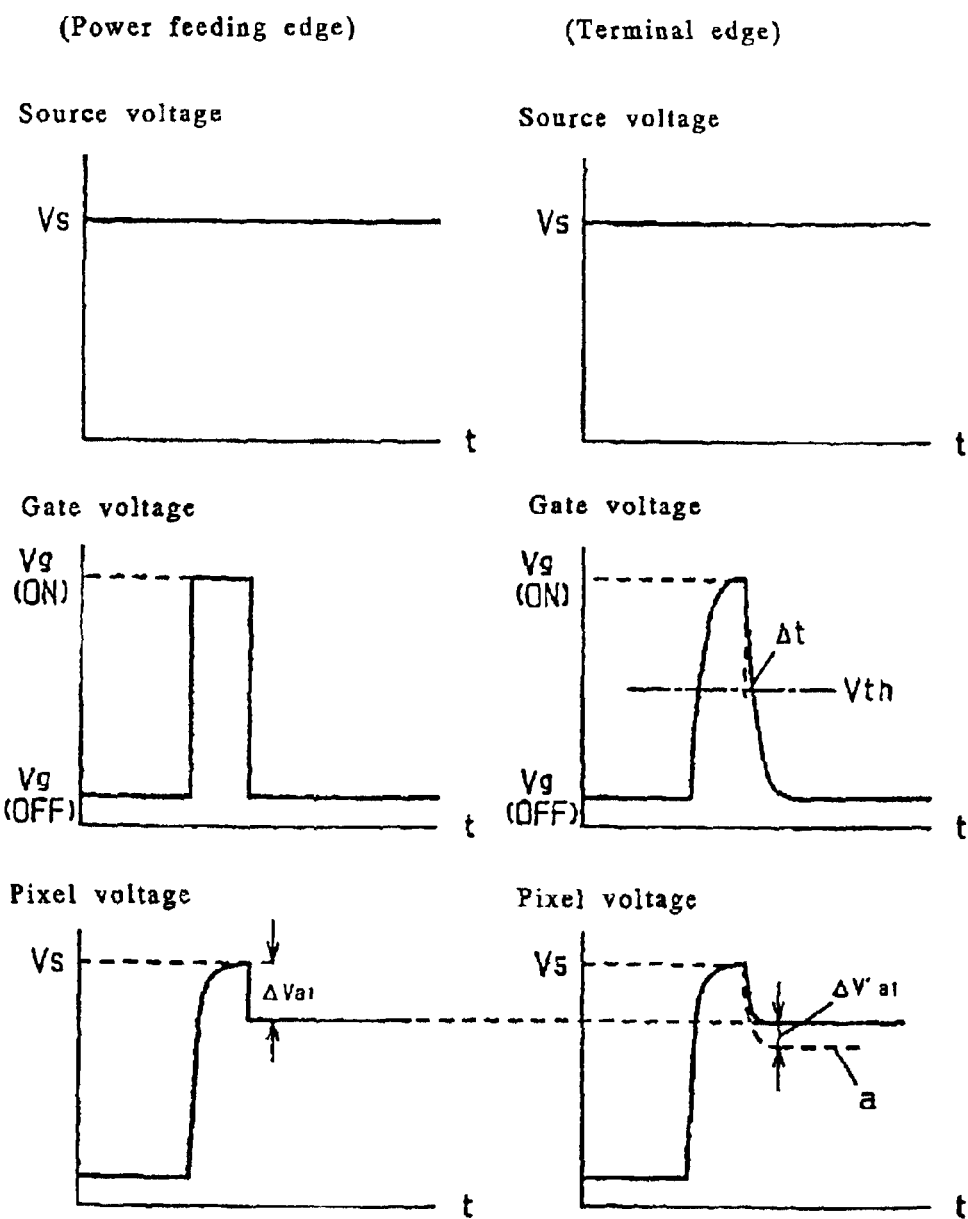
FIG. 14 is a diagram showing that the pixel voltage becomes uniform in the scanning electrode power feeding edge and the terminal of the liquid crystal display apparatus of the present invention.

On the contrary, according to the liquid crystal display apparatus of this Embodiment 9, it is set so that ΔVa1 shown by (Expression 29) is enlarged toward the terminal edge side of the scanning electrode by enlarging third capacitance ratio α gd1 defined by (Expression 28) toward the terminal side of the scanning electrode. As concretely shown in FIG. 14, the decrease in voltage (curve "a" shown in dotted line in the lower right part of FIG. 14) by the capacitance coupling when the gate voltage at the terminal edge decreases being set for only ΔVa1' is high compared with the power feeding edge. Therefore, as shown in the lower right part of FIG. 14, the pixel electrode voltage in the terminal edge settles down with the pixel electrode voltage on the power feeding edge in the place where it becomes equal to the pixel electrode voltage on the terminal edge when pixel voltage varying ΔV' by the re-charge during Δt is subtracted. Thus, the level that the pixel electrode voltage finally reaches becomes equal between the power feeding edge and the terminal edge, display irregularity such as flicker is not caused, and the uniform display can be achieved. The degree by which the third capacitance ratio α gd1 varies can be obtained according to the computer simulation etc. of each part of the voltage waveform.

In the above-mentioned description, though both of the first storage capacitance (Cst1) and second storage capacitance (Cst2) become large at the power feeding edge and become small at the terminal edge, however, it may enough that either satisfies that capacitance variance. The same effect can be obtained when the gate-drain inter-electrode capacitance (Cgd) becomes large at the power feeding edge and becomes small at the terminal edge, furthermore, this gate drain inter-electrode capacitance variance can be combined with the above-mentioned storage capacitance variance.

In order to vary the gate-drain inter-electrode capacitance (Cgd), for instance, in FIG. 13, the area of the overlapping part of the gate and drain of the TFT is changed. In short, it is enough that at least one of the first storage capacitance (Cst1), the second storage capacitance (Cst2), the gate-drain inter-electrode capacitance (Cgd), and the liquid crystal capacitance (Clc) varies so that α gd1 becomes large at the terminal edge side.

(Embodiment 10)

The second display apparatus of Embodiment 10 of this invention is a display wherein the capacitance of each pixel is set as the fourth capacitance ratio α st1 defined by the (Expression 30) shown in Embodiment 9 becomes constant between the pixel on the same scanning electrode.

$$\alpha\ st1 = Cst1/Ctot \quad \text{(Expression 30)}$$

Herein, Ctot denotes all capacitance connected with pixel electrode. Normally, Ctot usually is calculated as Cst1+Cst2+Cgd+Clc, and when there are other capacitances in the pixel electrode, Ctot includes such other capacitances. In addition, the capacitance formed in parallel with the gate-drain inter-electrode capacitance (Cgd) is included in the Cgd.

Figure 15:
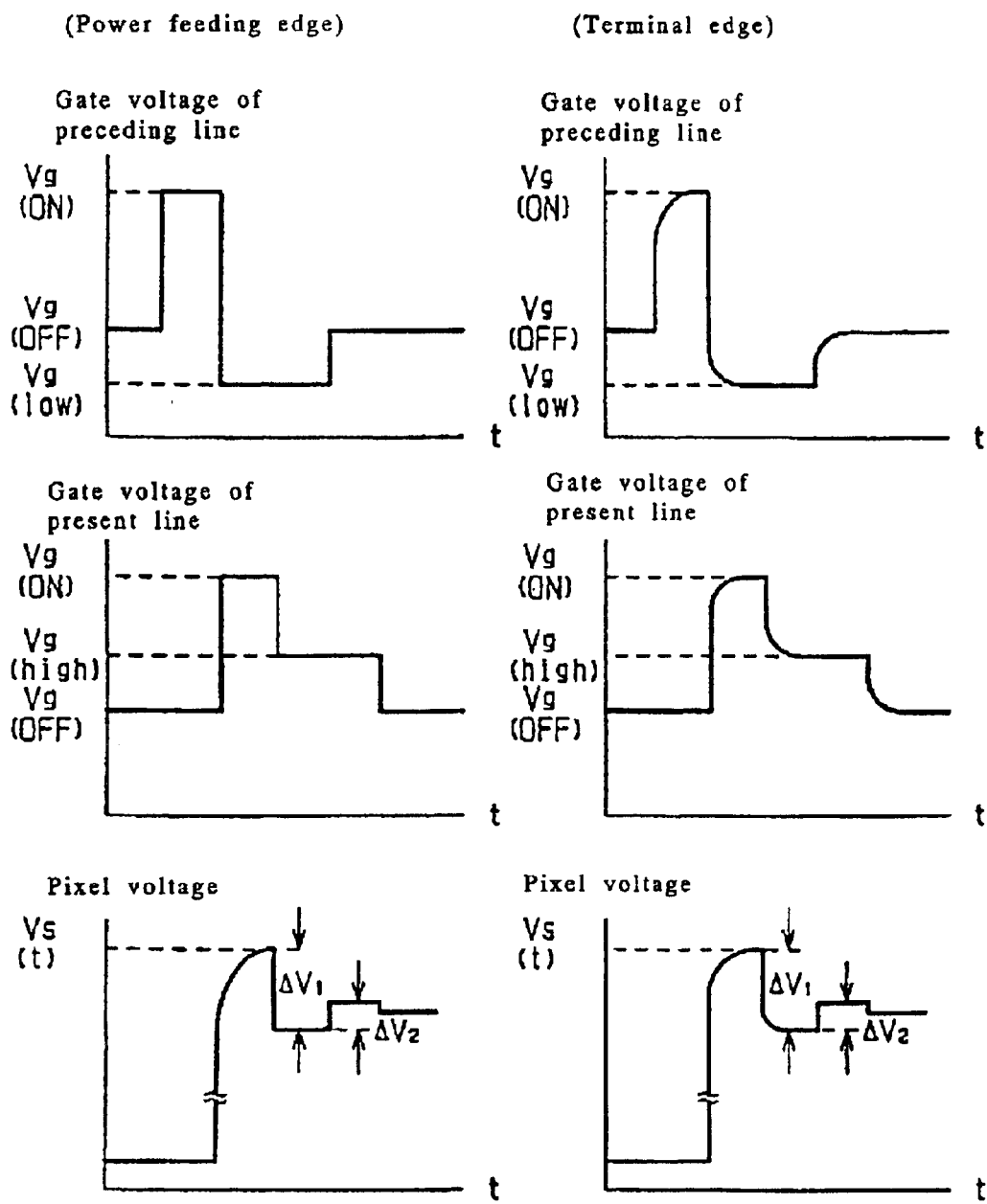
FIG. 15 is a waveform chart showing the voltage of each part at the odd number frame where the pixel in the present line is charged to positive voltage in a liquid crystal display apparatus according to Embodiment 10 of the present invention.
Figure 16:
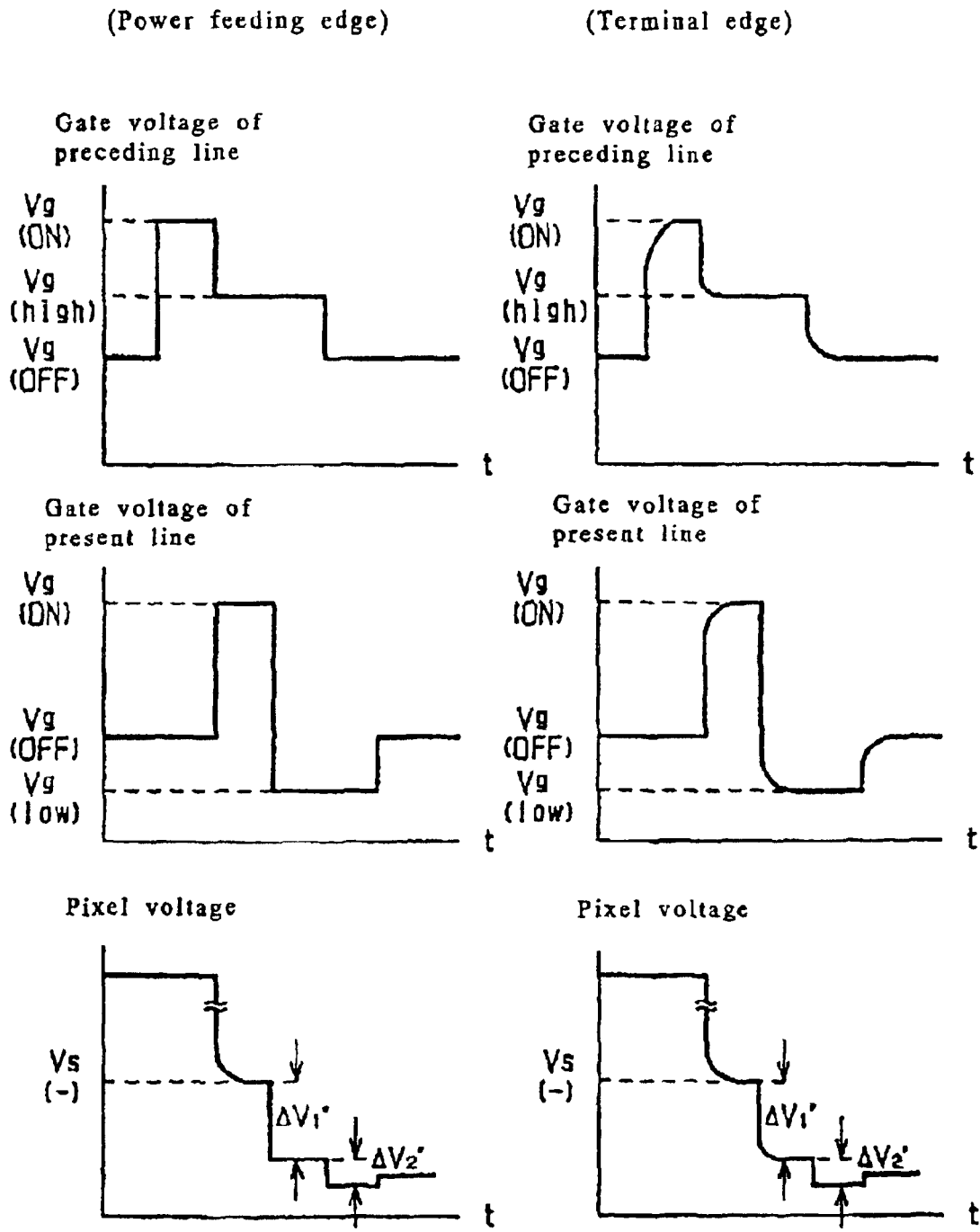
FIG. 16 is a waveform chart showing the voltage of each part at the even number frame where the pixel in the present line is charged to negative voltage in a liquid crystal display apparatus according to Embodiment 10 of the present invention.

FIG. 15 and FIG. 16 are the diagrams showing the time variation of the gate voltage (scanning electrode voltage) and the pixel electrode voltage when capacitively coupled driving is conducted through the storage capacitance on the scanning electrode of the preceding line. Both of the gate voltage applied to the TFT connected with this pixel (present line) and the gate voltage related to the capacitive coupling (preceding line) are considered as the gate voltage. The polarity of the pixel voltage is inverted between pixels adjacent upstream and downstream. A voltage varying of the odd number frame where the pixel is charged to a positive voltage is shown in FIG. 15, and a voltage varying of the even number frame where the voltage polarity is inverted is shown in FIG. 16.

In these Figure, the pixel is once charged to Vs(+) in the positive charge period and charged to Vs(−) in the negative charge period. Next, when the gate voltage decreases, the pixel electrode voltage is varied by the downward coupling voltage (ΔV1 of FIG. 15 or ΔV1' of FIG. 16). This vary amount of the scanning voltage at the power feeding edge and the terminal edge finally reach the same level by the configuration shown in Embodiment 9.

The voltage of the preceding line has varied in the step shape, and the coupling voltage $\Delta V2$ or $\Delta V2'$ is overlapped to the pixel electrode voltage through the first storage capacitance. This overlapped voltage value becomes the product of multiplying the fourth capacity ratio $\alpha$ st1 shown by (Expression 30) by the amount of variation of the gate voltage of the preceding line.

In the configuration shown in Embodiment 9, four capacitances shown by (Expression 28) have varied as the value of $\alpha$ gd1 becomes large on the terminal edge side. For example, if only one of four capacitances varies like this, the fourth capacity ratio $\alpha$ st1 shown by (Expression 30) is different between the pixels in the power feeding edge side and the terminal edge side. The difference in the coupling voltage V2 and V2' is overlapped to the pixel electrode voltage, so that a new irregular display is generated.

In Embodiment 10, at least two of four capacitances shown above varies from the power feeding edge pixel to the terminal edge pixel, $\alpha$ gd1 shown by (Expression 28) is enlarged from the power feeding edge to the terminal edge and $\alpha$ st1 shown by (Expression 30) becomes constant. By this, the coupling voltage V2 and V2' overlapped to the pixel electrode voltage can be constant regardless of the position of the pixel, and further uniform display can be achieved comparing with the liquid crystal display apparatus of Embodiment 9.

As one example, the case where both parties of the first storage capacitance (Cst1) and second storage capacitance (Cst2) become large at the power feeding edge and become small at the terminal edge is described. First of all, as described in Embodiment 9, the sum of Cst1 and Cst2 is reduced toward the terminal edge side. When the gate-drain inter-electrode capacitance (Cgd) and the liquid crystal capacitance (Clc) are enough smaller than the storage capacitance and the Cgd and Clc can be ignored in the (Expression 30), $\alpha$ gd1 shown by (Expression 28) can be gradually enlarged toward the terminal edge side with while keeping the value of $\alpha$ st1 shown by (Expression 30) constant by distributing this sum as the ratio of Cst1 and Cst2 being constant. Moreover, when Cgd and Clc cannot be ignored, the distribution ratio of Cst1 and Cst2 is decided by considering these capacitances.

The configuration is not limited to the combination of Cst1 and Cst2. For example, the combination of Cgd and Cst1 can be used, and a similar effect can be achieved when Cgd becomes small and Cst2 becomes large from the power feeding edge toward the terminal edge as the sum of both capacitances be constant. Moreover, the same effect can be achieved by varying three or all four capacitances of the four capacitances by each pixel.

(Embodiment 11)

The second display apparatus of Embodiment 11 of this invention is a display having a further variation wherein the capacitance of each pixel is set as the third capacitance ratio $\alpha$ gd1=Cgd/Ctot shown in Embodiment 9 increases continuously or in stages according to the distance from the power feeding edge of the scanning electrode, or the fourth capacitance ratio $\alpha$ st1 shown in Embodiment 10 becomes constant between the pixels on the same scanning electrode.

The first variation is the configuration wherein the first storage capacitance Cst1 and the second storage capacitance Cst2 are decreased according to the distance from the power feeding edge of the scanning electrode while keeping the both ratios constant. This is the case wherein the third capacitance ratio $\alpha$ gd1 shown in (Expression 28) increases according to the distance from the power feeding edge of the scanning electrode.

According to this configuration, there is an advantage of not causing the irregularity of the coupling voltage easily because the value of $\alpha$ st1 of (Expression 30) does not vary easily compared with the case in which only one storage capacitance is increased.

The second variation is the configuration wherein the gate-drain inter-electrode Cgd is increased according to the distance from the power feeding edge of the scanning electrode. This is also the case wherein the third capacitance ratio $\alpha$ gd1 shown in (Expression 28) increases according to the distance from the power feeding edge of the scanning electrode.

The gate-drain inter-electrode capacitance Cgd is smaller than other capacitances, so that there is an advantage of not causing the irregularity of the coupling voltage easily because the value of the fourth capacitance ratio $\alpha$ st1 does not vary easily compared with the case that only one storage capacitance is increased.

The third variation is the configuration wherein the first storage capacitance Cst1 and the second storage capacitance Cst2 are decreased according to the distance from the power feeding edge of the scanning electrode by keeping the fourth capacitance ratio $\alpha$ st1 shown by (Expression 30) constant. The third capacitance ratio $\alpha$ gd1 shown in (Expression 28) increases according to the distance from the power feeding edge of the scanning electrode.

Because the variations in capacitance are two, the configuration is simple, and the value of each capacitance can be set by a comparatively comprehensible method as described in Embodiment 2.

The fourth variation is the configuration wherein the gate-drain inter-electrode capacitance Cgd and the first storage capacitance Cst1 are increased according to the distance from the power feeding edge of the scanning electrode. The value of capacitance is decided for keeping the fourth ratio $\alpha$ st1 shown by (Expression 30) constant. The third capacitance ratio $\alpha$ gd1 shown in (Expression 28) increases according to the distance from the power feeding edge of the scanning electrode. In this configuration, the variations in capacitance are two, so that the configuration is simple.

The fifth variation is the configuration wherein the gate-drain inter-electrode capacitance Cgd is increased according to the distance from the power feeding edge of the scanning electrode and the second storage capacitance Cst2 is decreased according to the distance from the power feeding edge of the scanning electrode. The value of capacitance is decided for keeping the fourth ratio $\alpha$ st1 shown by (Expression 30) constant.

In this configuration, the variations incapacitance are two, so that the configuration is simple. Moreover, when the sum of the gate-drain inter-electrode capacitance Cgd and the second storage capacitance Cst2 is kept being constant, the value of the fourth capacitance ratio $\alpha$ st1 is kept being constant, and it is easy to determine the capacitance value.

(Embodiment 12)

The third display apparatus of this invention is shown. The third display apparatus of this invention is a display that can reduce the irregular display due to inconsistency of the transistor switching timing between the odd number frame case and the even number frame case when using the configuration that employs the method of signal voltage inversion drive, and moreover can reduce the irregular display due to inconsistency of the transistor switching timing by the difference whether the signal voltage applied to the pixel electrode is a positive voltage or a negative voltage when using the configuration that employs the method of the column inversion and the dot inversion.

Figure 39:
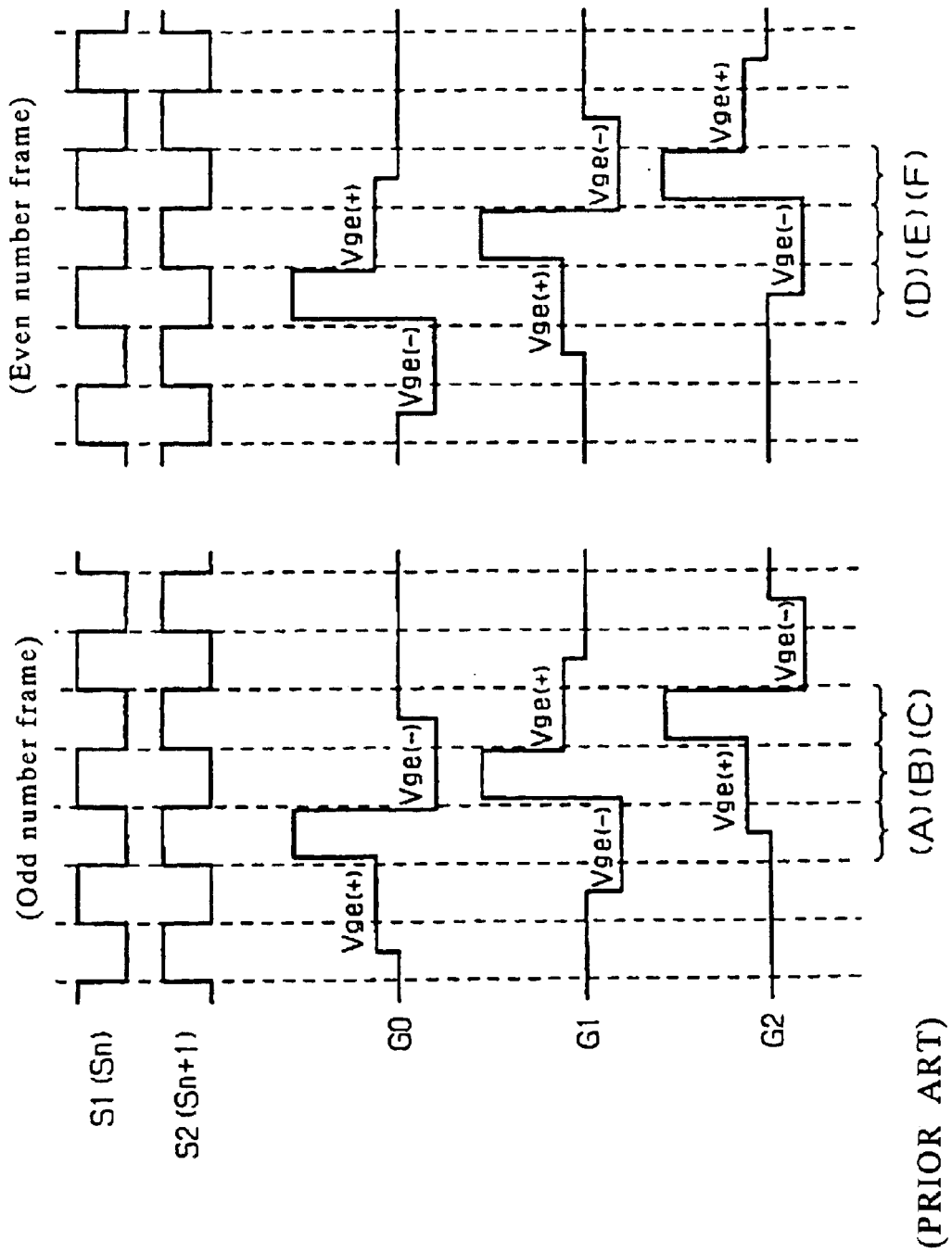
FIG. 39 is a diagram showing a concrete scanning electrode signal drive waveform for the dot inversion method in the prior art.

When the configuration employing the column inversion method and the dot inversion method as shown in FIG. 38 and FIG. 39 is discussed, it is understood that there are the following problems [1] and [2].

[1] There is not necessarily symmetric operating though the pixel P and the pixel Q shown in FIG. 38 are the mirror plane symmetries structurally. Because as shown in FIG. 39 when the scanning direction is defined in the direction from top to the bottom, when a certain scanning electrode is selected, there is a difference in that the scanning electrode which becomes compensation voltage is located at the rear side relative to the scanning direction in the case of pixel P, but it is located at the front side relative to the scanning direction in the case of pixel Q. Due to this difference, the maintained pixel electrode voltages are slightly different between these pixels, so the effective voltages applied to the liquid crystal become different, and as a result, the difference of the display brightness is generated. This is observed as a stripe pattern in vertical direction because it becomes strip patterns by each line.

Figure 37:
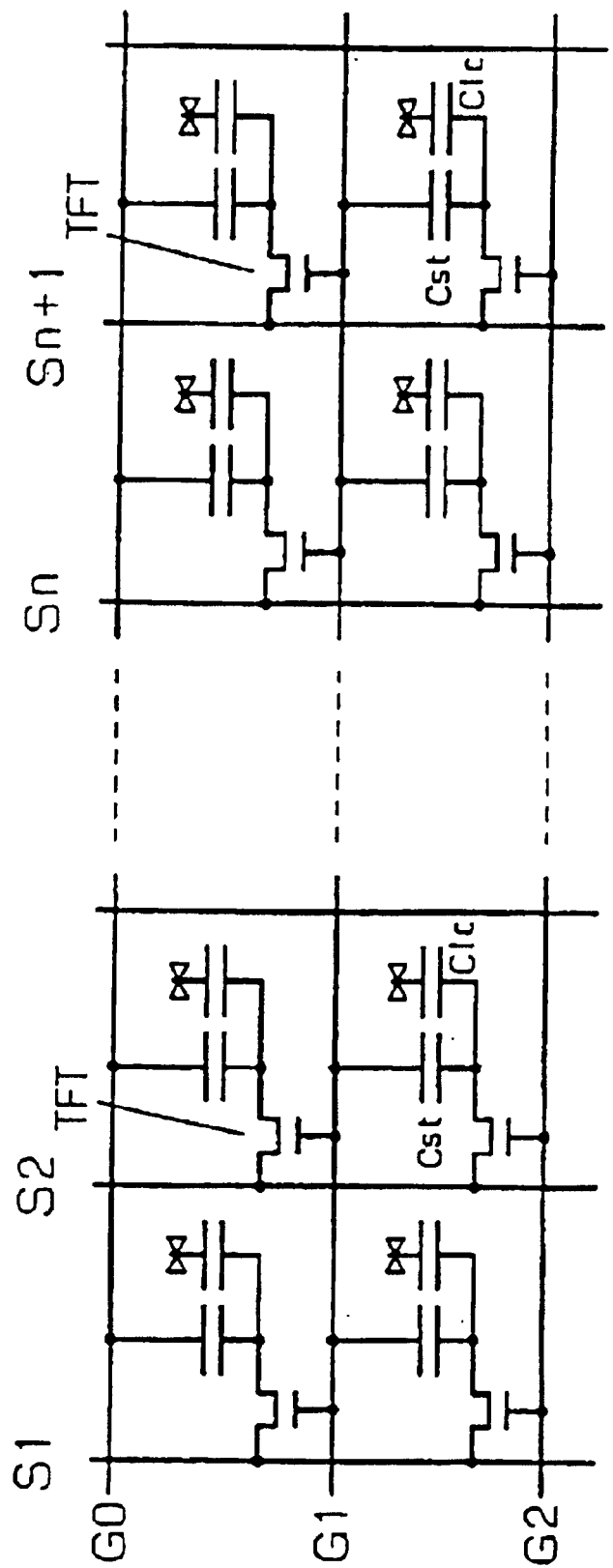
FIG. 37 is a circuit diagram showing one example of the pixel pattern of the display apparatus in the prior art.

[2] when the liquid crystal display apparatus having the pixel structure shown in FIG. 38 and the liquid crystal display apparatus having the pixel structure shown in FIG. 37 are actually driven and the comparison observation is conducted, it is found that the irregular brightness and the flicker in a display is remarkably generated in the preceding case.

First of all, the for the cause above-mentioned [1] is analyzed.

Figure 42:
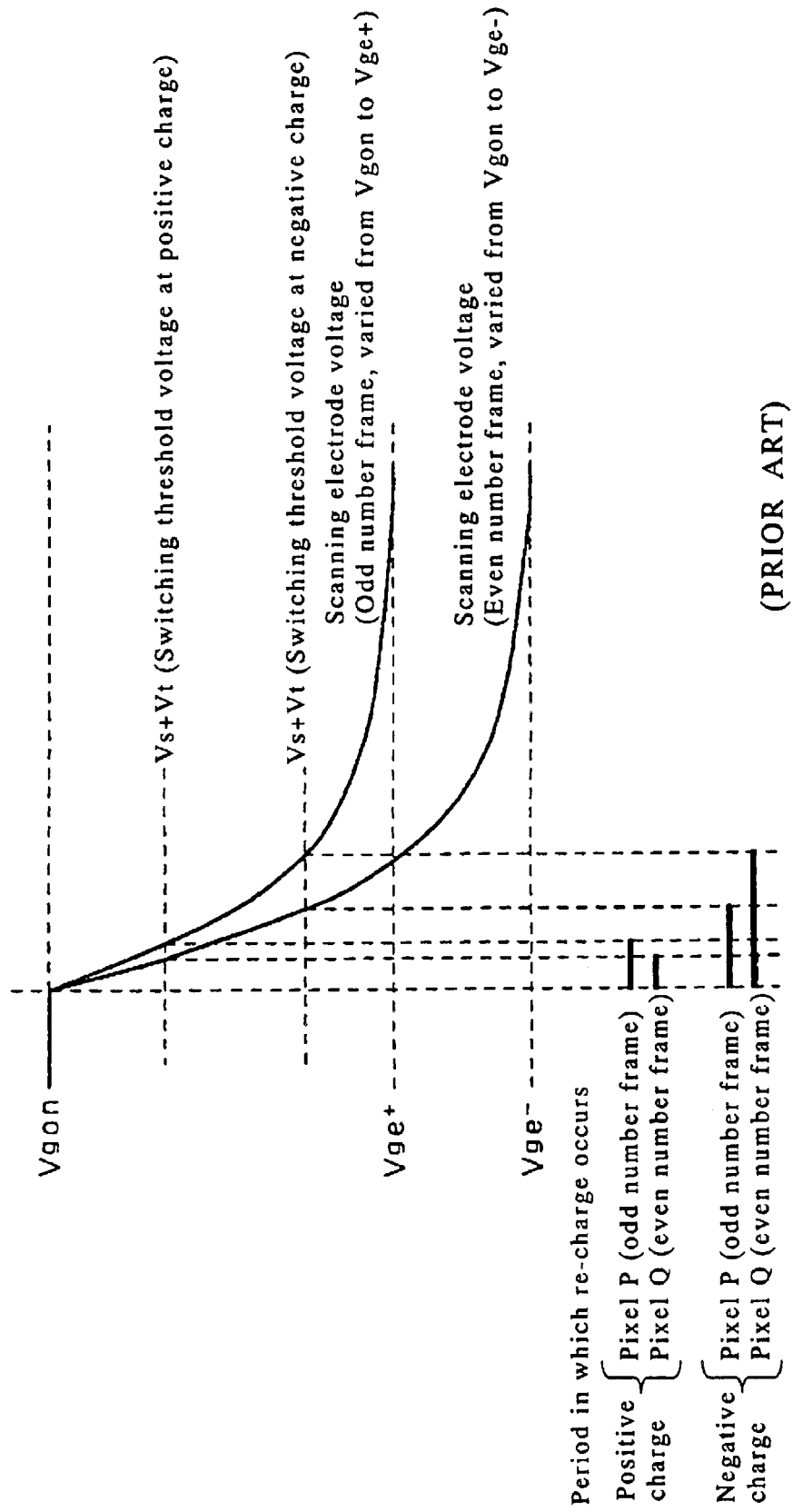
FIG. 42 is a diagram showing the re-charge voltage generation mechanism in detail in a liquid crystal display apparatus in the prior art.
Figure 43:
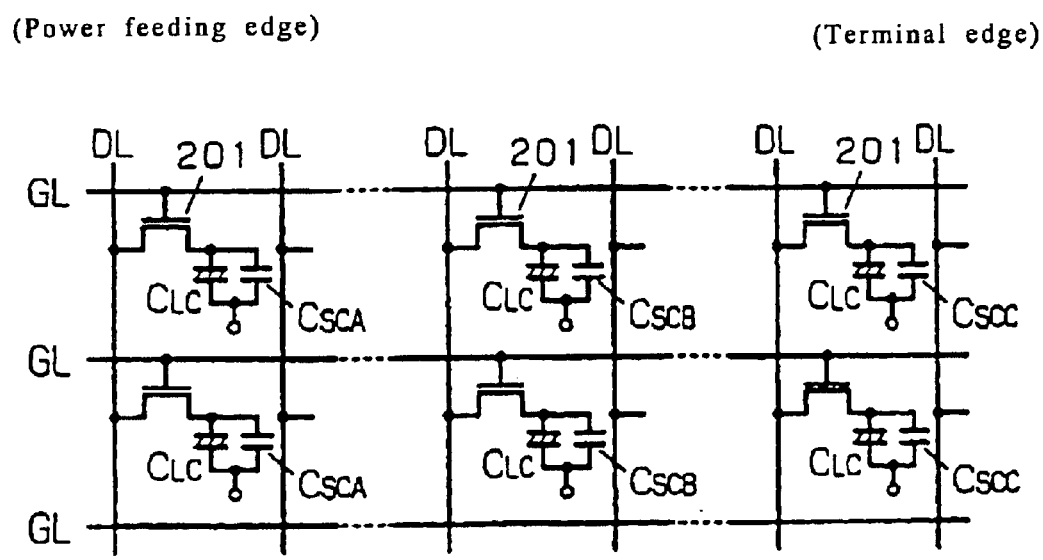
FIG. 43 is a plane diagram showing a configuration of a liquid crystal display apparatus in the prior art.
Figure 44:
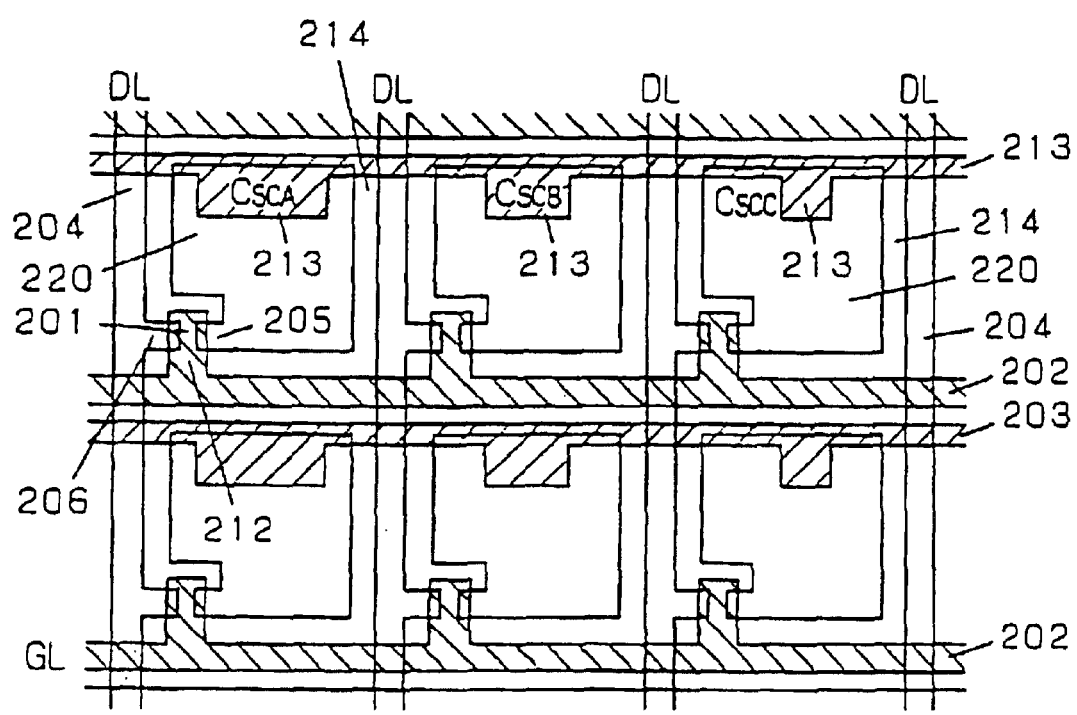
FIG. 44 is a diagram showing a waveform of the voltage of each part in a liquid crystal display apparatus in the prior art.

In FIG. 38, when the scanning electrode G1 is selected, the pixel P is charged to a positive voltage and the pixel Q is charge to a negative voltage in the odd number frame, and the pixel P is charged to a negative voltage and the pixel Q is charged to a positive voltage in the even number frame. And, when overlapping the scanning electrode voltage waveform of the odd number frame and the even number frame, while paying attention to the part where the scanning voltage G1 decreases from Vgon in the waveform shown in FIG. 39, the overlapped drawing is shown in FIG. 42. Because of the difference of the destination value in the descending part in the waveform in the odd number frame and the even number frame (Vge(+) and Vge(−)), even if the time constant of varying is the same, the waveform becomes different. Moreover, the switching threshold voltage is different when being charged to a positive voltage and being charged to a negative voltage, and it is indicated at the level shown in this figure. Based on these, the re-charge current generation period at the odd number frame and the even number frame of the P pixel and the Q pixel is shown in this figure. Because all four pattern of the re-charge voltage generation periods are different, all re-charge voltage ΔVb become different.

When describing the re-charge voltage at the positive charge and the negative charge in the P pixel and in the Q pixel as ΔVb(P,+), ΔVb(P,−), ΔVb(Q,+) and ΔVb(Q,−), there are the following relationships as shown by (Expression 31).

$$\Delta Vb(P, +) > \Delta Vb(Q, +) \quad \text{(Expression 31)}$$
$$\Delta Vb(Q, -) > \Delta Vb(P, -)$$
$$\Delta Vb(Q, -) > \Delta Vb(P, -) > \Delta Vb(P, +) - \Delta Vb(Q, +)$$

This is a relational expression which is generated by the difference of the descending curve of the scanning electrode waveform.

When describing the maintained pixel electrode voltage at the positive charge and the negative charge in the P pixel and in the Q pixel as Vdo(P,+), Vdo(P,−), Vdo(Q,+) and Vdo (Q,−), and the above-mentioned re-charge effect is taken into consideration, there are the following relationships as shown by (Expression 32).

$$Vdo(P, +) = \quad \text{(Expression 32)}$$
$$Vsig(+) - \alpha st\Delta Vge(-) - \alpha gd\Delta Vgon + \Delta Vb(P, +)$$
$$Vdo(P, -) = Vsig(-) - \alpha st\Delta Vge(+) -$$
$$\alpha gd\Delta Vgon + \Delta Vb(P, -)$$
$$Vdo(Q, +) = Vsig(+) - \alpha st\Delta Vge(-) -$$
$$\alpha gd\Delta Vgon + \Delta Vb(Q, +)$$
$$Vdo(Q, -) = Vsig(-) - \alpha st\Delta Vge(+) -$$
$$\alpha gd\Delta Vgon + \Delta Vb(Q, -)$$

The half of the difference of the pixel electrode voltage in a positive charge and a negative charge is the effective value of the voltage applied to the liquid crystal, and when describing the respective effective values of the P pixel and the Q pixel as Veff(P) and Veff(Q), (Expression 33) results.

$$Veff(P) = [\{Vsig(+) - Vsig(-)\} + \quad \text{(Expression 33)}$$
$$\alpha stVgep + \{\Delta Vb(P, +) - \Delta Vb(P, -)\}]/2$$
$$Veff(Q) = [\{Vsig(+) - Vsig(-)\} + \alpha stVgep +$$
$$\{\Delta Vb(Q, +) - \Delta Vb(Q, -)\}]/2$$

wherein, Vgep is shown by (Expression 34).

$$Vgep = \Delta Vge(+) - \Delta Vge(-) = Vge(+) - Vge(-) \quad \text{(Expression 34)}$$

When comparing both expressions in (Expression 33), the difference value is only in the term concerning the re-charge voltage, so when the first expression and the second expression shown in (Expression 31) are taken into consideration, a relationship shown by (Expression 35) is satisfied.

$$Veff(P) > Veff(Q) \quad \text{(Expression 35)}$$

As shown above, the effective value of the liquid crystal applied voltage is different between both pixels, so the brightness of the pixel is different and it will be observed as a stripe pattern.

Next, the cause of the above [2] is analyzed.

Figure 17:
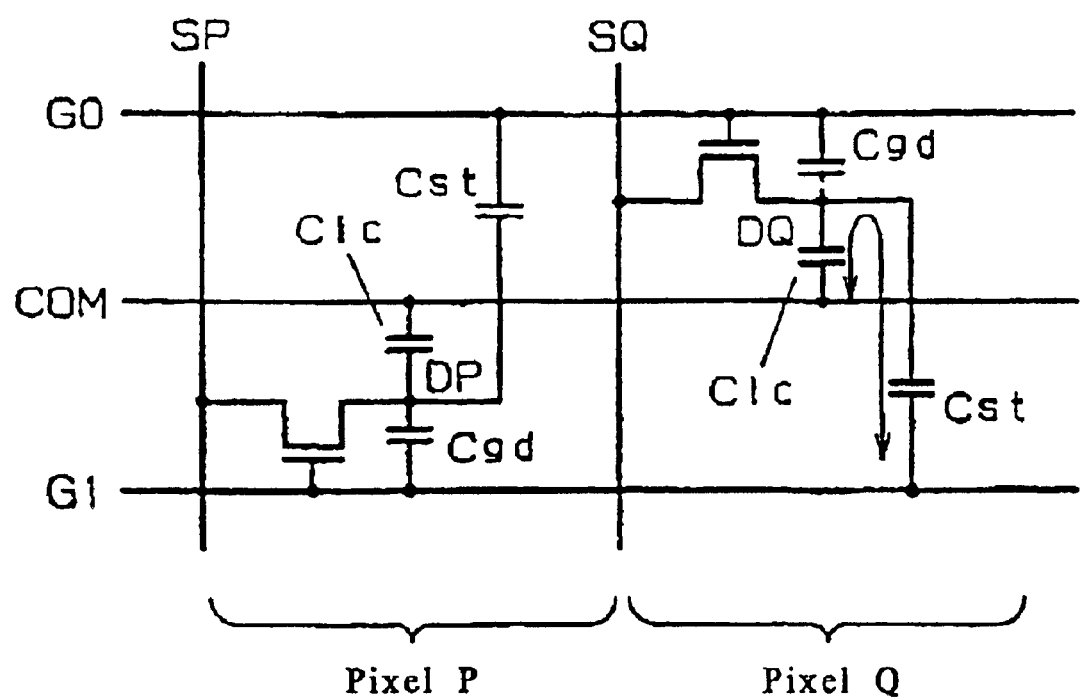
FIG. 17 is a diagram showing re-charge voltage generation mechanism based on the fluctuation of the common electrode voltage.

To understand this cause, it is necessary to consider the fluctuation of the common electrode voltage. When the structure of two pixels adjacent to each other is extracted and drawn, it becomes as shown in FIG. 17. When the charge is completed and the scanning electrode voltage decreases, the pixel electrode voltage of pixel P is lowered by the feed-through voltage. However, the opposite electrode voltage will be lowered by the capacitive coupling (shown by an arrow in the figure) between the scanning electrode (G1)—opposite electrode (COM) generated by the Cst and Cle of the pixel Q (although Cgd-Clc of pixel P is thought of as the capacitance path between G-COM, Cgd is very small compared with Cst and Clc, so Cgd does not make a big contribution). This voltage decrease becomes small at the screen periphery part near the voltage fixed edge of the common electrode, and it become big at the part far from the voltage fixed edge of the common electrode. When the opposite electrode voltage decreases, the pixel electrode voltage of the pixel P further decreases according to the opposite electrode voltage. In this case, a large amount of the re-charge currency will flow toward the pixel electrode of the pixel P compared with the case when the opposite electrode voltage is not varied at all. Therefore, the maintained pixel electrode voltage at the center part of the display becomes very large compared with that of at the edge part, so it becomes the cause by which a flicker and brightness irregularity are generated. This is caused by the circuit configuration of FIG. 17, however, in the conventional example shown by FIG. 37, this phenomenon is not generated remarkably (in FIG. 37, there is no coupling by the large capacitance such as Cst-Clc between the scanning electrode and the common electrode).

When describing the flicker and the brightness irregularity mathematically, it is shown as follows. The DC average level Vdc and the effective value Veff of the pixel P and the pixel Q of (Expression 32) are shown as (Expression 36).

$$Vdc = \qquad \text{(Expression 36)}$$
$$\{Vdo(P,+) + Vdo(P,-) + Vdo(Q,+) + Vdo(Q,-)\}/4 =$$
$$\{Vsig(+) + Vsig(-)\}/2 - \alpha st\Delta Vgec -$$
$$\alpha gd\Delta Vgon + \{\Delta Vb(P,+) + \Delta Vb(P,-) +$$
$$\Delta Vb(Q,+) + \Delta Vb(Q,-)\}/4$$
$$Veff = \{Vdo(P,+) - Vdo(P,-) + Vdo(Q,+) -$$
$$Vdo(Q,-)\}/4 =$$
$$\{Vsig(+) - Vsig(-)\}/2 + \alpha stVgep/2 + \{\Delta Vb(P,+) -$$
$$\Delta Vb(P,-) + \Delta Vb(Q,+) - \Delta Vb(Q,-)\}/4$$

wherein, $\Delta Vgec$ is expressed by (Expression 37).

$$\Delta Vgec = \{\Delta Vge(+) + \Delta Vge(-)\}/2 = \qquad \text{(Expression 37)}$$
$$\{Vge(+) + Vge(-)\}/2 - Vgoff$$

In the first expression of (Expression 36), an effective average value of the pixel electrode voltage is Vdc, and when the common electrode voltage is adjusted to the same voltage as Vdc, the average value of the time of the voltage applied to the liquid crystal becomes 0. However, $\Delta Vb(P,+)$, $\Delta Vb(P,-)$, $\Delta Vb(Q,+)$ and $\Delta Vb(Q,-)$ become different between the edge part and the center part of the display screen. Therefore, when the value Vdc is different, it is impossible to cancel the flicker at the same time at the edge part and the center part of the display screen. That is, the flicker cannot be cancelled through all areas, so the flicker remains somewhere on the screen. The second expression of (Expression 36), $\Delta Vb(P,+)$, $\Delta Vb(P,-)$, $\Delta Vb(Q,+)$ and $\Delta Vb(Q,-)$ becomes different between the edge part and the center part of the display screen, and Veff becomes different, so the brightness irregularity will be generated.

Analyzing as shown above, the means for canceling these problems such as strip pattern, brightness irregularity and flicker are obtained in the present invention. This is the basic object of the third display apparatus of the present invention, in which the value of $\alpha$ st and $\alpha$ gd between the pixel P and the pixel Q are discriminated and the inclination is given to these in the screen. The configuration example and the operation example of the display apparatus of the Embodiment 12 are explained as follows.

It is assumed that $\alpha$ st and $\alpha$ gd are different in pixel P and pixel Q and it is assumed that the value is not constant in the screen (that is, neither Cgd, Cst nor Clc are constant). And, respective $\alpha$ st and $\alpha$ gd of the pixel P and the pixel Q at the edge part and center part of the display screen are described as $\alpha$ st(P,O), $\alpha$ st(P,E), $\alpha$ st(Q,O), $\alpha$ st(Q,E), $\alpha$ gd(P,O), $\alpha$ gd(P,E), $\alpha$ gd(Q,O), $\alpha$ gd(Q,E), wherein, "O" represents an edge of the screen, and "E" represents a center of the screen. $\alpha$ st and $\alpha$ gd are assumed to be gradually varying between the values indicated by 0 and E between edge (0) and center (E).

At each edge part and center part of the display screen, when the pixel P and the pixel Q are charged to a positive voltage and a negative voltage, the following eight expressions shown by (Expression 38) can be obtained when (Expression 32) is applied.

$$Vdo(P,0,+) = Vsig(+) - \alpha st(P,0)\Delta Vge(-) - \qquad \text{(Expression 38)}$$
$$\alpha gd(P,0)\Delta Vgon + \Delta Vb(P,0,+)$$
$$Vdo(P,0,-) = Vsig(-) - \alpha st(P,0)\Delta Vge(+) -$$
$$\alpha gd(P,0)\Delta Vgon + \Delta Vb(P,0,-)$$
$$Vdo(P,E,+) = Vsig(+) - \alpha st(P,E)\Delta Vge(-) -$$
$$\alpha gd(P,E)\Delta Vgon + \Delta Vb(P,E,+)$$
$$Vdo(P,E,-) = Vsig(-) - \alpha st(P,E)\Delta Vge(+) -$$
$$\alpha gd(P,E)\Delta Vgon + \Delta Vb(P,E,-)$$
$$Vdo(Q,0,+) = Vsig(+) - \alpha st(Q,0)\Delta Vge(-) -$$
$$\alpha gd(Q,0)\Delta Vgon + \Delta Vb(Q,0,+)$$
$$Vdo(Q,0,-) = Vsig(-) - \alpha st(Q,0)\Delta Vge(+) -$$
$$\alpha gd(Q,0)\Delta Vgon + \Delta Vb(Q,0,-)$$
$$Vdo(Q,E,+) = Vsig(+) - \alpha st(Q,E)\Delta Vge(-) -$$
$$\alpha gd(Q,E)\Delta Vgon + \Delta Vb(Q,E,+)$$
$$Vdo(Q,E,-) = Vsig(-) - \alpha st(Q,E)\Delta Vge(+) -$$
$$\alpha gd(Q,E)\Delta Vgon + \Delta Vb(Q,E,-)$$

Herein, for instance, the mark named Vdo(i, j, ±) (i=P or Q, j=O or E) means the voltage charge amount when (+) corresponds to the positive charge, (−) corresponds to the negative charge at the position j of the pixel i (j=0→both ends of screen, j=E→center of screen). Regarding Vsig(±) and $\Delta Vb(i, j, \pm)$, that definition is the same.

In the case of the conventional example, because the value of $\Delta Vb$ is different between the pixel P and the pixel Q, or it is different between the center part and the edge part of the screen, Vdo is also different, so the stripe pattern, the flicker, and the brightness irregularity are generated. On the contrary, the present invention tries to correct the difference of the value of $\Delta Vb$ by varying the values of four sets of $\alpha$ st and $\alpha$ gd independently. The effective value differences $\Delta Veff(O)$ and $\Delta Veff(E)$ of the pixel P and the pixel Q at the edge part and the center part of the display screen are calculated by (Expression 38), as described in (Expression 39).

$$\Delta Veff(0) = \{Vdo(P,0,+) - Vdo(P,0,-)\}/2 - \qquad \text{(Expression 39)}$$
$$\{Vdo(Q,0,+) - Vdo(Q,0,-)\}/2 =$$
$$\{\alpha st(P,0) - \alpha st(Q,0)\}Vgep +$$
$$\{\Delta Vb(P,0,+) - \Delta Vb(P,0,-) -$$
$$\Delta Vb(Q,0,+) + \Delta Vb(Q,0,-)\}/2$$

-continued
$$\Delta Veff(E) = \{Vdo(P, E, +) - Vdo(P, E, -)\}/2 -$$
$$\{Vdo(Q, E, +) - Vdo(Q, E, -)\}/2 =$$
$$\{\alpha st(P, E) - \alpha st(Q, E)\}Vgep +$$
$$\{\Delta Vb(P, E, +) - \Delta Vb(P, E, -) -$$
$$\Delta Vb(Q, E, +) + \Delta Vb(Q, E, -)\}/2$$

Moreover, the difference of the DC average level of the pixel P and the pixel Q $\Delta Vdc(O)$ and $\Delta Vdc(E)$ similarly are calculated as (Expression 40).

$$\Delta Vdc(O) = \{Vdo(P, 0, +) + Vdo(P, 0, -)\}/2 - \quad \text{(Expression 40)}$$
$$\{Vdo(Q, 0, +) + Vdo(Q, 0, -)\}/2 =$$
$$-\{\alpha st(P, 0) - \alpha st(Q, 0)\}\Delta Vgec -$$
$$\{\alpha gd(P, 0) - \alpha gd(Q, 0)\}\Delta Vgon +$$
$$\{\Delta Vb(P, 0, +) + \Delta Vb(P, 0, -) -$$
$$\Delta Vb(Q, 0, +) - \Delta Vb(Q, 0, -)\}/2$$
$$\Delta Vdc(E) = \{Vdo(P, E, +) + Vdo(P, E, -)\}/2 -$$
$$\{Vdo(Q, E, +) + Vdo(Q, E, -)\}/2 =$$
$$-\{\alpha st(P, E) - \alpha st(Q, E)\}\Delta Vgec -$$
$$\{\alpha gd(P, E) - \alpha gd(Q, E)\}\Delta Vgon +$$
$$\{\Delta Vb(P, E, +) + \Delta Vb(P, E, -) -$$
$$\Delta Vb(Q, E, +) - \Delta Vb(Q, E, -)\}/2$$

Herein, in order to cancel the strip pattern at the edge part and the center part of the display screen, $\Delta Veff(O)=0$ and $\Delta Veff(E)=0$ are set in the (Expression 39) and four pieces of $\alpha$ st are set to satisfy following (Expression 41).

$$\{\alpha st(P, 0) - \alpha st(Q, 0)\}Vgep = \quad \text{(Expression 41)}$$
$$-\{\Delta Vb(P, 0, +) - \Delta Vb(P, 0, -) -$$
$$\Delta Vb(Q, 0, +) + \Delta Vb(Q, 0, -)\}/2$$
$$\{\alpha st(P, E) - \alpha st(Q, E)\}Vgep =$$
$$-\{\Delta Vb(P, E, +) - \Delta Vb(P, E, -) -$$
$$\Delta Vb(Q, E, +) + \Delta Vb(Q, E, -)\}/2$$

When this case is treated the same as the case described by the first expression and the second expression of (Expression 31), (Expression 42) can result. Therefore, the term shown by { } at the right side of (Expression 41) becomes a positive value. Vgep is a positive value, and four pieces of $\alpha$ st can be described as (Expression 43).

$$\Delta Vb(P, 0, +) > \Delta Vb(Q, 0, +) \quad \text{(Expression 42)}$$
$$\Delta Vb(Q, 0, -) > \Delta Vb(P, 0, -)$$
$$\Delta Vb(P, E, +) > \Delta Vb(Q, E, +)$$
$$\Delta Vb(Q, E, -) > \Delta Vb(P, E, -)$$

$$\alpha st(P, 0) < \alpha st(Q, 0) \quad \text{(Expression 43)}$$
$$\alpha st(P, E) < \alpha st(Q, E)$$

The condition of the effective value of the liquid crystal applied voltage is described above, and next, the DC average level is described. When the DC average level in both pixels is different, and even when there are flickers at the pixel P and the pixel Q respectively, but both are mutually anti-phases, so by setting the common electrode voltage in the vicinity of the average value of the respective DC average level, these are canceled by each other. As a result, the flicker will not be observed macroscopically. However, in order to achieve a high resolution quality, it is preferable that no flicker is seen microscopically, too. That is, the pixel P is matched to the DC average level of the pixel Q, and it is preferable to put the common electrode voltage to that level. In order to achieve this, $\Delta Vdc(O)=0$, and $\Delta Vdc(E)=0$ is set in (Expression 40), and (Expression 44) is satisfied.

$$\{\alpha st(P, 0) - \alpha st(Q, 0)\}\Delta Vgec + \quad \text{(Expression 44)}$$
$$\{\alpha gd(P, 0) - \alpha gd(Q, 0)\}\Delta Vgon =$$
$$\{\Delta Vb(P, 0, +) + \Delta Vb(P, 0, -) -$$
$$\Delta Vb(Q, 0, +) - \Delta Vb(Q, 0, -)\}/2$$
$$\{\alpha st(P, E) - \alpha st(Q, E)\}\Delta Vgec +$$
$$\{\alpha gd(P, E) - \alpha gd(Q, E)\}\Delta Vgon =$$
$$\{\Delta Vb(P, E, +) + \Delta Vb(P, E, -) -$$
$$\Delta Vb(Q, E, +) - \Delta Vb(Q, E, -)\}/2$$

By considering the third expression of (Expression 31), the term shown by { } at the right side becomes a negative value. Therefore, when $\beta(P,0)$, $\beta(Q,0)$, $\beta(P,E)$ and $\beta(Q,E)$ which are shown the same as (Expression 45) and (Expression 46) are defined, (Expression 47) should be satisfied.

$$\beta(P, 0) = \alpha st(P, 0)(\Delta Vgec/\Delta Vgon) + \alpha gd(P, 0) \quad \text{(Expression 45)}$$
$$\beta(Q, 0) = \alpha st(Q, 0)(\Delta Vgec/\Delta Vgon) + \alpha gd(Q, 0)$$

$$\beta(P, E) = \alpha st(P, E)(\Delta Vgec/\Delta Vgon) + \alpha gd(P, E) \quad \text{(Expression 46)}$$
$$\beta(Q, E) = \alpha st(Q, E)(\Delta Vgec/\Delta Vgon) + \alpha gd(Q, E)$$

$$\beta(P, 0) < \beta(Q, 0) \quad \beta(P, E) < \beta(Q, E) \quad \text{(Expression 47)}$$

Next, the difference of $\Delta Vdc$ and $\Delta Veff$ between the edge part and the center part of the display screen is described as (Expression 48), wherein a DC average level $Vdc$ and an average effective value $Veff$ at the pixel P and the pixel Q shown by (Expression 36).

$$\Delta Vdc = \quad \text{(Expression 48)}$$
$$\{Vdo(P, E, +) + Vdo(P, E, -) + Vdo(Q, E, +) + Vdo(Q,$$
$$E, -)\}/4 - \{Vdo(P, 0, +) + Vdo(P, 0, -) +$$
$$Vdo(Q, 0, +) + Vdo(Q, 0, -)\}/4 =$$
$$-\{(\alpha st(P, E) + \alpha st(Q, E)) - (\alpha st(P, 0) + \alpha st(Q, 0)\}$$
$$\Delta Vgec/2 - \{(\alpha gd(P, E) + \alpha gd(Q, E)) -$$
$$(\alpha gd(P, 0) + \alpha gd(Q, 0)\}\Delta Vgon/2 +$$
$$\{\Delta Vb(P, E, +) + \Delta Vb(P, E, -) +$$
$$\Delta Vb(Q, E, +) + \Delta Vb(Q, E, -) -$$
$$\Delta Vb(P, 0, +) - \Delta Vb(P, 0, -) -$$
$$\Delta Vb(Q, 0, +) - \Delta Vb(Q, 0, -)\}/4$$

$$\Delta Veff = \{Vdo(P, E, +) - Vdo(P, E, -) + Vdo(Q, E, +) -$$
$$Vdo(Q, E, -)\}/4 -$$

-continued $$\{Vdo(P, 0, +) - Vdo(P, 0, -) +$$
$$Vdo(Q, 0, +) - Vdo(Q, 0, -)\}/4 =$$
$$-\{(\alpha st(P, E) + \alpha st(Q, E)) -$$
$$(\alpha st(P, 0) + \alpha st(Q, 0))\}\Delta Vgep/4 +$$
$$\Delta Vb(P, E, +) -$$
$$\{\Delta Vb(P, E, -) + \Delta Vb(Q, E, +) -$$
$$\Delta Vb(Q, E, -) - \Delta Vb(P, 0,$$
$$+) + \Delta Vb(P, 0, -) - \Delta Vb(Q,$$
$$0, +) + \Delta Vb(Q, 0, -)\}/4$$

In order to cancel the brightness irregularity, $\Delta$Veff=0 is set and (Expression 49) is satisfied.

$$\{(\alpha st(P, E) + \alpha st(Q, E)) - (\alpha st(P, 0) + \alpha st(Q, 0))\}\Delta Vgep = \quad \text{(Expression 49)}$$
$$-\{\Delta Vb(P, E, +) - \Delta Vb(P, E, -) + \Delta Vb(Q, E, +) -$$
$$\Delta Vb(Q, E, -) - \Delta Vb(P, 0, +) +$$
$$\Delta Vb(P, 0, -) - \Delta Vb(Q, 0, +) + \Delta Vb(Q, 0, -)\}$$

Herein, considering the relation shown in FIG. 42, and considering that the generation of the re-charge more often is noticeable in the center part of the display screen than in the edge part of the display screen, the term shown by { } at the right side becomes a negative value. Therefore, (Expression 50) should be satisfied.

$$\{\alpha st(P, E) + \alpha st(Q, E)\}/2 > \{\alpha st(P, 0) + \alpha st(Q, 0)\}/2 \quad \text{(Expression 50)}$$

In order to cancel flicker, $\Delta Vdc =$ 0 is set and (Expression 51) should be satisfied.

$$\{(\alpha st(P, E) + \alpha st(Q, E)) - (\alpha st(P, 0) + \alpha st(Q, 0))\}\Delta Vgec + \quad \text{(Expression 51)}$$
$$\{(\alpha gd(P, E) + \alpha gd(Q, E) - (\alpha gd(P, 0) + \alpha gd(Q, 0))\}\Delta$$
$$Vgon = \{\Delta Vb(P, E, +) + \Delta Vb(P, E, -) +$$
$$\Delta Vb(Q, E, +) + \Delta Vb(Q, E, -) -$$
$$\Delta Vb(P, 0, +) - \Delta Vb(P, 0, -) -$$
$$\Delta Vb(Q, 0, +) - \Delta Vb(Q, 0, -)\}/2$$

Herein, considering that the re-charge voltage at the edge part of the display screen is larger than that at the center part, the term shown by { } at the right side becomes a positive value. Therefore, (Expression 52) should be satisfied while considering (Expression 46).

$$\{\beta(P, E) + \beta(Q, E)\}/2 > \{\beta(P, 0) + \beta(Q, 0)\}/2 \quad \text{(Expression 52)}$$

As mentioned above, when $\alpha$ st and $\beta$ are selected appropriately, the strip pattern, flicker and brightness irregularity can be canceled.

In conclusion, in the array configuration shown in FIG. 17, the conditions for canceling the strip pattern, brightness irregularity and flicker are shown as follows.

[1] The necessary condition for canceling the strip pattern: (Expression 53)

$$\alpha st(P) < \alpha st(Q) \quad \text{(Expression 53)}$$

[2] The necessary condition for canceling the flicker seen microscopically: (Expression 54)

$$\beta(P) < \beta(Q) \quad \text{(Expression 54)}$$

wherein $\beta(P)$, $\beta(Q)$ are described by (Expression 55)

$$\beta(P) = \alpha st(P)(\Delta Vgec/\Delta Vgon) + \alpha gd(P) \quad \text{(Expression 55)}$$
$$\beta(Q) = \alpha st(Q)(\Delta Vgec/\Delta Vgon) + \alpha gd(Q)$$

[3] The necessary condition for canceling the brightness irregularity:
The value $(\alpha\,\text{st}(P) + \alpha\,\text{st}(Q))/2$ at the center part of the display screen is larger than that at the edge part of the display screen

[4] The necessary condition for canceling the flicker (seen macroscopically):
The value $(\beta(P)+\beta(Q))/2$ at the center part of the display screen is larger than that at the edge part of the display screen In the above, the parameter "0" and "E" are omitted.

Figure 18:
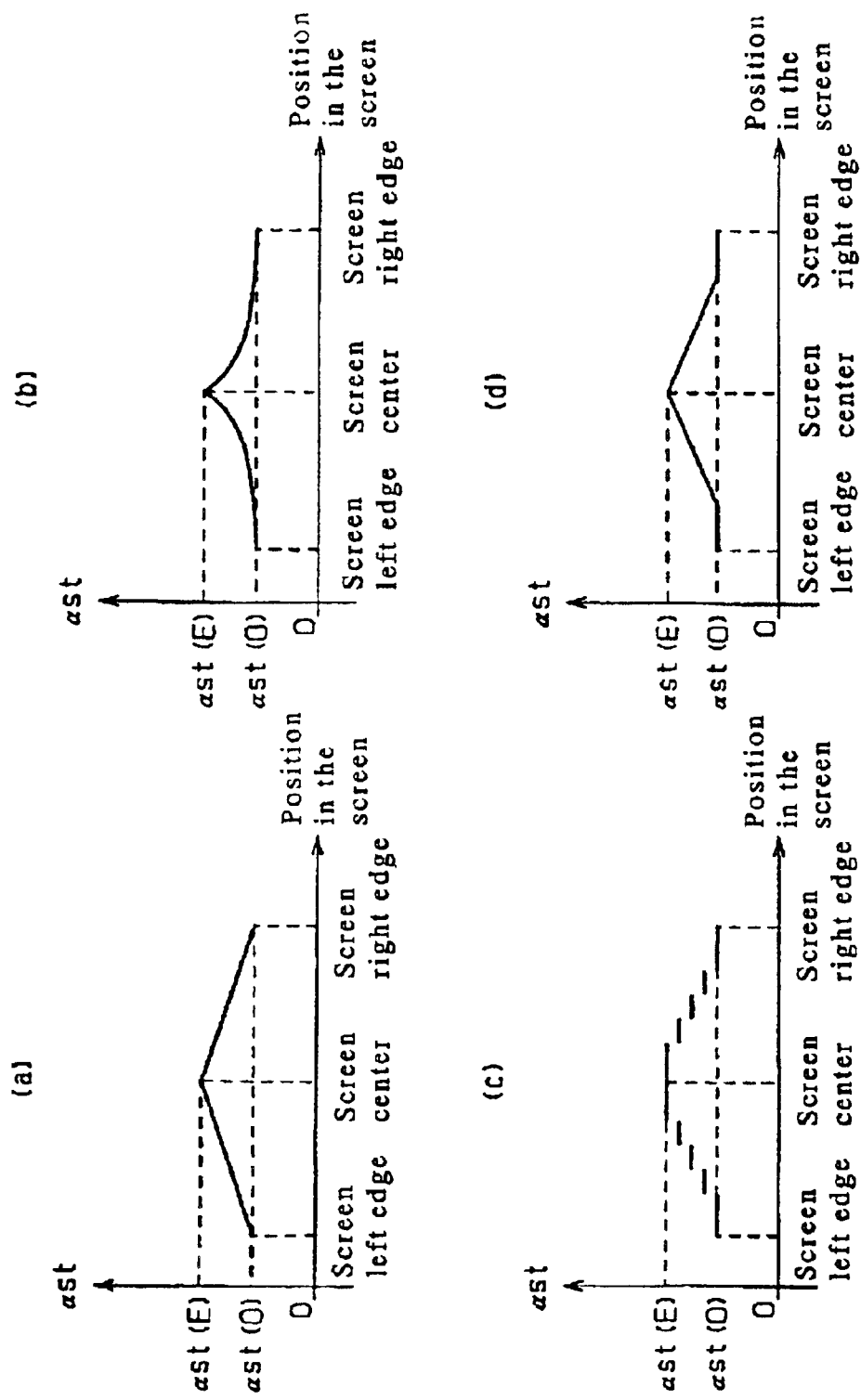
FIG. 18 is a diagram showing how to assign the distribution of α st or β when employing the both sides power feeding in a liquid crystal display apparatus according to Embodiment 12 of the present invention.

Though the edge and the center part of the screen have been treated as the representative point, various patterns for $\alpha\,\text{st}=(\alpha\,\text{st}(P)+\alpha\,\text{st}(Q))/2$, and $\beta=(\beta(P)+\beta(Q))/2$ are considered as a pattern of varying at each position between the edge and the center part of the screen. FIG. 18 shows the one example. Each figure takes the horizontal direction on the screen in the horizontal axis, and takes the value of $\alpha$ st in the vertical axis (though it uses as an example of $\alpha$ st, as for $\beta$, it is similar to $\alpha$ st). The most easy case is a pattern may vary in the straight line shown as (a). Moreover, a pattern may vary in the nonlinear line shown as (b) or a pattern may vary in stages shown as (c). Or, a pattern may have a constant part and an inclination part fixedly shown as (d). It is seen that those patterns commonly vary from the view point of increasing continuously or in stages according to the distance from the edge of the screen. By either pattern, the effect of the present invention is achieved.

Among them, the pattern that varies in the curve shown as (b), and has $\alpha$ st$-\alpha$ st(0) substantially proportional to the second power of the distance from the screen edge is the most preferable case ($\alpha$ st(0) shows $\alpha$ st in the edge of the screen). Because, re-charging voltage is proportional to the time constant of the varying in the waveform of the scanning electrode voltage, that is the CR time constant of the scanning electrode, and the wiring capacitance and the wiring resistance when based on a certain position is substantially proportion to the second power of the distance from the screen edge, therefore, re-charging voltage is substantially proportion to the second power of the distance from the screen edge. By substantially proportioning $\alpha$ st$-\alpha$ st(0) to the second power of the distance from the screen edge, the correction for the re-charging voltage can be conducted around all pixels in the screen, and brightness irregularity can be canceled. Regarding $\beta$, the same as $\alpha$ st, by substantially proportioning $\beta-\beta(\mathbf{0})$ to the second power of the distance from the screen edge, flicker can be canceled dramatically in all pixels in the screen. A sufficient effect can be achieved even if it is not proportional to the second power precisely but it is proportional to about 1.2~2.8 power.

In the above case, the scanning electrode is assumed as employing the both sides power feeding. When employing the one side power feeding, it can be read by replacing "center part of the screen" with "the edge part to which power is not fed" instead.

The liquid crystal display applying the above-mentioned method to the In-plane switching (IPS) mode is described as follows.

Figure 19:
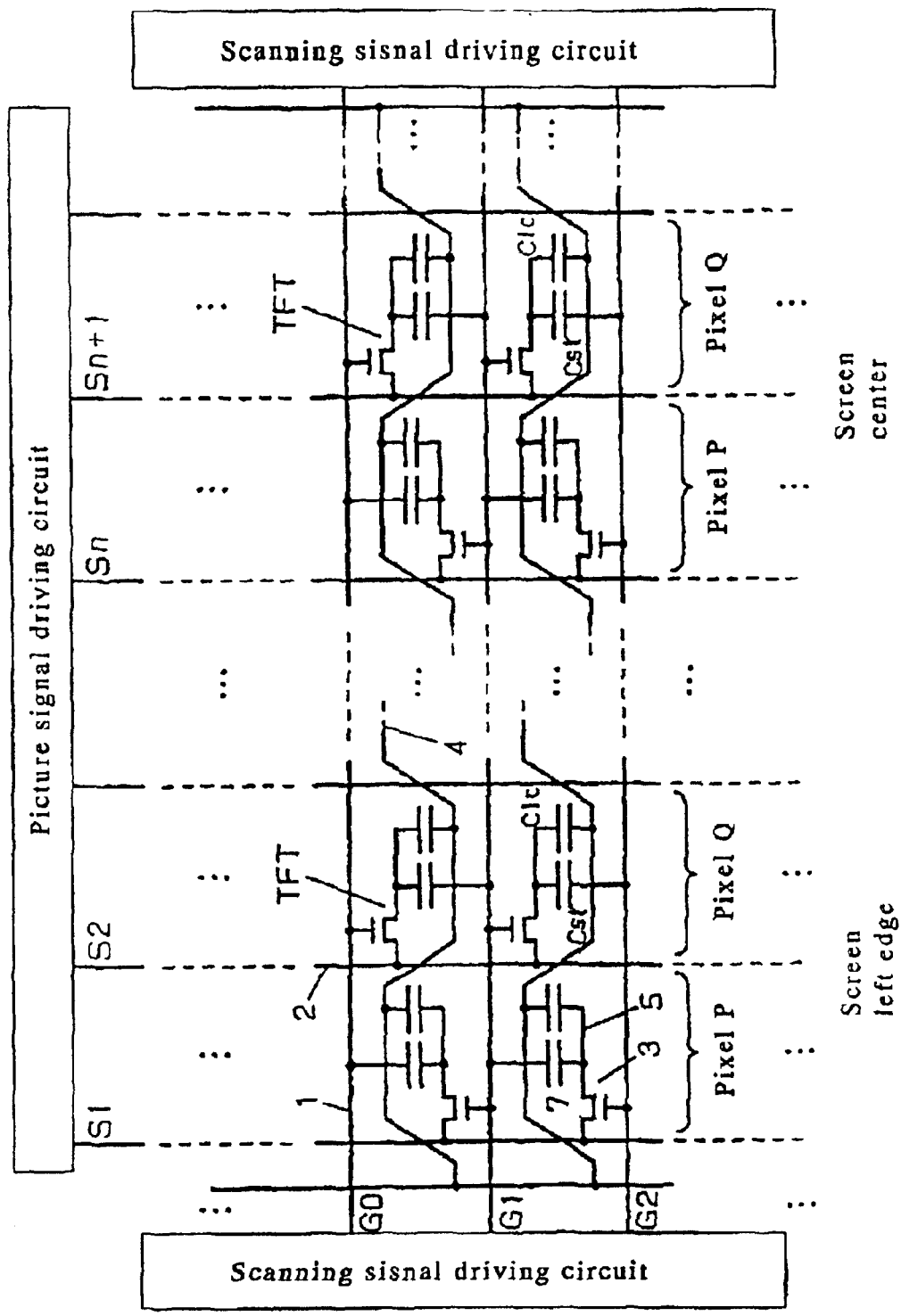
FIG. 19 is a diagram showing a circuit configuration of an IPS liquid crystal display apparatus applied to a liquid crystal display apparatus according to Embodiment 12 of the present invention.
Figure 20:
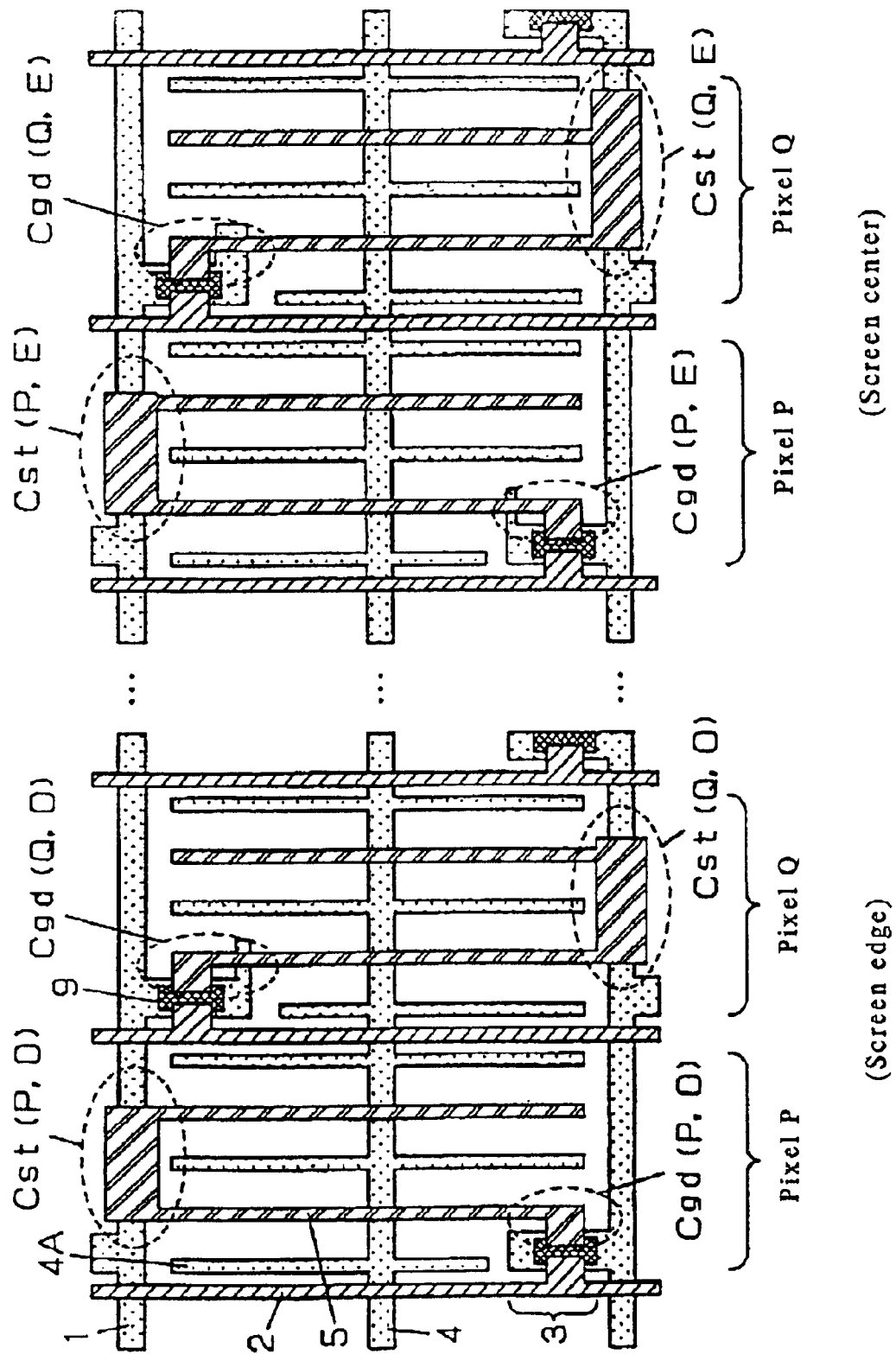
FIG. 20 is a diagram showing the pixels located at the left edge and the central part of the screen among the pixels shown in FIG. 19.

FIG. 19 shows the circuit structure of the display apparatus of this invention that uses the IPS mode liquid crystal. The pixel structure shown in FIG. 38 is arranged in the array. For the scanning electrode, the power is fed from the scanning signal drive circuit in the right and left edge of the screen. For the picture signal electrode, the power is fed from the picture signal drive circuit in the upper part of the screen (in the figure, the example when the scanning electrode is driven by the both sides power feeding is shown. Moreover, the picture signal electrode is driven by the both sides power feeding or by the alternate upper/lower side power feeding in every column). In FIG. 20, the pixel of the left edge and center part of the screen of FIG. 19 is extracted and FIG. 20 shows its layout. Cst and Cgd of the pixel P and the pixel Q in each part are described as Cst(P,0), Cgd(P,0), Cst(Q,0), Cgd(Q,0), or Cst(P,E), Cgd(P,E), Cst(Q,E), Cgd (Q,E), and there are the following features in the layout.

[1] The shape of Cgd and Cst of pixel P and pixel Q are not the same in either the edge part of the screen and the center of the screen, and the capacitance value is different. Especially, in the layout of the circuit structure, both $\alpha$ st defined by (Expression 23) and $\beta$ defined by (Expression 55) of pixel P are larger than that of pixel Q.

[2] The shape of Cst and Cgd of pixel P and pixel Q are not the same in either the edge part of the screen and the center of the screen, and the capacitance value is different. Especially, $\{\beta(P)+\beta(Q)\}/2$ calculated from $\alpha$ st defined by (Expression 23) and $\beta(P)$ and $\beta(Q)$ defined by (Expression 55) in the center part of the screen are larger than in the edge part of the screen. The shape of Cst and Cgd are varied continuously or in stages between the edge part of the screen and the center part of screen, and $\alpha$ st and $\{\beta(P)+\beta(Q)\}/2$ are varied continuously or in stages between the edge part of the screen and the center part of screen.

By these characteristics, the stripe pattern, the flicker, and the brightness irregularity are remarkably decreased according to the principle previously described.

In the display apparatus of the present invention, the stripe pattern, the brightness irregularity, and the flicker can be canceled at the same time by the capacitively coupled driving. Because, when employing a drive without compensation period such as a capacitively coupled driving (That is the drive having only two scanning electrode voltage Vgon and Vgoff. This is the case where Vge (+)=Vge(−)=0, that is, ΔVgec=0 and Vgep=0 in FIG. 35 or FIG. 39), the coefficient of the term including $\alpha$ st becomes 0 by ΔVgec=Vgep=0 in (Expression 41), (Expression 44), (Expression 49), or (Expression 51). Therefore, no matter how $\alpha$ st is varied, the correction for the pixel electrode maintained voltage cannot be performed.

(Embodiment 13)

Figure 21:
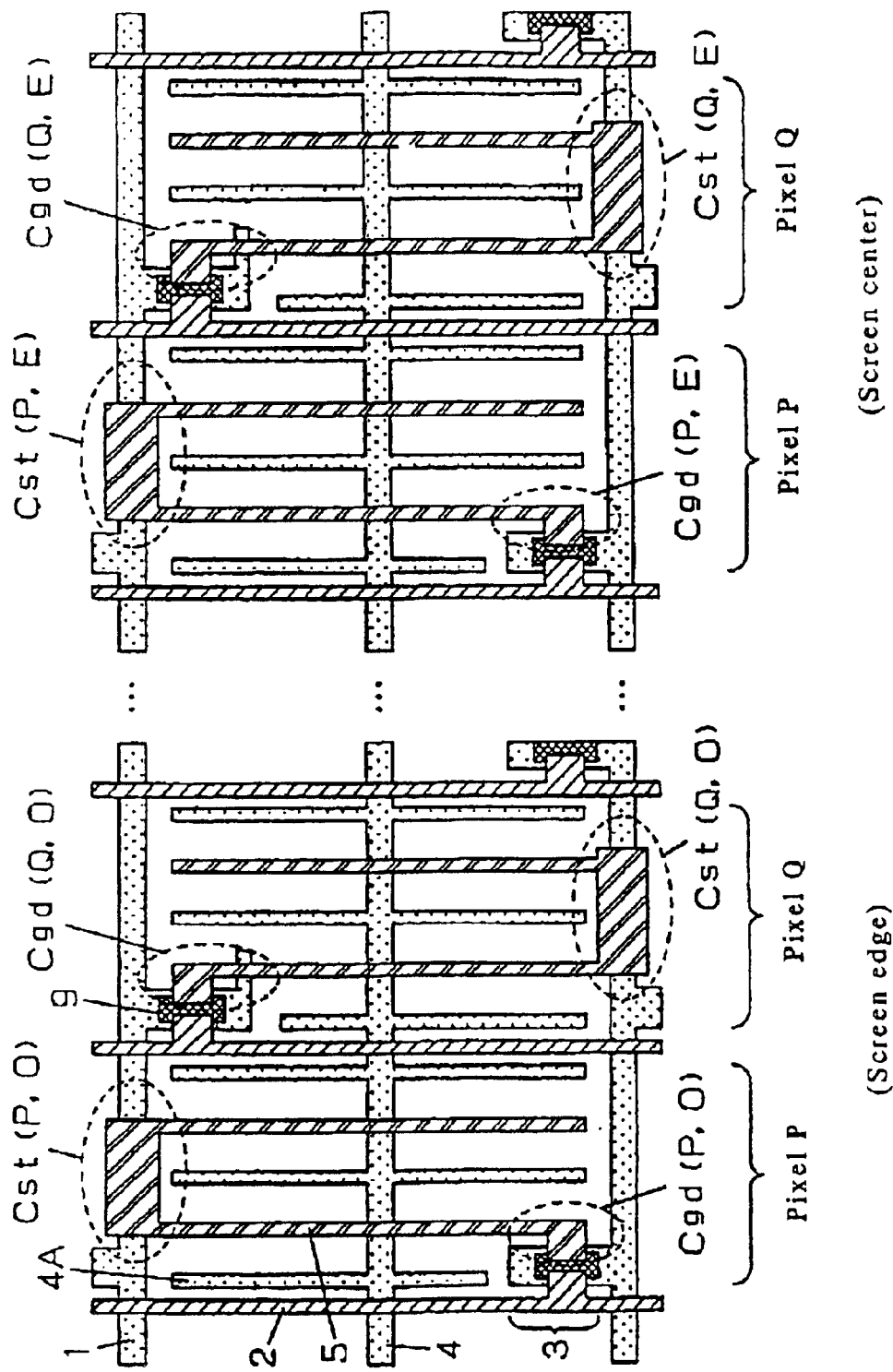
FIG. 21 is a diagram showing the pixels located at the left edge and the central part of the screen among the pixels of a liquid crystal display apparatus according to Embodiment 13.

The third display apparatus of Embodiment 13 of the present invention is described. The circuit structure is the same as FIG. 19, but the layout is as shown in FIG. 21. In this figure, there is no difference either of Cst or Cgd according to the position in the screen as shown in (Embodiment 1) and the circuit structure has a uniform layout, though there is a difference between pixel P and pixel Q. According to the principle previously described, in the case of this layout, the stripe pattern is decreased sufficiently, though neither the brightness irregularity nor the flicker are improved.

(Embodiment 14)

Figure 22:
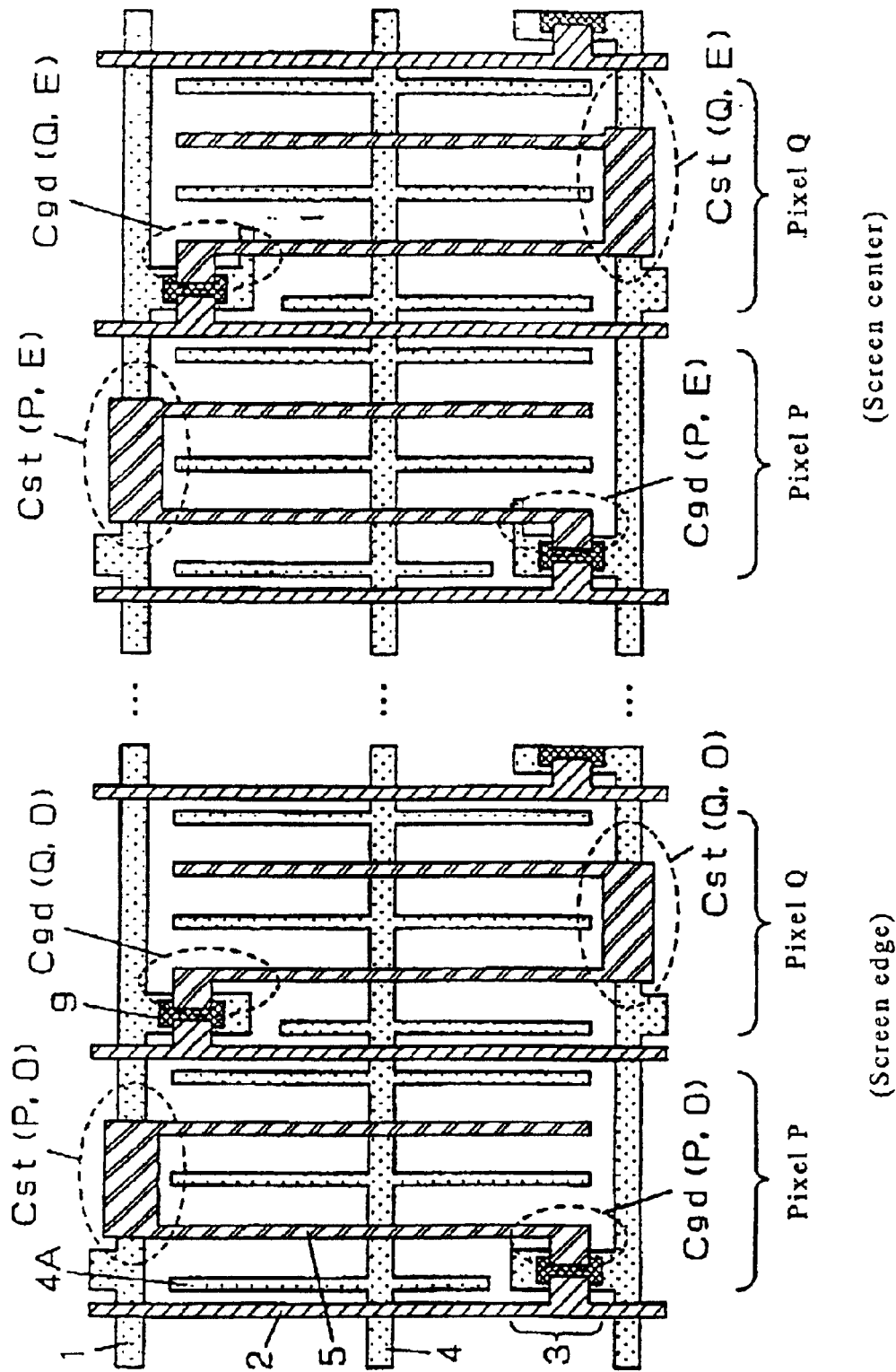
FIG. 22 is a diagram showing the pixels located at the left edge and the central part of the screen among the pixels of a liquid crystal display apparatus according to Embodiment 14.

The third display apparatus of another Embodiment of the present invention is described. The circuit structure is the same as FIG. 19, but the layout is as shown in FIG. 22. In this figure, there is a difference in both Cst and Cgd according to the position in the screen as shown in (Embodiment 1) though there is no difference between pixel P and pixel Q. According to the principle previously described, in the case of this layout, the stripe pattern is not decreased enough, but both the brightness irregularity and the flicker are improved.

(Embodiment 15)

Figure 23:
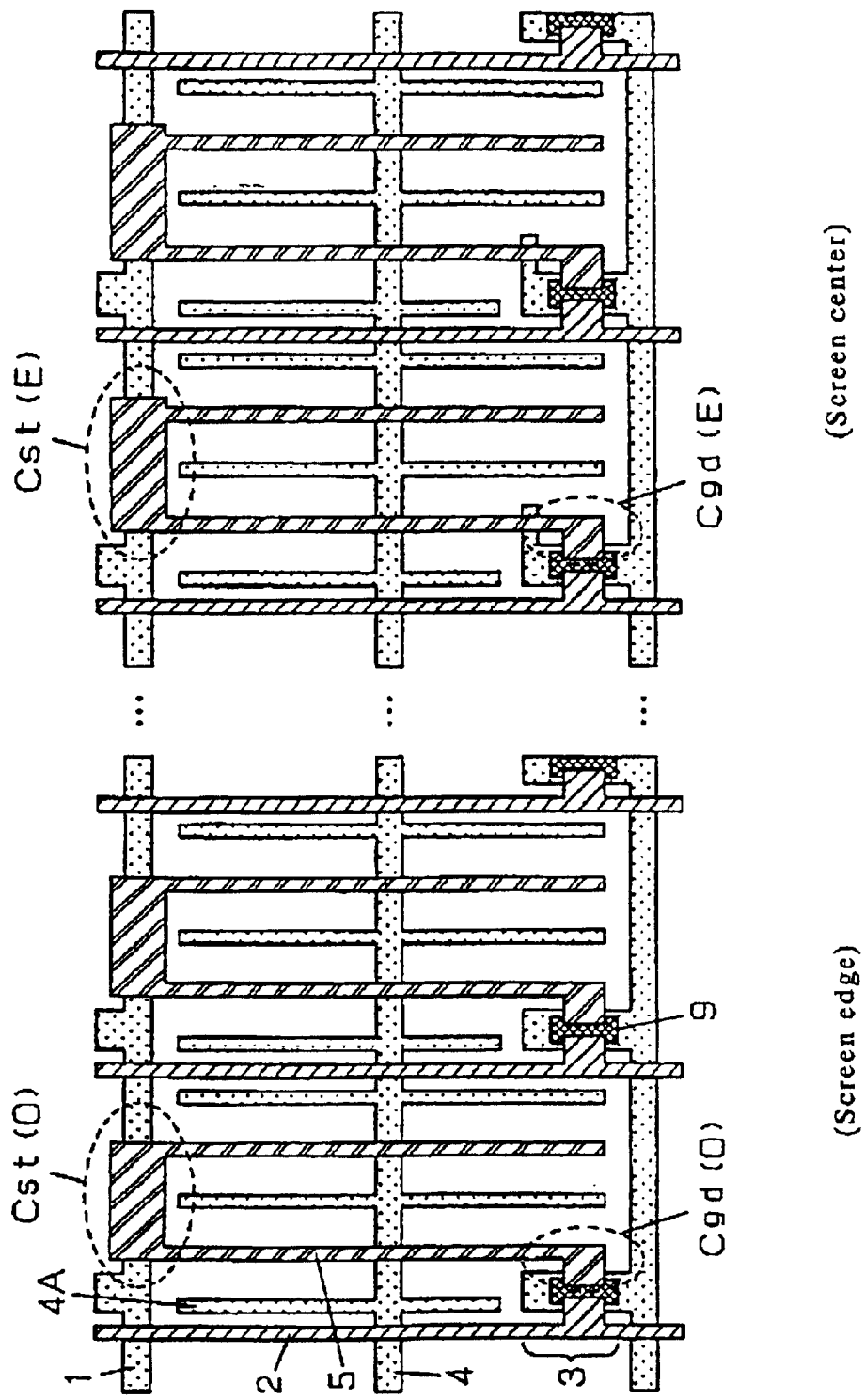
FIG. 23 is a diagram showing the pixels located at the left edge and the central part of the screen among the pixels of a liquid crystal display apparatus according to Embodiment 15.

The third display apparatus of another Embodiment of the present invention is described. The circuit structure is the same as the one shown in FIG. 37 described in the prior art, but the layout is shown as FIG. 23. In this configuration, the employed drive is the line inversion drive or the field inversion drive. Moreover, the stripe pattern is not generated because the layout is not inverted by each line. If both Cst and Cgd have uniform capacitance values through the screen (this is the conventional configuration), the brightness irregularity and the flicker are generated because the distortion of the scanning electrode waveform becomes remarkable with the approach to the center part of the screen. However, by varying these capacitance values corresponding to the position in the display screen, as shown in the description of the principle of the invention, the flicker and the brightness irregularity can be decreased.

From the view point of expression shown in the principle of the present invention, it can be thought as that there is no distinction between the pixel P and the pixel Q, and to simplify, $\alpha$ st(P)=$\alpha$ st(Q) is replaced with $\alpha$ st, and $\beta(P)=\beta(Q)$ is replaced with $\beta$. The condition [3] and [4] regarding the brightness irregularity and the flicker are replaced with [3'] and [4'] shown as follows.

[3'] The necessary condition for canceling the brightness irregularity: The value $\alpha$ st at the center part of the display screen is larger than that at the edge part of the display screen

[4'] The necessary condition for canceling the flicker (seen macroscopically): The value $\beta$ at the center part of the display screen is larger than that at the edge part of the display screen The layout of FIG. 23 followed this condition.

(Embodiment 16)

The third display apparatus of another Embodiment of the present invention is described.

Figure 24:
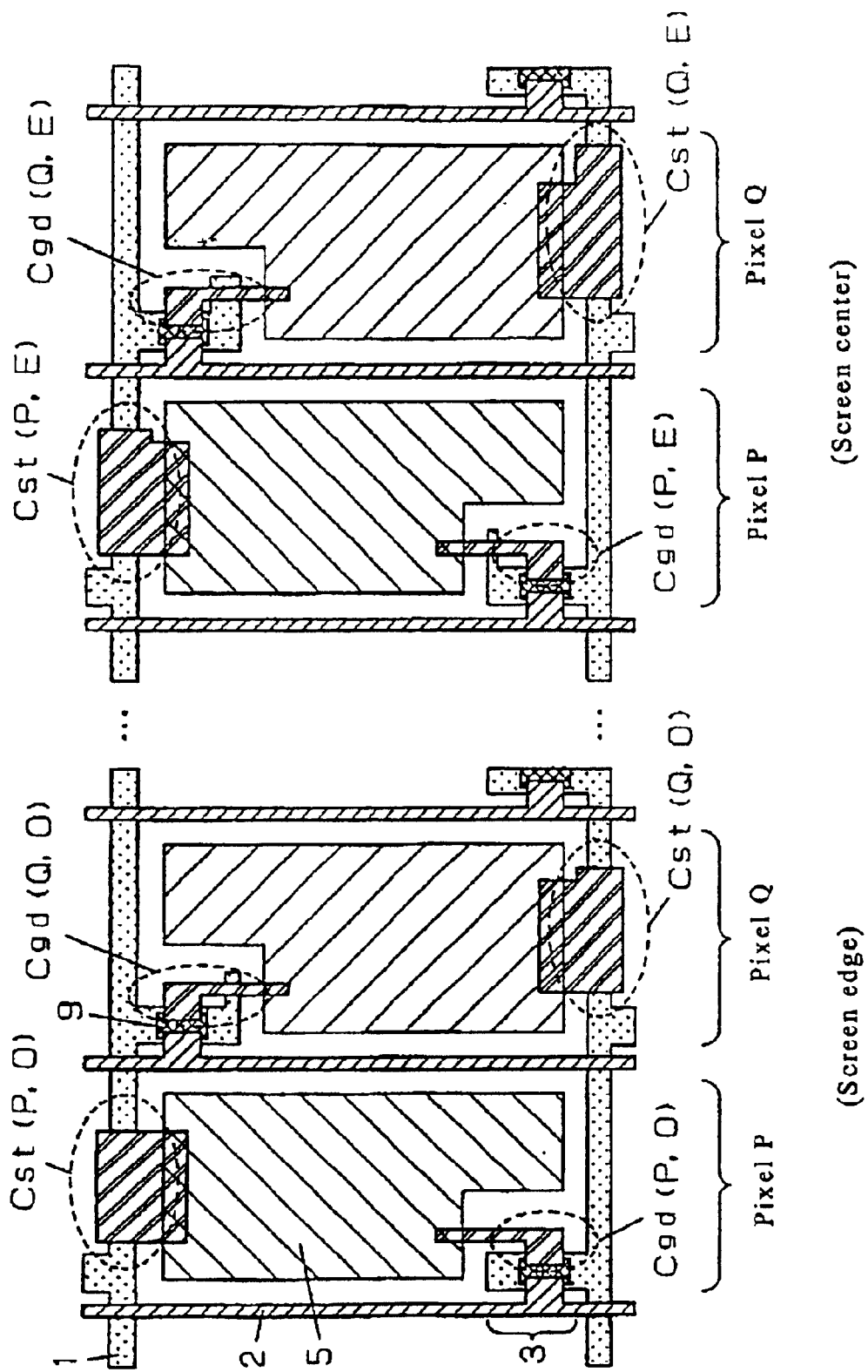
FIG. 24 is a diagram showing a circuit configuration of a TN liquid crystal display apparatus applied to a liquid crystal display apparatus according to Embodiment 16 of the present invention.

The configuration of this Embodiment is different from that of the IPS mode which has been described above, and the configuration of this Embodiment employs TN (twisted nematic) liquid crystal. FIG. 24 shows this configuration. The different point from the configuration of the IPS mode is that the common electrode is on the opposite substrate, not on the array substrate (therefore, a common electrode is occasionally called an opposite electrode), and that the electric field is applied to the liquid crystal almost in the direction of the perpendicular on the substrate side. Therefore, as shown in FIG. 24, the pixel electrode 5 occupies the greater part of areas except TFT 3 and wiring area, and the common electrode-pixel inter-electrode capacitance Clc is composed between the substrate opposing to the pixel electrode 5 (in this case, the capacitance is mainly formed by the liquid crystal, and there is a capacitance element formed by other media applied serial or parallel electrically. In some cases, such capacitance element is applied intentionally).

In this case, strictly speaking, the point that the common electrode (opposite electrode) has a two dimensional arrangement over the entire screen is different though it is almost the same as FIG. 19 in the equivalent circuit.

However, the basic idea of the third display apparatus of this invention can be applied to the above-mentioned configuration, and the stripe pattern, the brightness irregularity, and the flicker are greatly decreased by varying Cst and Cgd in the screen on varying the value between the pixel P and the pixel Q.

It is needless to say it is possible to apply all of the configuration froms Embodiment 12 to Embodiment 15 to the third display apparatus of this invention concerning the capacitance part.

(Embodiment 17)

Figure 25:
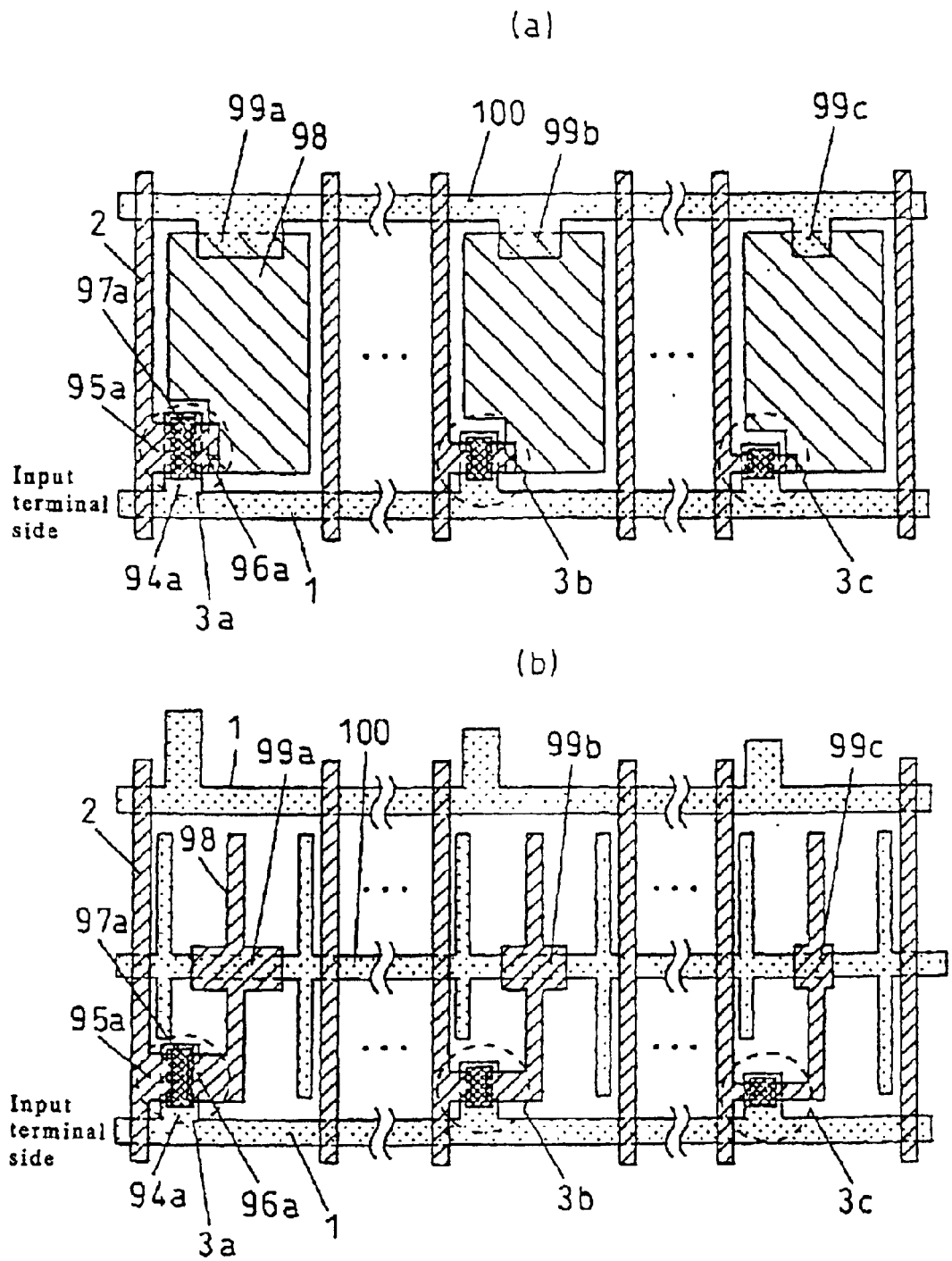
FIGS. 25(*a*) is a plan view showing a pixel configuration of a TN liquid crystal display apparatus according to Embodiment 17, and (*b*) is a plan view showing a pixel configuration of a IPS liquid crystal display apparatus according to Embodiment 17.

The fourth display apparatus of the present invention is described. FIG. 25(a) shows the pixel configuration of the liquid crystal display in Embodiment 17 of this invention.

In FIG. 25(a), 1 denotes a gate wiring, 2 denotes a source wiring, and these are connected with the gate drive circuit and the source drive circuit respectively on the wiring edge. TFT3 is formed in the vicinity of the intersection of the gate wiring 1 and the source wiring 2 as a switching element, the switching of this TFT3 is conducted by the gate pulse added from the gate drive circuit to the gate wiring 1, and the picture signal supplied by the source drive circuit is selectively charged from the source drive circuit 2 to each pixel. 98 denotes a pixel electrode connected with the drain electrode of TFT 3. 99a, 99b and 99c denote the storage capacitance electrode connected with the common wiring 100, and form the storage capacitance between the pixel electrode 98. This storage capacitance is configured as becoming small as it becomes far from the input terminal of the gate pulse, the area of the storage capacitance electrode 99a, 99b and 99c becoming narrow as it becomes far from the input terminal of the gate pulse.

TFT3 formed for each pixel is configured by a gate electrode 94 connected with the gate wiring 1, a source electrode 95 connected with the source wiring 2, a drain electrode 96 connected with the pixel electrode 98, and semiconductor layer 97 such as an amorphous silicon. TFT3 is formed as becoming small such as 3a, 3b, and 3c as it becomes far from the input side of the gate pulse and as the storage capacitance electrode 99 becomes small.

In the above-mentioned liquid crystal display, variation of the pixel electrode voltage by off-leak of TFT can be adjusted uniformly through the entire screen because the size of TFT is reduced according to the pixel capacitance, though the pixel capacitance decreases with the decrease of the storage capacitance. In addition, the liquid crystal display which controls the generation of the cross talk and the flicker can be obtained because the parasitic capacitance of the gate wiring and the source wiring is decreased by reducing the size of TFT, and the signal distortion can be eased.

Although FIG. 25(a) is an example of the liquid crystal panel of the TN mode, this invention is not limited to this Embodiment, and with other modes, for instance, as shown in FIG. 25(b), substantially the same effect can be obtained by the liquid crystal display of the IPS mode where the liquid crystal is controlled according to the electric field along the liquid crystal panel.

(Embodiment 18)

Figure 26:
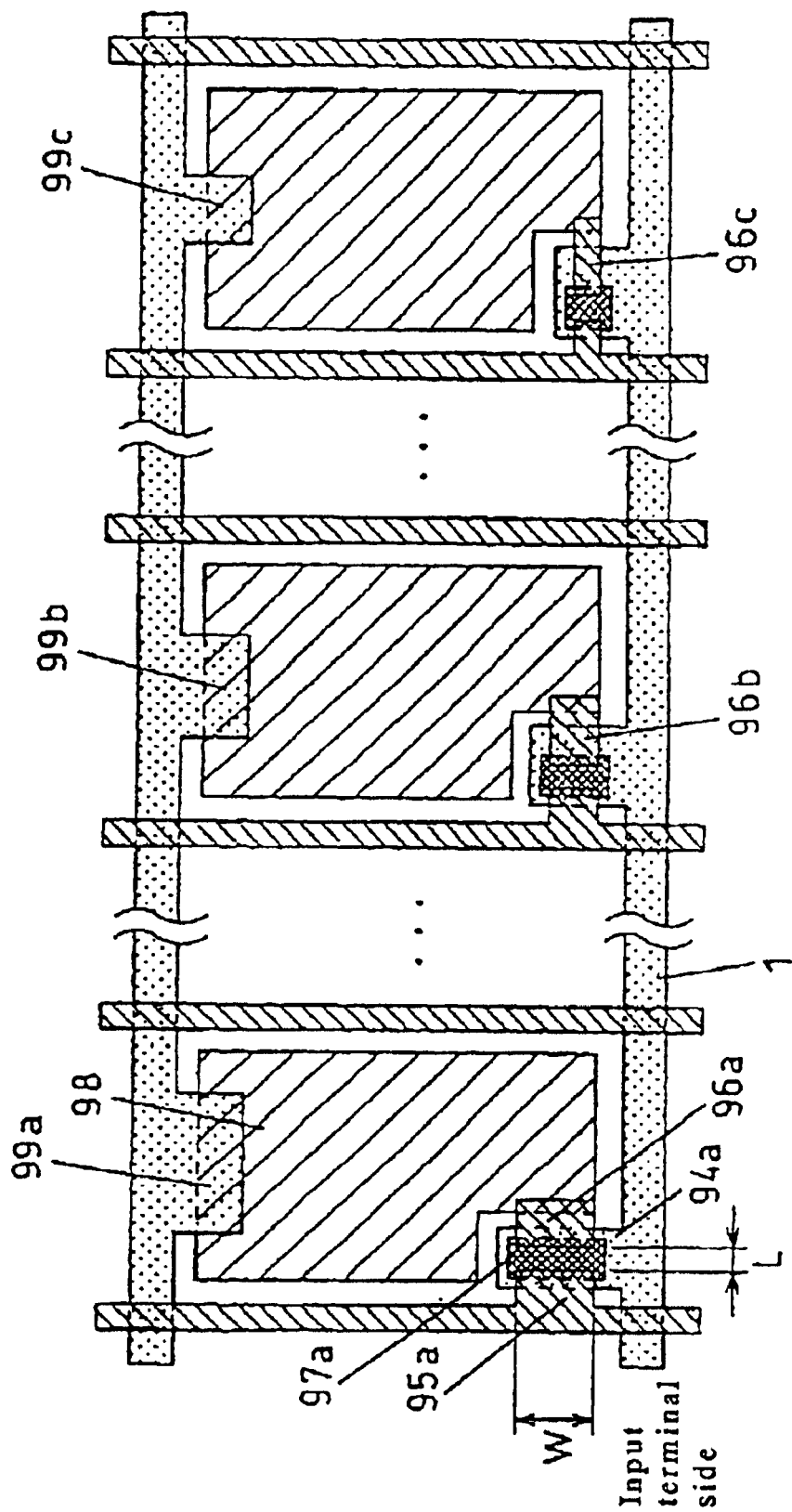
FIG. 26 is a plan view showing a pixel configuration of a TN liquid crystal display apparatus according to Embodiment 18.

FIG. 26 is a plan view showing a pixel configuration of a TN liquid crystal display apparatus according to Embodiment 18.

The different point of the configuration of this Embodiment from that of Embodiment 17 as described in FIG. 26, is the width of the gate electrode and the drain electrode expand respectively such as 94a, 94b, 96a, 96b and 96c, and the value of the gate-drain capacitance (Cgd) formed in the overlapping part of the gate electrode 94 and the drain electrode 96 becomes constant though the channel width W becomes small according to downsizing of TFT3.

In the display apparatus configured as described above, even if the size of TFT is miniaturized, the Cgd capacitance becomes substantially constant according to the distance from the input edge of the gate pulse, and the leakage current from the TFT during the off-period of the gate pulse can be reduced according to the decrease of the storage capacitance by reducing the width of the channel of the TFT while maintaining the effect that the pixel voltage becomes constant as shown by (Expression 1). The fluctuation of the pixel electrode voltage can be equalized through the entire screen, and the liquid crystal panel in which the generation of the cross talk and the flicker are controlled can be obtained.

(Embodiment 19)

FIG. 27(a) is a diagram showing the timing chart of a gate pulse provided from the gate drive circuit of the fourth liquid crystal display apparatus according to Embodiment 19. As shown in FIG. 27(a), for example, two gate pulses come to turn ON at the same time by providing them through two pieces of the gate wiring such as "n"th line of the gate wiring and the "n+2"th line of the gate wiring, and by the driving method, the signal writing is performed two times to every pixel in the one frame period. Therefore, the effective charging period can be lengthened, by the configuration of Embodiment 1 and 2, and the size of the TFT becomes small according to the distance from the input edge of the gate pulse, so the decrease in the charge ability can be prevented by using the driving method shown in FIG. 27(a) even though the charge ability to the pixel decreases.

As for timing of the gate pulse, three or more gate wiring are turned ON at the same time. Moreover, as shown in FIG. 27(b), the gate pulse may be the signal in which the ON period is consecutive. In this case, the gate pulse waveform distortion at the turning ON point is not influenced easily. Moreover, the charge ability can be improved.

(Embodiment 20)

Figure 28:
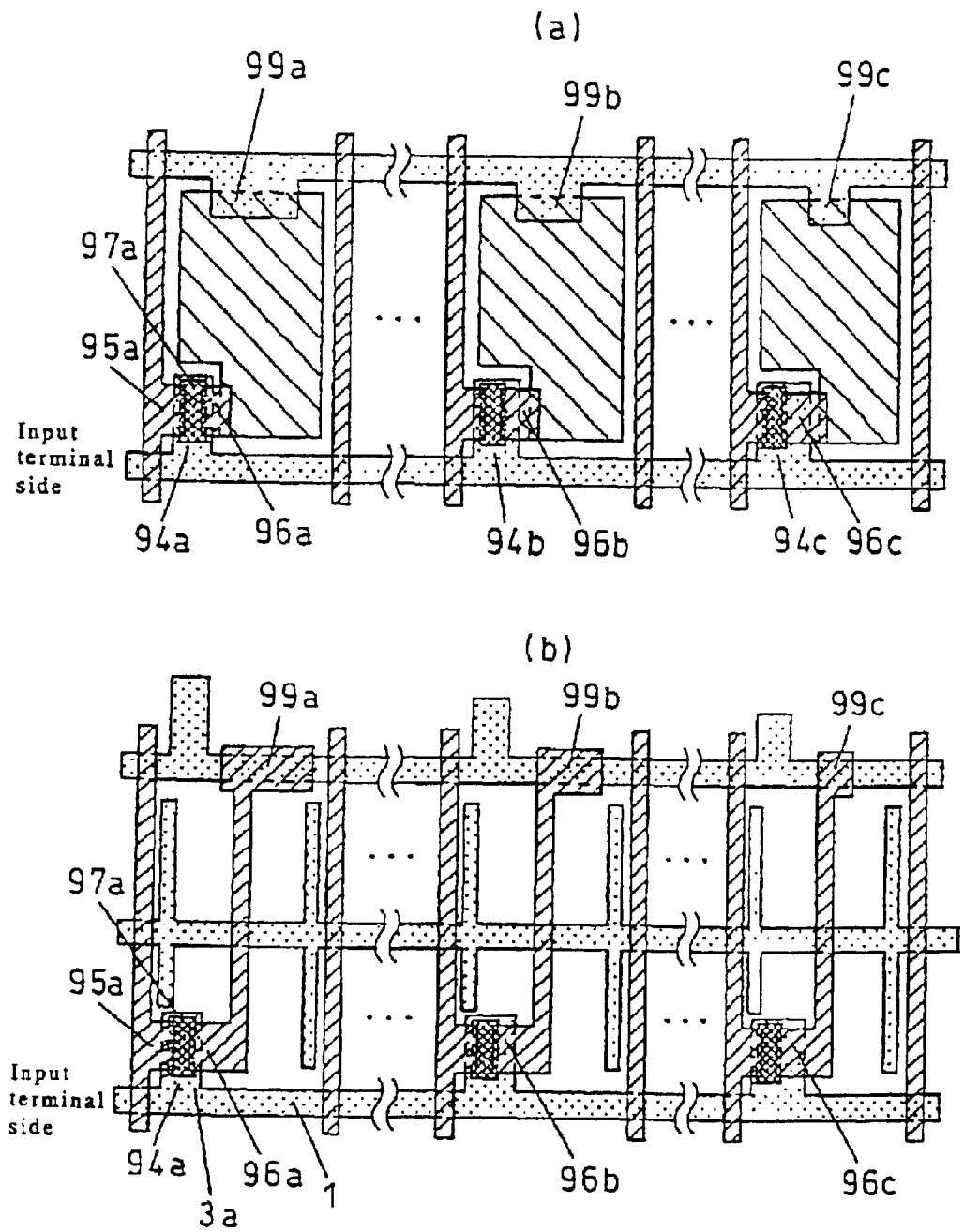
FIGS. 28(*a*) is a plan view showing a pixel configuration of a TN liquid crystal display apparatus according to Embodiment 20, and (b) is a plan view showing a pixel configuration of a IPS liquid crystal display apparatus according to Embodiment 20.

FIG. 28(a) is a diagram showing a pixel configuration of the fourth display apparatus of the present invention according to Embodiment 20.

The different point of the pixel configuration of FIG. 28(a) from that of Embodiment 17 is that for the pixel configuration of this Embodiment, the storage capacitance (Cst) becomes small and the overlapping area between the gate electrode 94 and the drain electrode 98 become large according to the distance from the input edge of the gate pulse.

In the above-mentioned liquid crystal display, the irregularity of Cst can be reduced by enlarging the Cgd shown by (Expression 24). Therefore, because the pixel capacitance becomes constant through the entire screen, the fluctuation of the pixel electrode voltage can be equalized through the entire screen, and the liquid crystal panel in which the generation of the cross talk and the flicker can be prevented.

Moreover, the display can be made uniform by making Ctot (for instance, Ctot=Cst+Cgd+Clc) a constant value.

In FIG. 28(a), an example of the liquid crystal panel of the TN mode is described. However, the present invention is not limited to above-mentioned Embodiment, and a similar effect can be achieved by other modes such as IPS mode controlling the liquid crystal by the electric field along the liquid crystal panel as shown in FIG. 28(b). Moreover, in FIG. 28(a), Cst is formed by the overlapping of the common wiring (storage capacitance electrode) and the pixel electrode, and Cst may be formed by overlapping the adjacent gate wiring and the pixel electrode as shown by FIG. 28(b).

(Supplementary Description)

In the above-mentioned Embodiment 1 to 20, it is needless to say that either the one side power feeding for the scanning electrode or the both sides power feeding for the scanning electrode can be employed.

FIG. 29(a) is a diagram showing a driving circuit when employing the one side power feeding for the scanning electrode. The scanning signal drive circuit is connected with the picture signal drive circuit in the liquid crystal panel part, and the scanning signal drive circuit supplies the scanning voltage to the scanning electrode of the liquid crystal panel, and the picture signal drive circuit supplies the picture signal voltage to the picture signal electrode. The controller part controls these driving circuits. The driving IC of two values with two voltage levels normally used is not employed, but the driving IC of four values with two voltage levels is used instead in order to supply the step voltage of the capacitively coupled driving to the scanning signal drive circuit.

FIG. 29(b) is a diagram showing a driving circuit when employing the both sides power feeding for the scanning electrode. The configuration which supplies the scanning signal voltage from both right and left ends of the liquid crystal panel is used, and the part of the alternate long and short dash line at the center of the liquid crystal panel shown in the figure becomes the farthest point from the voltage supply edge of the scanning signal. Then, a similar effect can be achieved if the part described by each above-mentioned Embodiment as the terminal is regarded as this farthest point.

Figure 30:
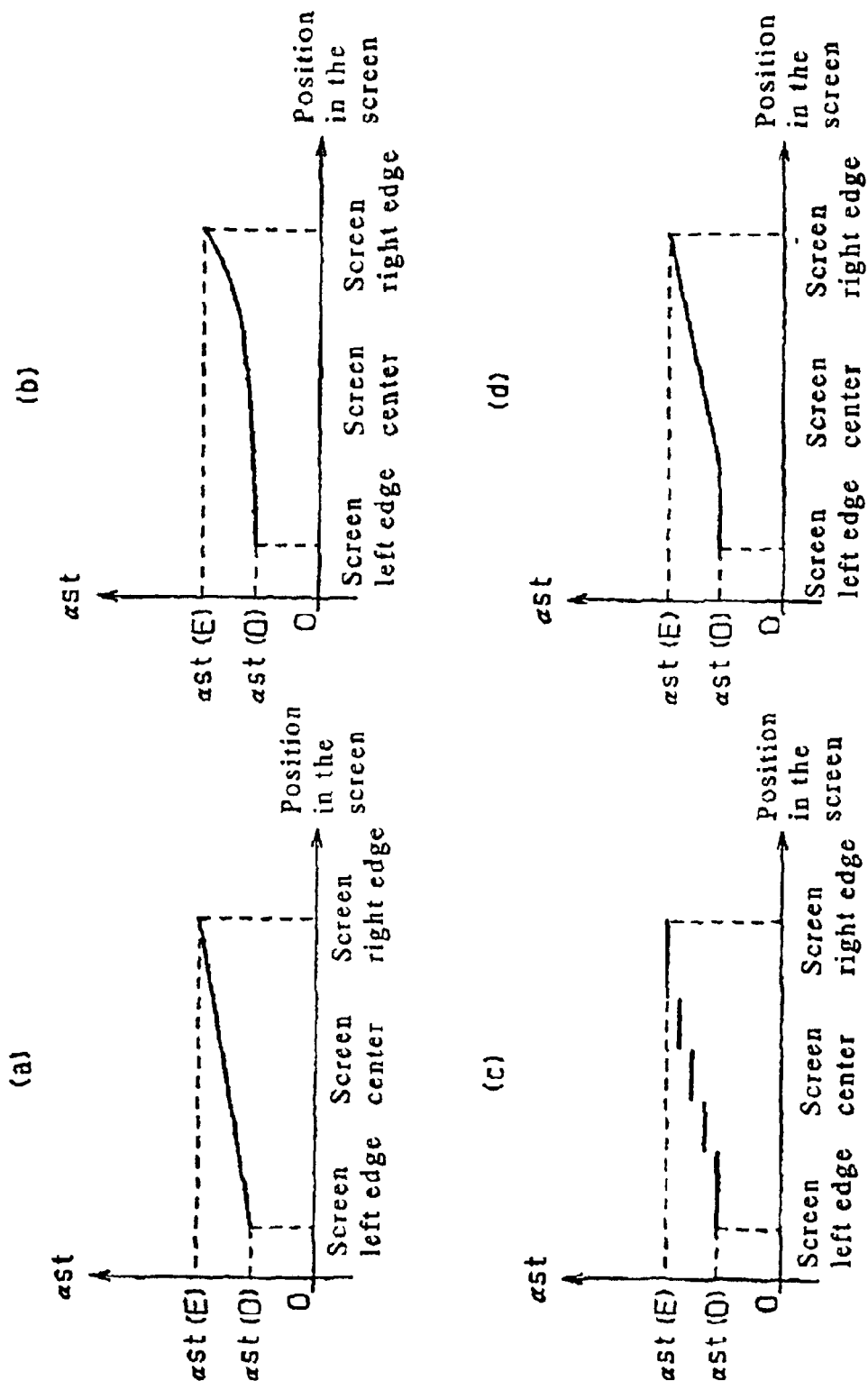
FIG. 30 is a diagram showing how to assign the distribution of α st or β when employing the one side power feeding in a liquid crystal display apparatus of the present invention.

When the first capacitance ratio α gd, the second capacitance ratio α st, the third capacitance ratio α gd1, the fourth capacitance ratio α st1, and β vary continuously or in stages according to the distance from the scanning electrode power feeding edge, their irregularities are adjusted. The method of varying these capacitances is shown. If these capacitances are enlarged continuously or in stages according to the distance from the scanning electrode power feeding edge, when the display apparatus is driven by the both sides power feeding for the scanning electrode, these capacitances are varied as shown in FIG. 18. When the display apparatus is driven by the one side power feeding for the scanning electrode, these capacitances are varied as shown in FIG. 30. The case where the power is fed from the left screen end is explained here. In the case where the power is fed from the right screen end, it may become a figure in which the ramp is inverted symmetrically with respect to the centerline of the screen as the symmetric axis.

In the above-mentioned description, FIG. 18 shows a symmetrical varying, however, it is not necessary to be the symmetrical varying. For example, in the case in which the both sides power feeding for the scanning electrode is employed but the one side power feeding for the common electrode is employed, or the case in which the one side power feeding for the scanning electrode is employed but the both sides power feeding for the common electrode is employed, the pattern for the generation of the re-charge voltage is not limited as a symmetrical pattern on the display. Therefore, in such cases, an asymmetrical pattern of varying of the capacitance and the capacitance ratio formed in the pixel is acceptable as the pattern corresponding to the pattern for the generation of the re-charge voltage.

The capacitance and the capacitance ratio of each line can be varied in order to correct the irregularity generated in the re-charge voltage of each line according to the difference of the distance of the wiring part from the scanning signal drive circuit to the edge of the screen in each line, or in order to correct the re-charge voltage difference between the center part and the top or bottom part generated by fixing the voltage at the top or bottom of the common electrode especially in case of the configuration of TN type etc.

In the above-mentioned description, the storage capacitance to achieve the capacitively coupled driving is assumed to be the one on the preceding step's scanning electrode. However, it may be on another scanning electrode. For example, if timing by which the overlapping voltage is impressed is adjusted even if the storage capacitance is formed on the scanning electrode of latter line, the effect of this invention is obtained sufficiently. However, it is not preferable that the mutual interference is caused because the descending part of the scanning signal of the present line overlaps to the applying timing of the overlapping voltage when forming the storage capacitance on the present line that relates to the switching of the pixel in the present line.

The method for adjusting the capacitance value formed in each pixel in this invention to a different value or adjusting the capacitance value through the screen may be a method for adjusting the layout intentionally (that is, by making the mask chart design with such layout intentionally) or a method for adjusting the mask alignment at manufacturing intentionally even if the mask chart design is made as a conventional example (that is, there is no difference in the lay out between the pixel P and the pixel Q and these are made uniformly through the screen). It is acceptable to vary capacitance by intentionally changing the permittivity of the capacitance insulation film medium, when the used layout is the conventional layout.

Because the error on the manufacturing process (for example, a shift in matching, non-uniformity by insufficient removal and residue) is very minute in general, the effect of this invention cannot be expected to result from this degree of error. Therefore, this invention is not one achieved in the prior art.

In the above-mentioned description, varying Cst and Cgd is explained as the example, however, the liquid crystal capacitance Clc may be varied instead. For example, if Cst and Cgd are fixed and only Clc is varied, the capacitance ratio such as the first capacitance ratio α gd, the second capacitance ratio α st, the third capacitance ratio α gd1, the fourth capacitance ratio α st1 are varied, so the effect of this invention can be obtained. Moreover, when Clc is varied, there may be a means that the capacitance which is inserted in series or in parallel to the liquid crystal is varied without changing the liquid crystal capacitance.

In the above-mentioned description, a voltage-controlled display apparatus, that is a display apparatus which controls the status of the display medium such as the liquid crystal by the voltage applied between the pixel electrode and the opposite electrode is explained as an example. However, this invention can apply to a current-controlled display apparatus, that is a display apparatus that controls the current in each pixel (brightness) by controlling the gate voltage of the transistor for current control by the voltage applied between the pixel electrode and the opposite electrode. There is a difference between the voltage-controlled drive and the current-controlled drive in controlling directly the status of the medium by the voltage applied to the pixel, or in determining the current through the transistor, but the process up to applying the voltage to the pixel is common to both cases and the problem of varying the pixel electrode voltage due to the gate delay by the distortion in the scanning pulse or the re-charging phenomenon is common to both.

Figure 33:
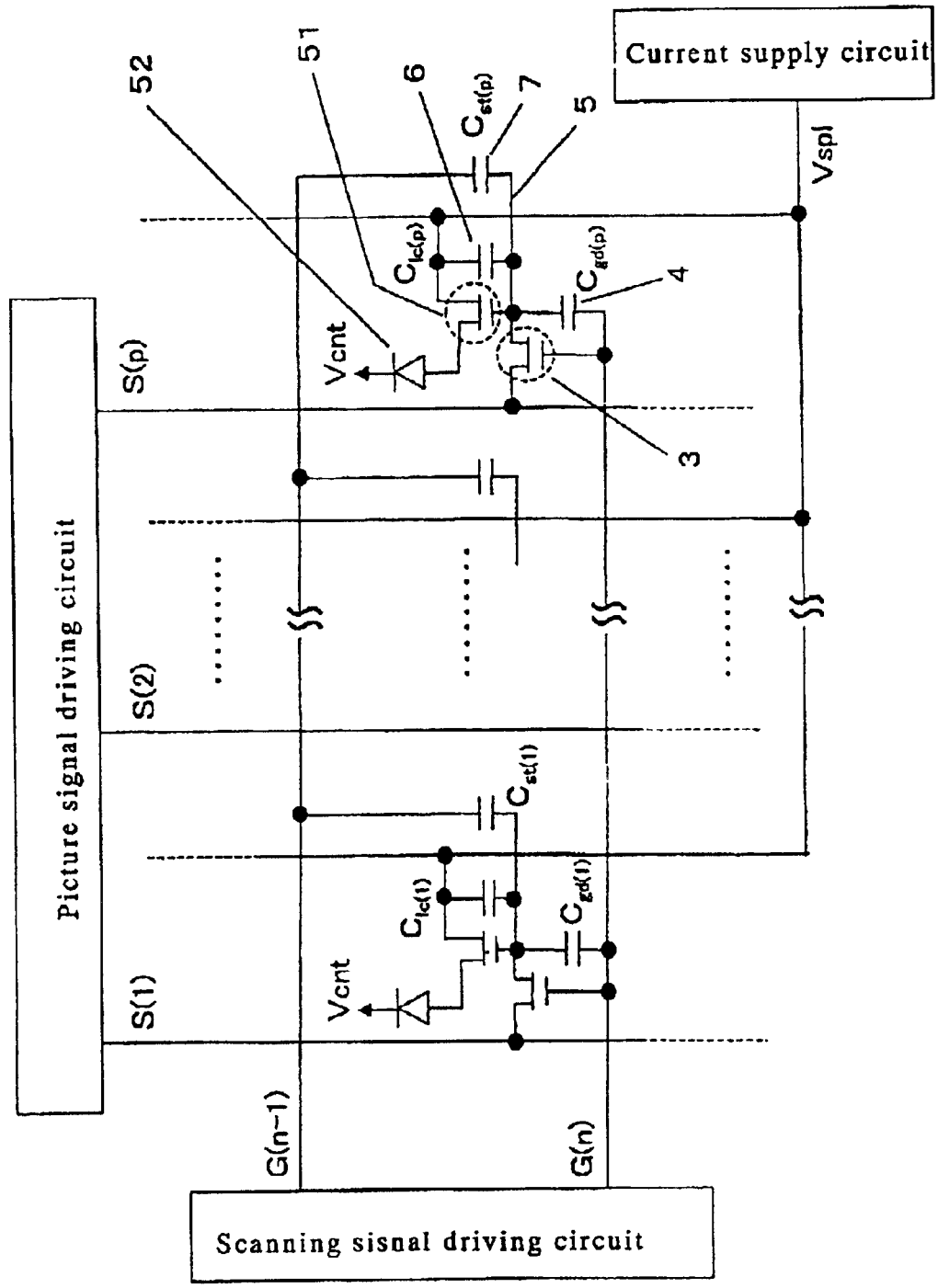
FIG. 33 is a circuit diagram showing a configuration of an organic electro-luminescence type display apparatus applied to a liquid crystal display apparatus of the present invention.
Figure 34:
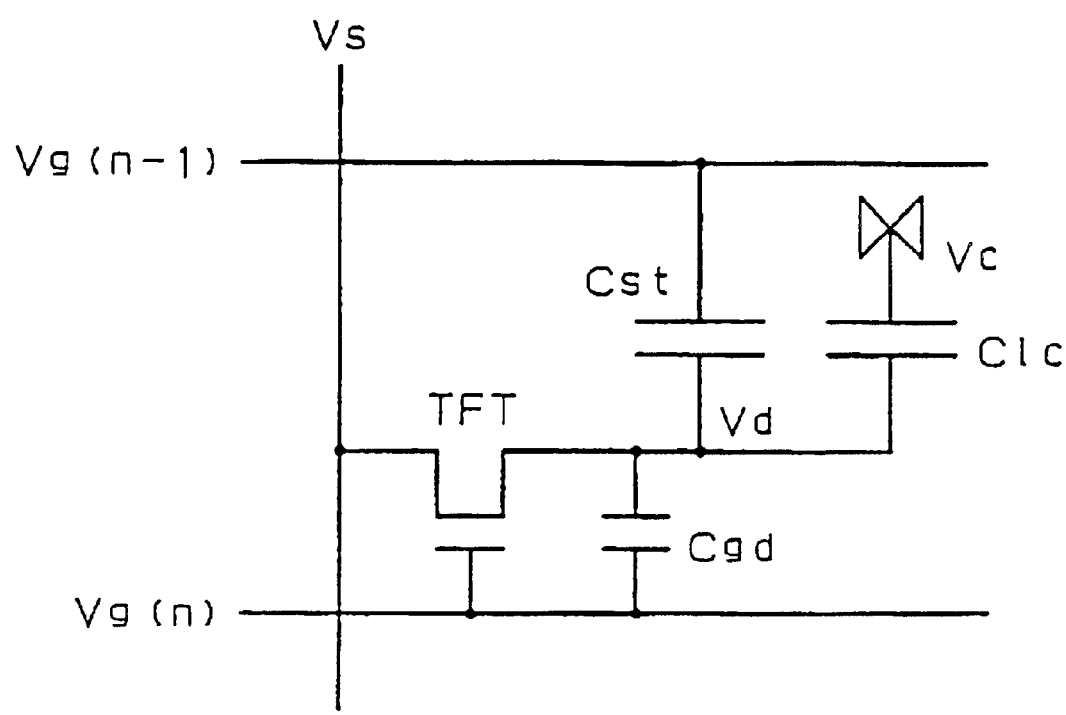
FIG. 34 is a diagram showing an equivalent circuit of one pixel of a liquid crystal display where storage capacitance Cst is formed between a preceding line scanning electrode and a pixel electrode in the prior art.

As one example, a display apparatus employing this invention to an active matrix type organic electronic luminescence (organic EL) display apparatus is described. FIG. 33 shows the basic configuration, and which is corresponding to the one shown in FIG. 1 in Embodiment 1. The difference with FIG. 1 is the organic electro-luminescence (EL) layer 82 to be used for displaying in each pixel and the second TFT 81 to control the current which flows to the organic electro-luminescence layer. The operation of the display apparatus of FIG. 33 is explained as follows. First of all, after the signal voltage is charged to the electrode 5 through TFT 3, the overlapping voltage is supplied by varying voltage of the preceding gate line G(n−1). βdenotes a pixel capacitance, which is a load for this charge. In the configuration shown in FIG. 1, the display characteristic of each pixel is provided directly depending on the voltage at both ends of the pixel capacitance 6 (the liquid crystal capacitance), but in the configuration shown in FIG. 33, the electrode 5 combines the gate electrode of the second TFT, and the voltage at both ends of the pixel capacitance 6 provides the gate voltage of the second TFT. The organic electro-luminescence layer is connected with one edge of the second TFT, the current-supply circuit is connected with another edge, and a constant voltage Vspl is supplied. Therefore, the current that flows in the second TFT is controlled by the gate voltage. As a result, the display brightness is provided by controlling the value of the current that flows to the organic electro-luminescence layer 82 by the signal voltage. In the case of the conventional organic electro-luminescence display apparatus, the voltage of each part is distorted by enlarging the screen size and achieving the high resolution, and the problem that display irregularity generated by varying the current flowing in the organic electro-luminescence layer because of varying the voltage applied to the pixel capacitance 6 is caused.

In case of the organic electro-luminescence display apparatus employing the present invention, the same as in the Embodiment as shown above, uniform display can be achieved by adjusting the value of the first TFT gate—drain inter-electrode capacitor 10, the pixel capacitor 6, and the storage capacitor 7 according to the pixel position. In the above-mentioned description, the configuration of FIG. 1 of Embodiment 1 is described as an example for the case that the present invention is applied to the organic electro-luminescence display apparatus, however, it is possible to obtain an organic electro-luminescence display apparatus by which this invention is applied based on the configuration of other figures of other Embodiments. Moreover, it is assumed that the electrode 5 combines the gate electrode of the second TFT in the above-mentioned description, however, the configuration in which the electrode 5 is connected with the gate electrode of the second TFT is possible.

In the current-control drive, basically, the pixel voltage is provided as a direct current signal to the transistor for current control. Moreover, as the current-control type drive, there is a type to be operated by a direct current signal such as the electrophoretic type display apparatus and the electrochromic type display apparatus, etc. As shown above, the discussion concerning the positive and negative field of this invention does not relate directly to the display apparatus operated by applying a direct current to the pixel electrode, however, other discussions can be applied.

The above-mentioned description about a display apparatus indicates the whole apparatus containing the scanning signal drive circuit and the picture signal drive circuit. On the contrary, the part which consists of the configuration including at least the array substrate, the opposite substrate, and the liquid crystal, without necessarily containing the driving circuit, is especially called as a display device. The effect of this invention is achieved for either the display apparatus or the display device.

Liquid crystal other than the above-mentioned TN liquid crystal and the IPS liquid crystal may be included. For example, a VA (vertical arrangement) liquid crystal, which has comparatively fast response speed and high contrast, a MVA (multiple domain VA) liquid crystal and other liquid crystal may be included. Moreover, a TN (twisted nematic) liquid crystal, a STN (super twisted nematic) liquid crystal, VA (vertical arrangement liquid crystal or homeotoropic liquid crystal ) liquid crystal, an ECB (electric field control double refraction) type liquid crystal containing a homogeneous arrangement liquid crystal, a bengt liquid crystal, IPS (in-plane switching) liquid crystal, a GH (guest-host) liquid crystal, a high molecule decentralized liquid crystal, a ferroelectricity liquid crystal, an anti-ferroelectricity liquid crystal, an OCB liquid crystal, a discotic liquid crystal, and other modes can be used. Moreover, it is possible to use material other than liquid crystal for which optical characteristic varies according to the applied voltage. For example, the electrooptics crystal such as a BSO (bismuth silicon oxide) may be used. Moreover, an electrochromic material, a glow spontaneously type diode, a laser, and an electronic luminescence material may be used. Moreover, DMD (Deformable Mirror Device) may be used. However, the liquid crystal is the cheapest, so it is preferable to use the liquid crystal.

Though the present invention is mainly described as the liquid crystal display panel watched directly, the present invention may be applied to the liquid crystal device (a polycrystalline Si type, a single crystal Si type or SOI (silicon on insulator)) used for liquid crystal projector etc.

INDUSTRIAL APPLICABILITY

According to the display apparatus of the present invention, the following problems can be solved, which are an irregular display caused by the shortage of the charge of the pixel electrode voltage, which is generated by distortion of the scanning voltage waveform caused by CR time constant of the scanning lines, the irregular display caused by the re-charge phenomenon, the irregular display caused by the difference of even number frame—odd number frame in inversion drive of signal voltage, and the irregular display caused by the difference whether the signal voltage applied to the pixel electrode is a positive direction or a negative direction. In addition, the effect to decrease an irregular display in a large-scale liquid crystal display and a high resolution liquid crystal display is achieved.

According to the first display apparatus of the present invention, the following effects are obtained, which include securing the charge to the pixel electrode while driving the capacitive coupling in a low voltage and in a low electric power, compensating the gap of the DC level of the pixel electrode voltage in consideration of the voltage fluctuation by the re-charge phenomenon, achieving the uniform brightness display by losing the flicker and decreasing the difference of the coupling voltage overlapped to the pixel electrode voltage.

According to the second display apparatus of the present invention, in the active matrix type liquid crystal display, the effects are that the influence of the time constant of the scanning electrode in the capacitively coupled driving is decreased and the liquid crystal display of large-scale and high resolution can be driven by low voltage, and the power consumption is decreased by forming the first storage capacitance between the pixel electrode and the scanning electrodes except the present line and forming the second storage capacitance between the pixel electrode and the common electrode. Moreover, the irregular voltage generated at the descending part of the scanning voltage in consideration of the voltage fluctuation by the re-charge phenomenon is compensated and the uniform display is enabled by varying the these storage capacitance, gate-drain inter-electrode capacitance and liquid crystal capacitance according to the pixel position. Moreover, the further effect of achieving an excellent display is obtained by maintaining the ratio between these capacitance to a specific relation, and the overlapped coupling voltage is equalized.

According to the third display apparatus of the present invention, in the liquid crystal display of the active matrix type, the following problems can be reduced, which include an irregular display caused by the difference of even number frame—odd number frame in inversion drive of signal voltage which appears when the pixel configuration of the capacitive coupling dot inversion/column inversion that is low-cost and with little cross talk is employed, and an irregular display caused by the difference of whether the signal voltage applied to the pixel electrode is a positive direction or a negative direction, a flicker, a brightness ramp.

According to the fourth display apparatus of the present invention, in the liquid crystal display apparatus having the configuration where the storage capacitance becomes small according to the distance from the input edge of the gate pulse, the pixel capacitance in the entire screen is substantially made constant and the fluctuation of the pixel electrode voltage through entire screen can be equalized by employing the configuration that can reduce the TFT size or employing the configuration that can enlarge the gate-drain inter-electrode. Therefore, the liquid crystal panel which can reduce the generation of the cross-talk and the flicker can be obtained.

What is claimed is:

1. A display apparatus comprising plural pixel electrodes arranged in a matrix, a switching element connected with a pixel electrode, a scanning electrode, a picture signal electrode, an opposite electrode forming a capacitance with the pixel electrode, further comprising
   storage capacitance between the pixel electrode and the scanning electrode excluding the scanning electrode of the present line;
   more than two capacitance elements connected with the pixel electrode, wherein at least one of a gate-drain inter-electrode capacitance of the switching element and the storage capacitance are included, have a different value according to the distance from a power feeding edge of the scanning electrode;
   wherein, when all capacitance connected with the pixel electrode in a pixel is denoted as Ctot, the gate-drain inter-electrode capacitance of the switching element is denoted as Cgd, the storage capacitance is denoted as Cst, a first capacitance ratio $\alpha gd$ shown by (Expression 56) increases continuously or in stages according to the distance from the power feeding edge of the scanning electrode.

$$\alpha gd = Cgd/Ctot \quad \text{(Expression 56)}$$

2. The display apparatus according to claim 1, wherein, both the gate-drain inter-electrode capacitance and the storage capacitance increase according to the distance from the power feeding edge of the scanning electrode.

3. The display apparatus according to claim 1, wherein, both the gate-drain inter-electrode capacitance and the storage capacitance decrease according to the distance from the power feeding edge of the scanning electrode.

4. The display apparatus according to claim 1, wherein, both the storage capacitance and a capacitance formed between the opposite electrode and the pixel electrode decrease according to the distance from the power feeding edge of the scanning electrode.

5. The display apparatus according to claim 1, wherein each capacitance element of the pixel is set so a second capacitance ratio $\alpha st$ shown by (Expression 57) is substantially constant.

$$\alpha st = Cst/Ctot \quad \text{(Expression 57)}$$

6. The display apparatus according to claim 5, further comprising a second switching element wherein the pixel electrode combines a gate electrode of the second switching element or the pixel electrode is connected with a gate electrode of the second switching element.

7. The display apparatus according to claim 1, wherein each capacitance element of the pixel is set so a second capacitance ratio $\alpha st$ shown by (Expression 58) increases continuously or in stages according to the distance from the power feeding edge of the scanning electrode.

$$\alpha st = Cst/Ctot \quad \text{(Expression 58)}$$

8. The display apparatus according to claim 7, further comprising a second switching element wherein the pixel electrode combines a gate electrode of the second switching element or the pixel electrode is connected with a gate electrode of the second switching element.

9. The display apparatus according to claim 1, wherein the display medium is a liquid crystal.

10. The display apparatus according to claim 1, further comprising a means for overlapping a voltage to the driving circuit of the scanning signal via the storage capacitance.

11. The display apparatus according to claim 10, wherein the driving circuit of the scanning signal comprising an output voltage of more than four values.

12. The display apparatus according to claim 10, wherein the voltage via the storage capacitance is applied to the pixel electrode after applying the voltage via the switching element.

13. A display apparatus comprising plural pixel electrodes arranged in a matrix, a switching element connected with a pixel electrode, a scanning electrode, a picture signal electrode, an opposite electrode forming a capacitance between the pixel electrode, a storage capacitance electrode, and further comprising
   a first storage capacitance between the pixel electrode and the scanning electrode excluding the scanning electrode of the present line; and
   a second storage capacitance between the pixel electrode and the storage capacitance electrode;
   wherein, when all capacitance connected with the pixel electrode in a pixel is denoted as Ctot, the gate-drain inter-electrode capacitance of the switching element is denoted as Cgd, the first storage capacitance id denoted as Cst1, and a second storage capacitance is denoted as Cst2,
   the third capacitance ratio $\alpha gd1$ shown by (Expression 59) increases continuously or in stages according to the distance from the power feeding edge of the scanning electrode.

$$\alpha gd1 = Cgd/Ctot \quad \text{(Expression 59)}$$

14. The display apparatus according to claim 13, wherein the gate-drain inter-electrode capacitance increases according to the distance from the power feeding edge of the scanning electrode.

15. The display apparatus according to claim 13, wherein more than two capacitance elements connected with the pixel electrode, including at least one of a gate-drain inter-electrode capacitance, the first storage capacitance, the second storage capacitance, have different value according to the distance from the power feeding edge of the scanning electrode.

16. The display apparatus according to claim 15, wherein both the gate-drain inter-electrode capacitance and the first storage capacitance increase according to the distance from the power feeding edge of the scanning electrode.

17. The display apparatus according to claim 15, wherein the gate-drain inter-electrode capacitance increases according to the distance from the power feeding edge of the scanning electrode and the second storage capacitance decreases according to the distance from the power feeding edge of the scanning electrode.

18. The display apparatus according to claim 15, wherein both the first storage capacitance and the second storage capacitance decrease according to the distance from the power feeding edge of the scanning electrode.

19. The display apparatus according to claim 18, wherein the capacitance ratio Cst1/Cst2 is substantially constant.

20. The display apparatus according to claim 13, wherein each capacitance element of the pixel is set as the fourth capacitance ratio $\alpha st1$ shown by (Expression 60) is substantially constant.

$$\alpha st1 = Cst1/Ctot \qquad \text{(Expression 60)}$$

21. The display apparatus according to claim 20, further comprising a second switching element wherein the pixel electrode combines a gate electrode of the second switching element or the pixel electrode is connected with a gate electrode of the second switching element.

22. The display apparatus according to claim 13, wherein each capacitance element of the pixel is set so the fourth capacitance ratio $\alpha st1$ shown by (Expression 61) increases continuously or in stages according to the distance from the power feeding edge of the scanning electrode.

$$\alpha st1 = Cst1/Ctot \qquad \text{(Expression 61)}$$

23. The display apparatus according to claim 22, further comprising a second switching element wherein the pixel electrode combines a gate electrode of the second switching element or the pixel electrode is connected with a gate electrode of the second switching element.

24. The display apparatus according to claim 13, wherein a parallel monotonic capacitance is not formed between the pixel electrode and the opposite electrode via the display medium.

25. The display apparatus according to claim 24, wherein the opposite electrode is formed on the substrate on which the pixel electrode is formed.

26. The display apparatus according to claim 24, wherein the opposite electrode is not formed on the substrate on which the pixel electrode is formed, and the display medium is controlled by an electric field that is substantially parallel to the substrate and an electric field that has skew relative to the substrate.

27. The display apparatus according to claim 26, wherein the display medium is a liquid crystal.

28. The display apparatus according to claim 24, wherein the opposite electrodes are formed both on the substrate having the pixel electrode and the substrate opposing said substrate, and the display medium is controlled by an electric field that is substantially parallel to the substrate and an electric field that has skew relative to the substrate.

29. The display apparatus according to claim 28, wherein the display medium is a liquid crystal.

30. The display apparatus according to claim 13, further comprising a means for overlapping a voltage to the driving circuit of the scanning signal via the storage capacitance.

31. The display apparatus according to claim 30, wherein the driving circuit of the scanning signal comprises an output voltage of more than four values.

32. The display apparatus according to claim 30, wherein the voltage is applied to the pixel electrode via the storage capacitance after applying the voltage via the switching element.

33. A display apparatus comprising plural pixel electrodes arranged in a matrix, a switching element connected with a pixel electrode, a scanning electrode, a picture signal electrode, an opposite electrode, and further comprising
a storage capacitance between the pixel electrode and the scanning electrode excluding the scanning electrode of the present line;
wherein, there are plural scanning electrodes connected with one edge of the storage capacitances whose other edges are connected with the pixel electrode of plural pixels belonging to one of the scanning electrodes;
wherein, when all capacitance connected with the pixel electrode in a pixel is denoted as Ctot, the gate-drain inter-electrode capacitance of the switching element is denoted as Cgd, the storage capacitance is denoted as Cst,
both the first capacitance ratio $\alpha gd$ shown by (Expression 62) and the second capacitance ratio $\alpha st$ shown by (Expression 63) have a different value according to the scanning electrode to which the storage capacitance is connected.

$$\alpha gd = Cgd/Ctot \qquad \text{(Expression 62)}$$
$$\alpha st = Cst/Ctot \qquad \text{(Expression 63)}$$

34. The display apparatus according to claim 33, further comprising a picture signal drive circuit applying two picture signals having different polarity from each other to the plural picture signal electrodes.

35. The display apparatus according to claim 34, wherein, among plural pixels belonging to a scanning electrode (scanning electrode "0"),
a scanning electrode connected with one edge of a storage capacitance wherein the other edge is connected with a pixel electrode of a pixel belonging to the picture signal electrode that applies a picture signal of the first polarity is a common scanning electrode (it is called as scanning electrode A),
a scanning electrode connected with one edge of a storage capacitance wherein the other edge is connected with a pixel electrode of a pixel belonging to the picture signal electrode that applies a picture signal of the second polarity is also a common scanning electrode (it is called as scanning electrode B),
wherein the scanning electrode A and the scanning electrode B are different.

36. The display apparatus according to claim 35, wherein the scanning electrode A is located as the preceding line of the scanning electrode 0, and the scanning electrode B is located as the next line of the scanning electrode 0.

37. The display apparatus according to claim 36, wherein $\alpha gd$ and $\alpha st$ of the pixel whose storage capacitance is connected with the scanning electrode of the preceding line are represented as αgd(P) and αst(P), αgd and αst of the pixel whose storage capacitance is connected with the scanning electrode of the next line are represented as αgd(Q) and αst(Q), and (Expression 64) is satisfied.

$$\alpha st(P) < \alpha st(Q) \qquad \text{(Expression 64)}$$

38. The display apparatus according to claim 37, further comprising a scanning signal drive circuit applying a voltage signal to a plural scanning electrodes, wherein the scanning signal drive circuit comprises an output voltage of more than four values.

39. The display apparatus according to claim 38, wherein when the scanning electrode 0 is selected, the voltage of the scanning electrode 0 becomes the first voltage level Vgon, the scanning electrode A and the scanning electrode B become the second voltage level Vge(+) and the third voltage level Vge(−) respectively, and during the holding period when the scanning electrode 0 is not selected, the voltage of the scanning electrode 0 becomes the fourth voltage level Vgoff, and (Expression 65) is satisfied.

$$\beta(P) < \beta(Q) \qquad \text{(Expression 65)}$$

wherein, $$\beta(P) = \alpha st(P)(\Delta Vgec/\Delta Vgon) + \alpha gd(P)$$

$$\beta(Q) = \alpha st(Q)(\Delta Vgec/\Delta Vgon) + \alpha gd(Q)$$

$$\Delta Vgec = (Vge(+) + Vge(-))/2 - Vgoff$$

$$\Delta Vgon = Vgon - Vgoff$$

40. A display apparatus comprising plural pixel electrodes arranged in a matrix, a switching element connected with a pixel electrode, a scanning electrode, a picture signal electrode, an opposite electrode, and further comprising, storage capacitance between the pixel electrode and the scanning electrode other than the scanning electrode of the present line;

wherein, when all capacitance connected with the pixel electrode in a pixel is denoted as Ctot, the gate-drain inter-electrode capacitance of the switching element is denoted as Cgd, the storage capacitance is denoted as Cst, the second capacitance ratio αst=Cst/Ctot shown by (Expression 66) varies according to the distance from the display edge of the scanning electrode.

$$\alpha st = Cst/Ctot \qquad \text{(Expression 66)}$$

41. The display apparatus according to claim 40, wherein the second capacitance ratio αst increases continuously or in stages according to the distance from the display edge of the scanning electrode.

42. The display apparatus according to claim 41, further comprising a scanning signal drive circuit applying a voltage signal to plural scanning electrodes, wherein the scanning signal drive circuit comprises an output voltage of more than four values.

43. The display apparatus according to claim 42, wherein when a scanning electrode (it is called as scanning electrode 0) is selected, the voltage of the scanning electrode 0 becomes the first voltage level Vgon, the voltage of a scanning electrode (it is called as scanning electrode A), which is connected with one edge of a storage capacitance wherein the other edge is connected with a pixel electrode of plural pixels belonging to the scanning electrode, becomes the second voltage level Vge(+) and the third voltage level Vge(−) according to the displaying period, and during holding period when the scanning electrode 0 is not selected, the voltage of the scanning electrode 0 becomes the fourth voltage level Vgoff, and β shown by (Expression 67) increases continuously or in stages according to the distance from the display edge of the scanning electrode.

$$\beta = \alpha st(\Delta Vgec/\Delta Vgon) + \alpha gd \qquad \text{(Expression 67)}$$

herein $$\Delta Vgec = (Vge(+) + Vge(-))/2 - Vgoff$$

$$\Delta Vgon = Vgon - Vgoff$$

44. The display apparatus according to claim 43, wherein when the values of α st and β of the scanning electrode at the display edge are represented as αst(0) and β(0), the values of αst−αst(0) and β−β(0) are substantially proportional to the second power of the distance from the display edge of the scanning electrode.

45. A display apparatus comprising a pixel electrode arranged in a matrix, a switching element connected with the pixel electrode, a scanning electrode, a picture signal electrode, an opposite electrode, and further comprising storage capacitance between the pixel electrode and the scanning electrode excluding the scanning electrode of the present line;

wherein, there are plural scanning electrodes connected with one edge of the storage capacitances whose other edges are connected with the pixel electrode of plural pixels belonging to one of the scanning electrode;

wherein, when all capacitance connected with the pixel electrode in a pixel is denoted as Ctot, the gate-drain inter-electrode capacitance of the switching element is denoted as Cgd, the storage capacitance is denoted as Cst, both the first capacitance ratio αgd shown by (Expression 68) and the second capacitance ratio αst shown by (Expression 69) are a different value according to the scanning electrode to which the storage capacitance is connected, and are varied according to the distance from display edge of the scanning electrode.

$$\alpha gd = Cgd/Ctot \qquad \text{(Expression 68)}$$

$$\alpha st = Cst/Ctot \qquad \text{(Expression 69)}$$

46. The display apparatus according to claim 45, further comprising a picture signal drive circuit applying two kinds of picture signals having different polarity from each other to the plural picture signal electrodes at the same time.

47. The display apparatus according to claim 45, wherein, among plural pixels belonging to a scanning electrode (scanning electrode "0"), a scanning electrode, which is connected with one edge of a storage capacitance wherein the other edge is connected with a pixel electrode of a pixel belonging to the picture signal electrode which applies picture signal of the first polarity, is a common scanning electrode (it is called as scanning electrode A), a scanning electrode, which is connected with one edge of a storage capacitance wherein the other edge is connected with a pixel electrode of a pixel belonging to the picture signal electrode which applies picture signal of the second polarity, is also a common scanning electrode (it is called as scanning electrode B), and the scanning electrode A and the scanning electrode B are different.

48. The display apparatus according to claim 47, wherein the scanning electrode A is located at the preceding line of the scanning electrode 0, and the scanning electrode B is located as the next line of the scanning electrode 0.

49. The display apparatus according to claim 48, wherein αgd and αst of the pixel whose storage capacitance is connected with the scanning electrode of the preceding line are represented as αgd(P) and αst(P), and αgd and αst of the pixel whose storage capacitance is connected with the scanning electrode of the next line are represented as αgd(Q) and αst(Q), and (Expression 70) is satisfied.

$$\alpha st(P) < \alpha st(Q) \qquad \text{(Expression 70)}$$

50. The display apparatus according to claim 49, further comprising a scanning signal drive circuit applying a voltage signal to a plural scanning electrodes, wherein the scanning signal drive circuit comprises an output voltage of more than four values.

51. The display apparatus according to claim 50, wherein the voltage is applied via the storage capacitance to the pixel electrode after applying the voltage via the switching element.

52. The display apparatus according to claim 50, wherein when the scanning electrode 0 is selected, the voltage of the scanning electrode 0 becomes the first voltage level Vgon, the scanning electrode A and the scanning electrode B become the second voltage level Vge(+) and the third voltage level Vge(−) respectively, and during the holding period when the scanning electrode 0 is not selected, the voltage of the scanning electrode 0 becomes the fourth voltage level Vgoff, and (Expression 71) is satisfied.

$$\beta(P) < \beta(Q) \qquad \text{(Expression 71)}$$

wherein $$\beta(P) = \alpha st(P)(\Delta Vgec/\Delta Vgon) + \alpha gd(P)$$

$$\beta(Q) = \alpha st(Q)(\Delta Vgec/\Delta Vgon) + \alpha gd(Q)$$

$$\Delta Vgec = (Vge(+) + Vge(-))/2 - Vgoff$$

$$\Delta Vgon = Vgon - Vgoff$$

53. The display apparatus according to claim 52, wherein [αst(P)+αst(Q)]/2 varies continuously or in stages according to the distance from the display edge of the scanning electrode.

54. The display apparatus according to claim 53, wherein when β(P) and β(Q) are shown by (Expression 72), [β(P)+β(Q)]/2 increases continuously or in stages according to the distance from the display edge of the scanning electrode.

$$\beta = \alpha st(\Delta Vgec/\Delta Vgon) + \alpha gd \qquad \text{(Expression 72)}$$

wherein $$\Delta Vgec = (Vge(+) + Vge(-))/2 - Vgoff$$

$$\Delta Vgon = Vgon - Vgoff$$

55. The display apparatus according to claim 54, wherein when values of αst(P), αst(Q), β(P) and β(Q) at the display edge of the scanning electrode are described as αst(P,0), αst(Q,0), β(P,0) and β(Q,0), the values of [αst(P)−αst(P,0)+αst(Q,0)−αst(Q,0)]/2 and [β(P)−β(P,0)+β(Q)−β(Q,0)]/2 are substantially proportional to the second power of the distance from the display edge of the scanning electrode.

56. A display apparatus comprising a source wiring and a gate wiring arranged in a matrix; a thin-film-transistor installed corresponding to each intersection of the source wiring and the gate wiring; a pixel electrode connected with the thin-film-transistor; a storage capacitance electrode forming a storage capacitance with the pixel electrode; an opposite electrode formed to oppose the pixel electrode on the same substrate or on an other substrate; a gate drive circuit supplying a gate pulse to the gate wiring sequentially; and a source drive circuit supplying a source signal to the source wiring, on the opposing surface of one substrate among two substrates which are opposed to each other, wherein the storage capacitance decreases according to the distance from the feeding edge of the gate signal and the thin-film-transistor becomes small according to the decrease of the storage capacitance.

57. The display apparatus according to claim 56, wherein the gate pulse is applied to more than two gate wirings at the same time.

58. The display apparatus according to claim 57, wherein the gate pulse is applied to more than two continuous gate wirings at the same time.

59. A display apparatus comprising a source wiring and a gate wiring arranged in a matrix; a thin-film-transistor installed corresponding to each intersection of the source wiring and the gate wiring; a pixel electrode connected with the TFT; a storage capacitance electrode forming a storage capacitance with the pixel electrode; an opposite electrode formed to oppose the pixel electrode on the same substrate or on an other substrate; a gate drive circuit supplying a gate pulse to the gate wiring sequentially; and a source drive circuit supplying a source signal to the source wiring, on the opposing surface of one substrate among two substrates which are opposed to each other, wherein the thin-film-transistor is composed of a gate electrode connected with the gate wiring, a source electrode connected with the source wiring and a drain electrode connected with the pixel electrode, and the source electrode and the drain electrode are separated by channel-length L with width W, and the storage capacitance electrode becomes small according to the distance from the feeding edge of the gate signal, and the width W of the channel of the drain electrode of the thin-film-transistor is reduced according to the decrease of the area of the storage capacitance electrode, and the electrostatic capacitance formed by overlapping of the gate and the drain becomes constant.

60. A display apparatus comprising a source wiring and a gate wiring arranged in a matrix; a thin-film-transistor installed corresponding to each intersection of the source wiring and the gate wiring; a pixel electrode connected with the TFT; a storage capacitance electrode forming a storage capacitance between the pixel electrode; an opposite electrode formed as opposing the pixel electrode on the same substrate or on an other substrate, wherein the thin-film-transistor is composed of a gate electrode connected with the gate wiring, a source electrode connected with the source wiring and a drain electrode connected with the pixel electrode, and the source electrode and the drain electrode are separated by channel-length L with width W, and the storage capacitance electrode becomes small according to the distance from the feeding edge of the gate signal, wherein the electrostatic capacitance between the gate electrode and the drain electrode becomes large according to the decrease in the storage capacitance.

61. The display apparatus according to claim 60, wherein when the storage capacitance is denoted as Cst, the gate-drain inter-electrode capacitance of the switching element is denoted as Cgd, the electrostatic capacitance between the drain electrode and the opposite electrode is denoted as Clc, the value Cst+Cgd+Clc becomes substantially constant.

62. A display device comprising plural pixel electrodes arranged in a matrix, a switching element connected with the pixel electrode, a scanning electrode, a picture signal electrode, an opposite electrode forming a capacitance with the pixel electrode, and further comprising a storage capacitance between the pixel electrode and the scanning electrode other than the scanning electrode of the present line;

more than two capacitance elements connected with the pixel electrode, including at least one of a gate-drain inter-electrode capacitance of the switching element and the storage capacitance, having different values according to the distance from the power feeding edge of the scanning electrode;

wherein, when all capacitance connected with the pixel electrode in a pixel is denoted as Ctot, the gate-drain inter-electrode capacitance of the switching element is denoted as Cgd, the storage capacitance is denoted as Cst, a first capacitance ratio αgd shown by (Expression 73) increases continuously or in stages according to the distance from the power feeding edge of the scanning electrode.

$$\alpha gd = Cgd/Ctot \qquad \text{(Expression 73)}$$

63. A display device comprising plural pixel electrodes arranged in a matrix, a switching element connected with a pixel electrode, a scanning electrode, a picture signal electrode, an opposite electrode forming a capacitance with the pixel electrode, a storage capacitance electrode, and further comprising a first storage capacitance between the pixel electrode and the scanning electrode other than the scanning electrode of the present line; and a second storage capacitance between the pixel electrode and the storage capacitance electrode;

wherein when all capacitance connected with the pixel electrode in a pixel is denoted as Ctot, the gate-drain inter-electrode capacitance of the switching element is denoted as Cgd, the first storage capacitance is denoted as Cst1, a second storage capacitance is denoted as Cst2, the third capacitance ratio αgd1 shown by (Expression 74) increases continuously or in stages according to the distance from the power feeding edge of the scanning electrode.

$$\alpha gd1 = Cgd/Ctot \qquad \text{(Expression 74)}$$

64. A display device comprising plural pixel electrodes arranged in a matrix, a switching element connected with the pixel electrode, a scanning electrode, a picture signal electrode, an opposite electrode, and further comprising a storage capacitance between the pixel electrode and the scanning electrode other than the scanning electrode of the present line;

wherein, there are plural scanning electrodes connected with one edge of the storage capacitances whose other edges are connected with the pixel electrode of plural pixels belonging to one of the scanning electrodes;

wherein, when all capacitance connected with the pixel electrode in a pixel is denoted as Ctot, the gate-drain inter-electrode capacitance of the switching element is denoted as Cgd, the storage capacitance is denoted as Cst, both the first capacitance ratio αgd shown by (Expression 75) and the second capacitance ratio α st shown by (Expression 76) have a different value according to the scanning electrode to which the storage capacitance is connected.

$$\alpha gd = Cgd/Ctot \qquad \text{(Expression 75)}$$

$$\alpha st = Cst/Ctot \qquad \text{(Expression 76)}$$

65. A display device comprising plural pixel electrodes arranged in a matrix, a switching element connected with the pixel electrode, a scanning electrode, a picture signal electrode, an opposite electrode, and further comprising, a storage capacitance between the pixel electrode and the scanning electrode other than the scanning electrode of the present line;

wherein, when all capacitance connected with the pixel electrode in a pixel is denoted as Ctot, the gate-drain inter-electrode capacitance of the switching element is denoted as Cgd, the storage capacitance is denoted as Cst, the second capacitance ratio αst=Cst/Ctot shown by (Expression 77) varies according to the distance from the display edge of the scanning electrode.

$$\alpha st = Cst/Ctot \qquad \text{(Expression 77)}$$

66. A display device comprising a pixel electrode arranged in a matrix, a switching element connected with the pixel electrode, a scanning electrode, a picture signal electrode, an opposite electrode, and further comprising a storage capacitance between the pixel electrode and the scanning electrode other than the scanning electrode of the present line;

wherein, there are plural scanning electrodes connected with one edge of the storage capacitances whose other edges are connected with the pixel electrode of plural pixels belonging to one of the scanning electrodes;

wherein, when all capacitance connected with the pixel electrode in a pixel is denoted as Ctot, the gate-drain inter-electrode capacitance of the switching element is denoted as Cgd, the storage capacitance is denoted as Cst, both the first capacitance ratio α gd shown by (Expression 78) and the second capacitance ratio αst shown by (Expression 79) have a different value according to the scanning electrode to which the storage capacitance is connected, and are varied according to the distance from display edge of the scanning electrode.

$$\alpha gd = Cgd/Ctot \qquad \text{(Expression 78)}$$

$$\alpha st = Cst/Ctot \qquad \text{(Expression 79)}$$

67. A display device comprising a source wiring and a gate wiring arranged in a matrix; a thin-film-transistor installed corresponding to each intersection of the source wiring and the gate wiring; a pixel electrode connected with the thin-film-transistor; a storage capacitance electrode forming a storage capacitance with the pixel electrode; an opposite electrode formed to oppose the pixel electrode on the same substrate or on an other substrate; a gate drive circuit supplying a gate pulse to the gate wiring sequentially; and a source drive circuit supplying a source signal to the source wiring, on the opposing surface of one substrate among two substrates that are opposed each other, wherein the storage capacitance decreases according to the distance from the feeding edge of the gate signal and the thin-film-transistor becomes small according to the decrease of the storage capacitance.

68. A display device comprising a source wiring and a gate wiring arranged in a matrix; a thin-film-transistor installed corresponding to each intersection of the source wiring and the gate wiring; a pixel electrode connected with the TFT; a storage capacitance electrode forming a storage capacitance between the pixel electrode; an opposite electrode formed as opposing the pixel electrode on the same substrate or on an other substrate; a gate drive circuit supplying a gate pulse to the gate wiring sequentially; and a source drive circuit supplying a source signal to the source wiring, on the opposing surface of one substrate among two substrates which are opposed to each other, wherein the thin-film-transistor is composed of a gate electrode connected with the gate wiring, a source electrode connected with the source wiring and a drain electrode connected with the pixel electrode, and the source electrode and the drain electrode are separated by channel-length L with width W, and the storage capacitance electrode become small according to the distance from the feeding edge of the gate signal, and the width W of the channel of the drain electrode of the thin-film-transistor is reduced according to the decrease of the area of the storage capacitance electrode, and the electrostatic capacitance formed by overlapping of the gate and the drain becomes constant.

69. A display device comprising a source wiring and a gate wiring arranged in a matrix; a thin-film-transistor installed corresponding to each intersection of the source wiring and the gate wiring; a pixel electrode connected with the TFT; a storage capacitance electrode forming a storage capacitance with the pixel electrode; an opposite electrode formed as opposing the pixel electrode on the same substrate or on an other substrate, wherein the thin-film-transistor is composed of a gate electrode connected with the gate wiring, a source electrode connected with the source wiring and a drain electrode connected with the pixel electrode, and the source electrode and the drain electrode are opposed separated by channel-length L with width W, and the storage capacitance electrode becomes small according to the distance from the feeding edge of the gate signal, wherein the electrostatic capacitance between the gate electrode and the drain electrode becomes large according to the decrease in the storage capacitance.

70. A method for driving a display apparatus which comprises plural pixel electrodes arranged in a matrix, a switching element connected with the pixel electrode, a scanning electrode, a picture signal electrode, and an opposite electrode forming a capacitance with the pixel electrode, which apparatus further comprises a storage capacitance between the pixel electrode and the scanning electrode other than the scanning electrode of the present line;

more than two capacitance elements connected with the pixel electrode, including at least one of a gate-drain inter-electrode capacitance of the switching element and the storage capacitance, having a different value according to the distance from the power feeding edge of the scanning electrode;

wherein, when all capacitance connected with the pixel electrode in a pixel is denoted as Ctot, the gate-drain inter-electrode capacitance of the switching element is denoted as Cgd, the storage capacitance is denoted as Cst, a first capacitance ratio αgd shown by (Expression 80) increases continuously or in stages according to the distance from the power feeding edge of the scanning electrode, wherein the method applies the voltage to the pixel electrode via the storage capacitance after applying the voltage via the switching element.

$$\alpha gd = Cgd/Ctot \qquad \text{(Expression 80)}$$

71. A method for driving a display apparatus which comprises plural pixel electrodes arranged in a matrix, a switching element connected with the pixel electrode, a scanning electrode, a picture signal electrode, an opposite electrode forming a capacitance with the pixel electrode, a storage capacitance electrode, which apparatus further comprises a first storage capacitance between the pixel electrode and the scanning electrode other than the scanning electrode of the present line;

a second storage capacitance between the pixel electrode and the storage capacitance electrode, wherein the method applies the voltage to the pixel electrode via the storage capacitance after applying the voltage via the switching element, wherein, when all capacitance connected with the pixel electrode in a pixel is denoted as Ctot, the gate-drain inter-electrode capacitance of the switching element is denoted as Cgd, the first storage capacitance is denoted as Cst1, a second storage capacitance is denoted as Cst2, the third capacitance ratio α gd1 shown by (Expression 81) increases continuously or in stages according to the distance from the power feeding edge of the scanning electrode.

$$\alpha gd1 = Cgd/Ctot \qquad \text{(Expression 81)}$$

72. A method for driving a display apparatus which comprises plural pixel electrodes arranged in a matrix, a switching element connected with the pixel electrode, a scanning electrode, a picture signal electrode, an opposite electrode, which apparatus further comprises, a storage capacitance between the pixel electrode and the scanning electrode other than the scanning electrode of the present line;

wherein, there are plural scanning electrodes connected with one edge of the storage capacitances whose other edges are connected with the pixel electrode of plural pixels belonging to one of the scanning electrodes;

wherein, when all capacitance connected with the pixel electrode in a pixel is denoted as Ctot, the gate-drain inter-electrode capacitance of the switching element is denoted as Cgd, the storage capacitance is denoted as Cst, both the first capacitance ratio α gd shown by (Expression 82) and the second capacitance ratio αst shown by (Expression 83) are the different value according to the scanning electrode to which the storage capacitance is connected, wherein the method applies the voltage to the pixel electrode via the storage capacitance after applying the voltage via the switching element.

$$\alpha gd = Cgd/Ctot \qquad \text{(Expression 82)}$$

$$\alpha st = Cst/Ctot \qquad \text{(Expression 83)}$$

73. A method for driving a display apparatus which comprises plural pixel electrodes arranged in a matrix, a switching element connected with a pixel electrode, a scanning electrode, a picture signal electrode, an opposite electrode, which apparatus further comprises, a storage capacitance between the pixel electrode and the scanning electrode other than the scanning electrode of the present line;

wherein, when all capacitance connected with the pixel electrode in a pixel is denoted as Ctot, the gate-drain inter-electrode capacitance of the switching element is denoted as Cgd, the storage capacitance is denoted as Cst, the second capacitance ratio αst=Cst/Ctot shown by (Expression 84) varies according to the distance from the display edge of the scanning electrode wherein the method applies the voltage to the pixel electrode via the storage capacitance after applying the voltage via the switching element.

$$\alpha st = Cst/Ctot \qquad \text{(Expression 84)}$$

74. A method for driving a display apparatus which comprises a pixel electrode arranged in a matrix, a switching element connected with the pixel electrode, a scanning electrode, a picture signal electrode, an opposite electrode, which apparatus further comprises, a storage capacitance between the pixel electrode and the scanning electrode other than the scanning electrode of the present line;

wherein, there are plural scanning electrodes connected with one edge of the storage capacitances whose other edges are connected with the pixel electrode of plural pixels belonging to one of the scanning electrodes;

wherein, when all capacitance connected with the pixel electrode in a pixel is denoted as Ctot, the gate-drain inter-electrode capacitance of the switching element is denoted as Cgd, the storage capacitance is denoted as Cst, both the first capacitance ratio αgd shown by (Expression 85) and the second capacitance ratio αst shown by (Expression 86) have a different value according to the scanning electrode to which the storage capacitance is connected, and are varied according to the difference from display edge of the scanning electrode, wherein the method applies the voltage to the pixel electrode via the storage capacitance after applying the voltage via the switching element.

$$\alpha gd = Cgd/Ctot \qquad \text{(Expression 85)}$$

$$\alpha st = Cst/Ctot \qquad \text{(Expression 86)}$$

75. A method for driving a display apparatus which comprises a source wiring and a gate wiring arranged in a matrix; a thin-film-transistor installed corresponding to each intersection of the source wiring and the gate wiring; a pixel electrode connected with the thin-film-transistor; a storage capacitance electrode forming a storage capacitance with the pixel electrode; an opposite electrode formed to oppose the pixel electrode on the same substrate or on an other substrate; a gate drive circuit supplying a gate pulse to the gate wiring sequentially; and a source drive circuit supplying a source signal to the source wiring, on the opposing surface of one substrate among two substrates which are opposed each other, wherein the storage capacitance decreases according to the distance from the feeding edge of the gate signal and the thin-film-transistor become small according to the decrease of the storage capacitance, wherein the method applies the gate pulse to more than two gate wirings at the same time.

76. A method for driving a display apparatus which comprises a source wiring and a gate wiring arranged in a matrix; a thin-film-transistor installed corresponding to each intersection of the source wiring and the gate wiring; a pixel electrode connected with the TFT; a storage capacitance electrode forming a storage capacitance between the pixel electrode; an opposite electrode formed to oppose the pixel electrode on the same substrate or on an other substrate; a gate drive circuit supplying a gate pulse to the gate wiring sequentially; and a source drive circuit supplying a source signal to the source wiring, on the opposing surface of one substrate among two substrates which are opposed each other, wherein the thin-film-transistor is composed of a gate electrode connected with the gate wiring, a source electrode connected with the source wiring and a drain electrode connected with the pixel electrode, and the source electrode and the drain electrode are separated by channel-length L with width W, and the storage capacitance electrode becomes small according to the distance from the feeding edge of the gate signal, and the width W of the channel of the drain electrode of the thin-film-transistor is reduced according to the decrease of the area of the storage capacitance electrode, and the electrostatic capacitance formed by overlapping of the gate and the drain becomes constant, wherein the method applies the gate pulse to more than two gate wirings at the same time.

* * * * *